(12) United States Patent
Polen et al.

(10) Patent No.: US 10,973,248 B1
(45) Date of Patent: Apr. 13, 2021

(54) DEVICE FOR FLAVORING AND OR HEATING A CONSUMABLE SUBSTANCE

(71) Applicant: POLENVANDIJK LLC, Sarasota, FL (US)

(72) Inventors: Rodney C. Polen, Sarasota, FL (US); Mike Maria Gerardus Antonius van Dijk, Delft (NL); Daan Jans Vos, Amersfoort (NL)

(73) Assignee: POLENVANDIJK, LLC, Sarasota, FL (US)

( * ) Notice: Subject to any disclaimer, the term of this patent is extended or adjusted under 35 U.S.C. 154(b) by 444 days.

(21) Appl. No.: 15/886,553

(22) Filed: Feb. 1, 2018

Related U.S. Application Data

(60) Provisional application No. 62/454,026, filed on Feb. 2, 2017.

(51) Int. Cl.
| | |
|---|---|
| *A23L 7/191* | (2016.01) |
| *G07F 17/00* | (2006.01) |
| *A23P 20/10* | (2016.01) |
| *A23L 7/187* | (2016.01) |
| *A23P 20/18* | (2016.01) |
| *G07F 9/10* | (2006.01) |

(52) U.S. Cl.
CPC .............. *A23L 7/191* (2016.08); *A23L 7/187* (2016.08); *A23P 20/105* (2016.08); *A23P 20/18* (2016.08); *G07F 9/105* (2013.01); *G07F 17/0078* (2013.01)

(58) Field of Classification Search
CPC .......... A23L 7/191; A23L 7/187; G07F 9/105; G07F 17/0078; A23P 20/18; A23P 20/105
See application file for complete search history.

(56) References Cited

U.S. PATENT DOCUMENTS

| | | |
|---|---|---|
| 1,364,430 A | 1/1921 | Freeburger |
| 1,436,726 A | 11/1922 | Root |
| 1,483,137 A | 2/1924 | Waltman et al. |
| 1,492,987 A | 5/1924 | Isenhour |
| 1,497,025 A | 6/1924 | Priest |
| 1,516,135 A | 11/1924 | Barnard |
| 1,545,357 A | 7/1925 | Schwimmer |
| 1,586,950 A | 6/1926 | Hartman |
| 1,658,486 A | 2/1928 | Howe |
| 1,727,521 A | 9/1929 | Rossebo |
| 1,789,902 A | 1/1931 | Jackson |
| 2,017,293 A | 10/1935 | Priest |
| 2,193,392 A | 3/1940 | Coltman |
| 2,241,938 A | 5/1941 | Wilsey |
| 2,316,989 A | 4/1943 | Scott |
| 2,435,378 A | 2/1948 | Zideck |

(Continued)

*Primary Examiner* — John C Hong

(74) *Attorney, Agent, or Firm* — Frijouf, Rust & Pyle, P.A.

(57) ABSTRACT

A device for flavoring and or heating a consumable substance is disclosed including a body extending between an upper body end and a lower body end. An input aperture is proximal to the upper body end for receiving the consumable substance. A housing defines a housing chamber below the input aperture for temporarily holding the consumable substance. A closure is pivotably coupled to the housing for dispensing the consumable substance from the housing. A flavor dispenser dispenses the edible substance below the closure and engages the consumable substance. An output aperture is proximal to the lower end for dispensing the consumable substance into the container.

31 Claims, 44 Drawing Sheets

(56) References Cited

U.S. PATENT DOCUMENTS

| | | | |
|---|---|---|---|
| 2,771,836 | A | 11/1956 | Denehie et al. |
| 2,843,080 | A | 7/1958 | Woodruff |
| 2,939,379 | A | 6/1960 | Schmitt |
| 2,972,292 | A | 2/1961 | Waas et al. |
| 3,029,751 | A | 4/1962 | Gilmore |
| 3,103,871 | A | 9/1963 | Czulak et al. |
| 3,120,168 | A | 2/1964 | Lippert |
| 3,140,952 | A | 7/1964 | Cretors |
| 3,253,532 | A * | 5/1966 | Jones .................. A47J 37/047 99/323.7 |
| 3,253,747 | A | 5/1966 | Thomas |
| 3,254,800 | A | 6/1966 | Baunach |
| 3,282,470 | A | 11/1966 | Thomas |
| 3,294,546 | A | 12/1966 | Fingerhut |
| 3,512,989 | A | 5/1970 | Smith |
| 3,641,916 | A * | 2/1972 | McDevitt ................ A23L 7/187 99/323.7 |
| 3,697,289 | A | 10/1972 | Day et al. |
| 3,783,820 | A | 1/1974 | Hautly et al. |
| 3,812,774 | A | 5/1974 | Day et al. |
| 4,166,208 | A | 8/1979 | Martel et al. |
| 4,171,667 | A | 10/1979 | Miller et al. |
| 4,512,247 | A | 4/1985 | Friedman |
| 4,828,146 | A | 5/1989 | Stein |
| 5,065,927 | A | 11/1991 | Wahl |
| 5,309,825 | A | 5/1994 | Pinone |
| 5,419,238 | A | 5/1995 | Pinone |
| 5,657,684 | A | 8/1997 | Chaikowsky |
| 6,187,353 | B1 | 2/2001 | Wyman et al. |
| 7,082,891 | B2 | 8/2006 | Watson |
| 8,276,504 | B2 | 10/2012 | Korin |
| 8,464,634 | B2 | 6/2013 | Cretors et al. |
| 2011/0027434 | A1 | 2/2011 | Cretors |
| 2014/0251155 | A1 | 9/2014 | Jacobsen et al. |

* cited by examiner

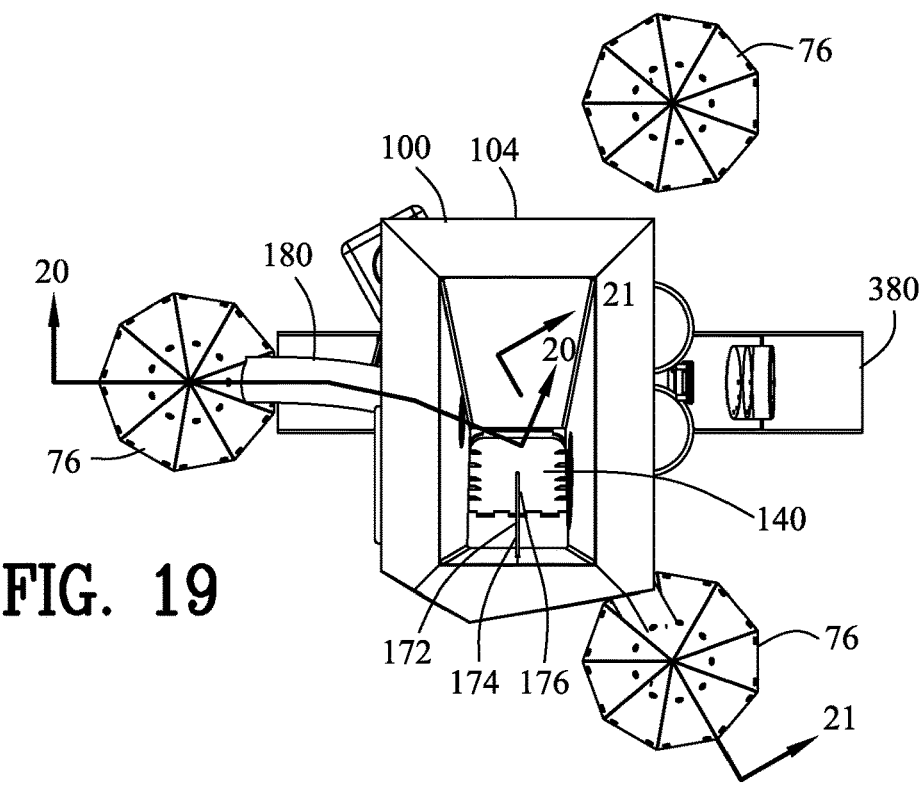
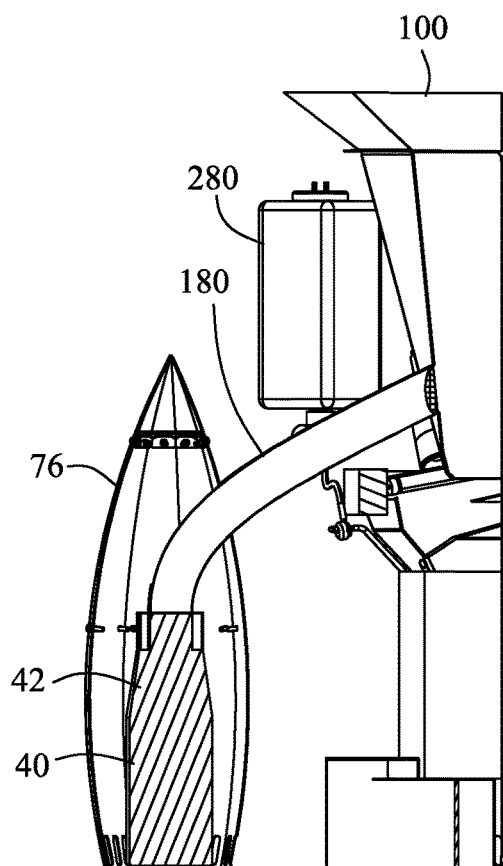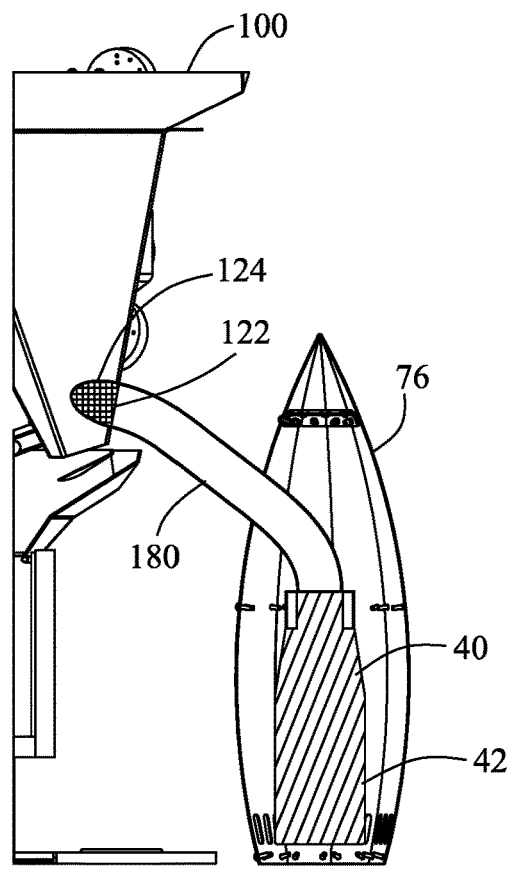
FIG. 19
FIG. 20  FIG. 21

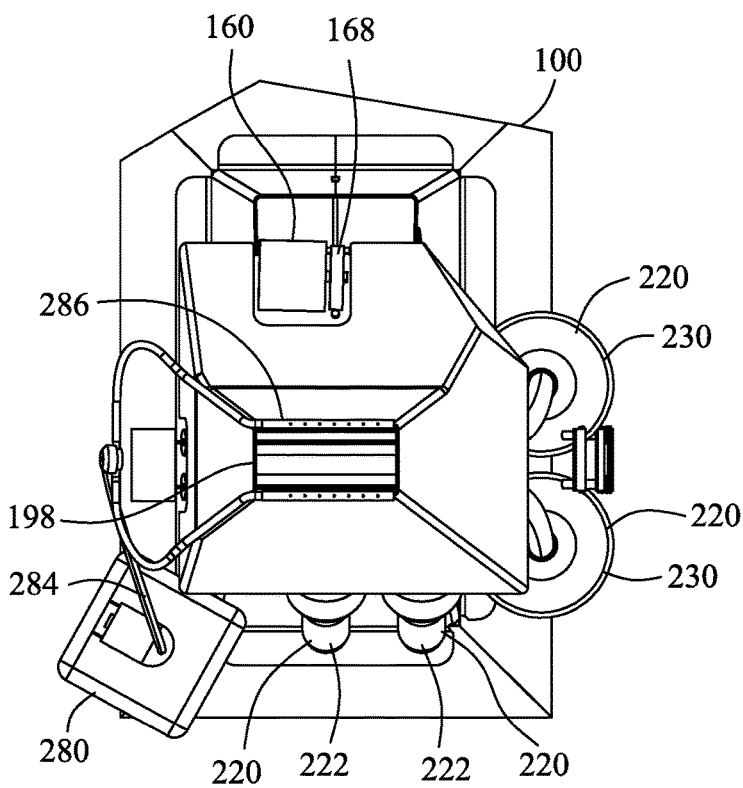
FIG. 34
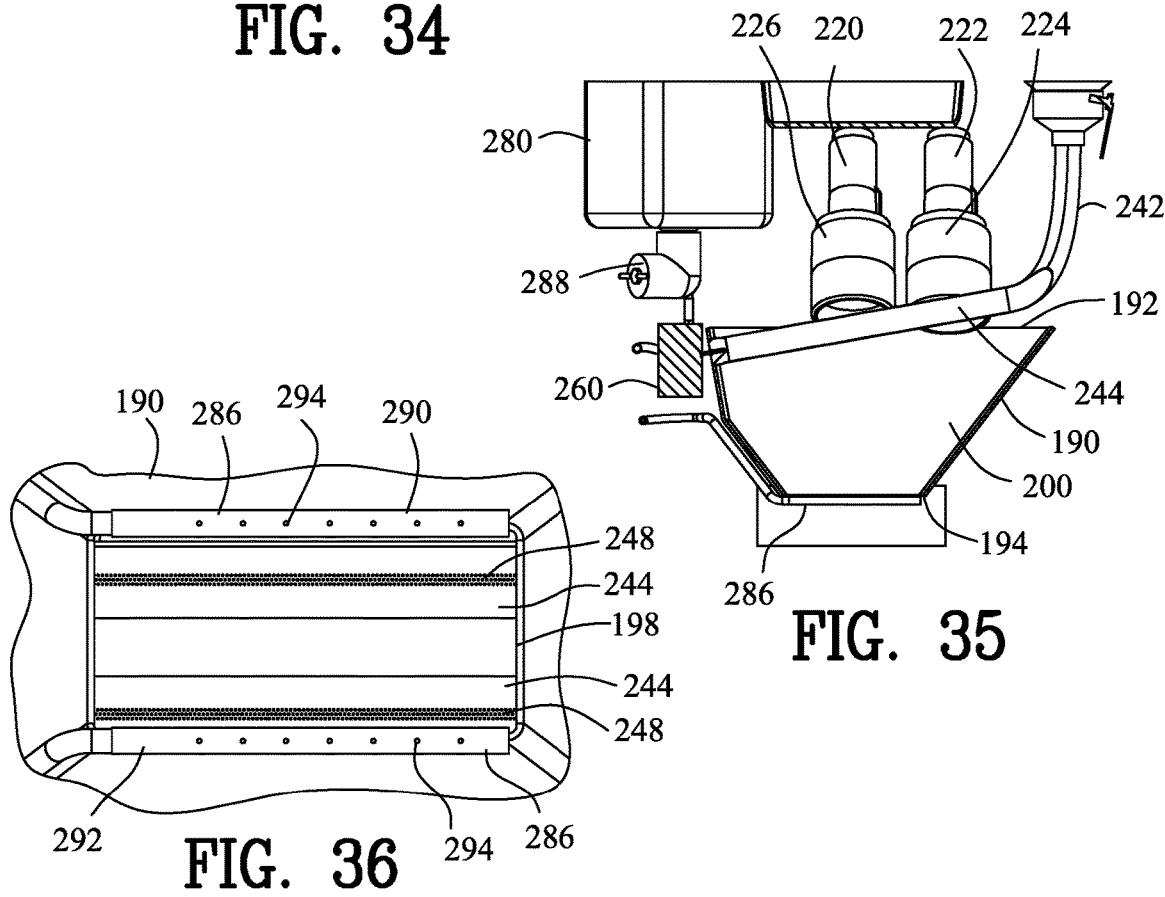
FIG. 35
FIG. 36

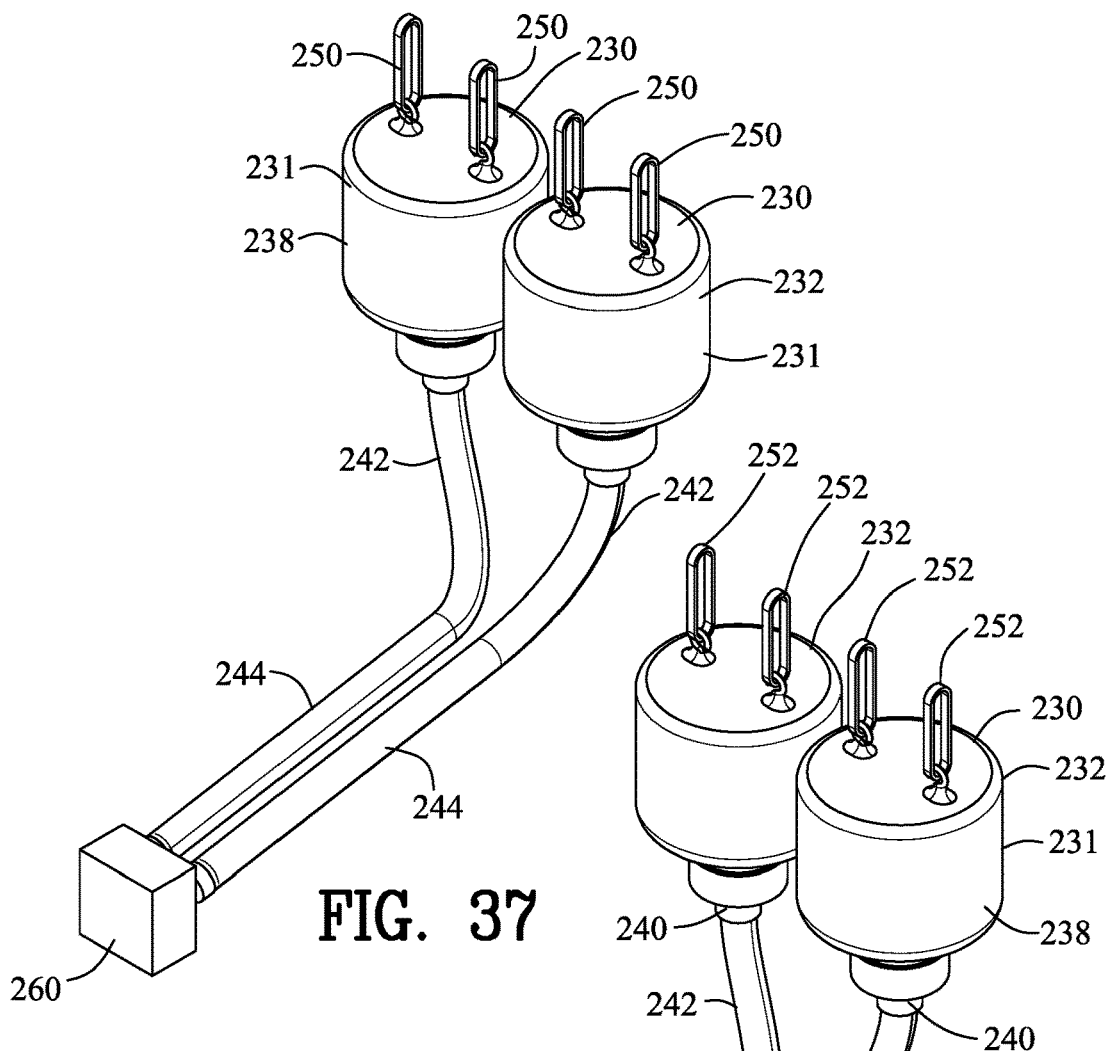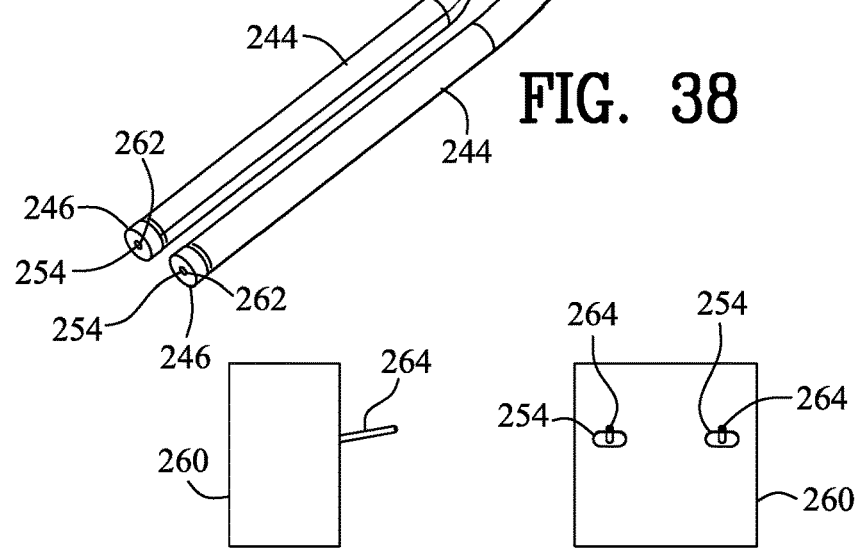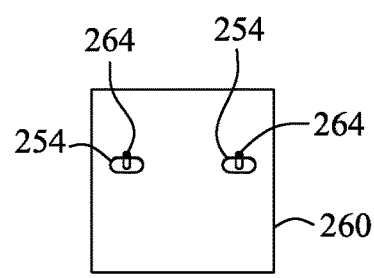

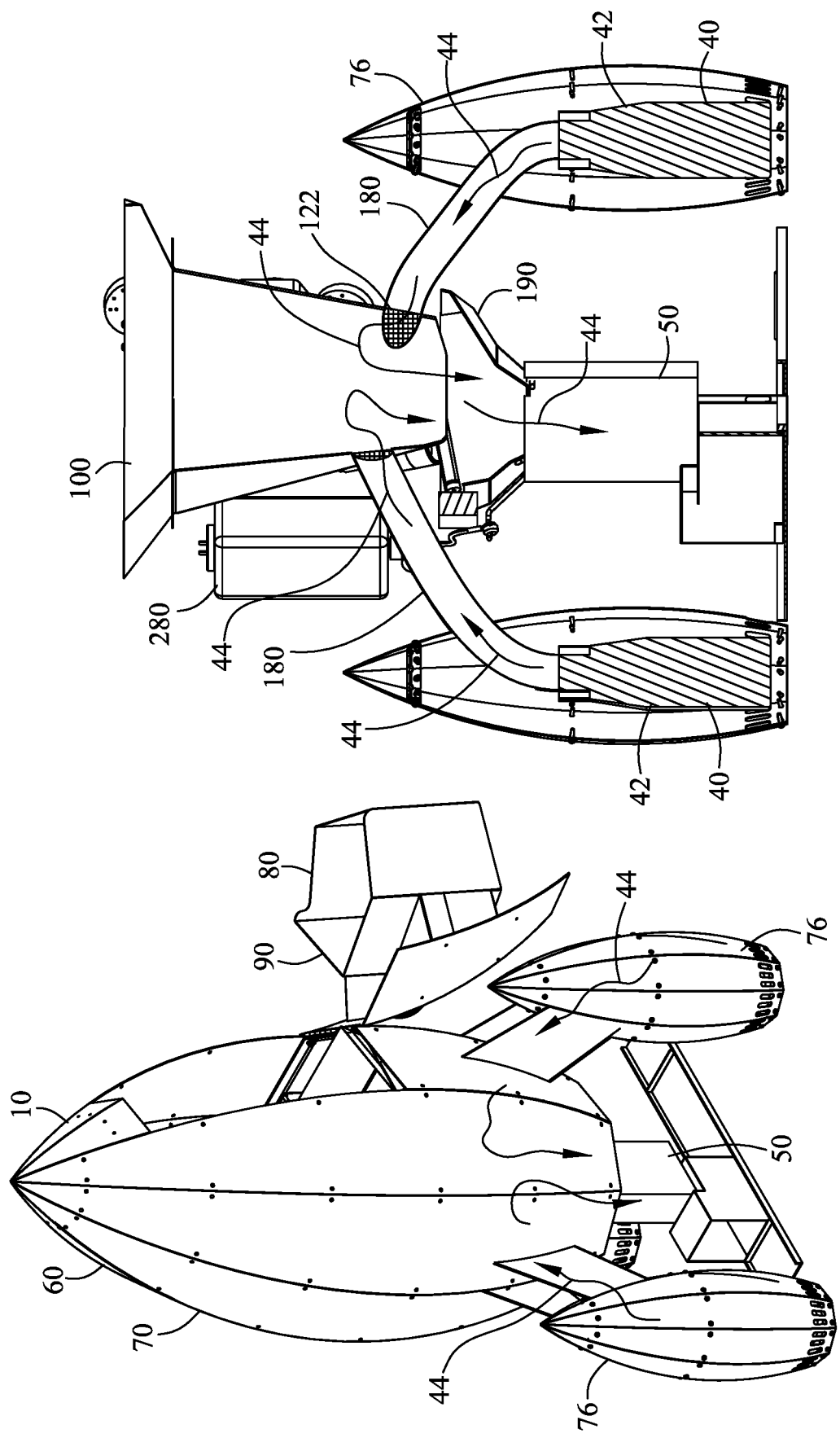

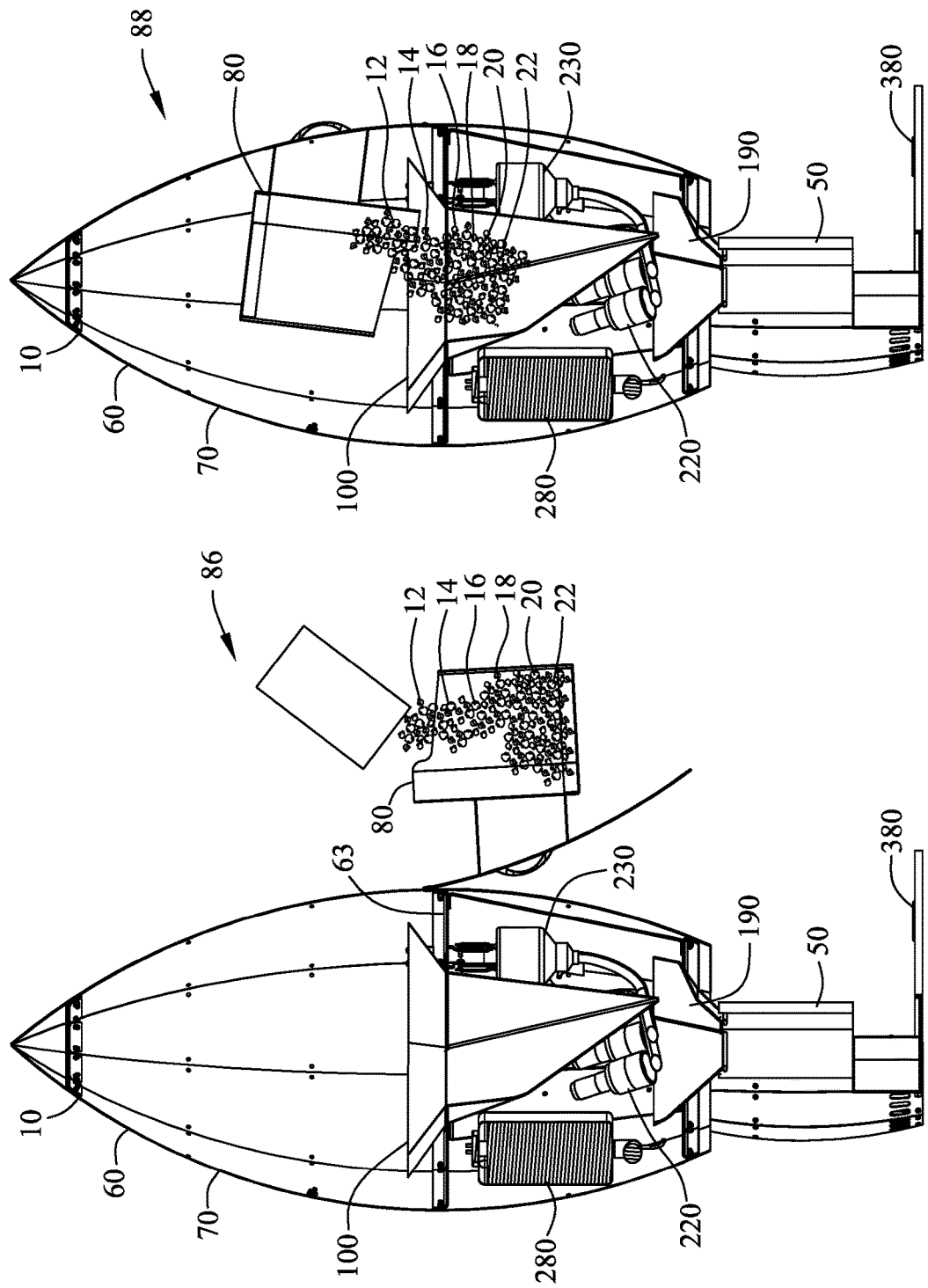

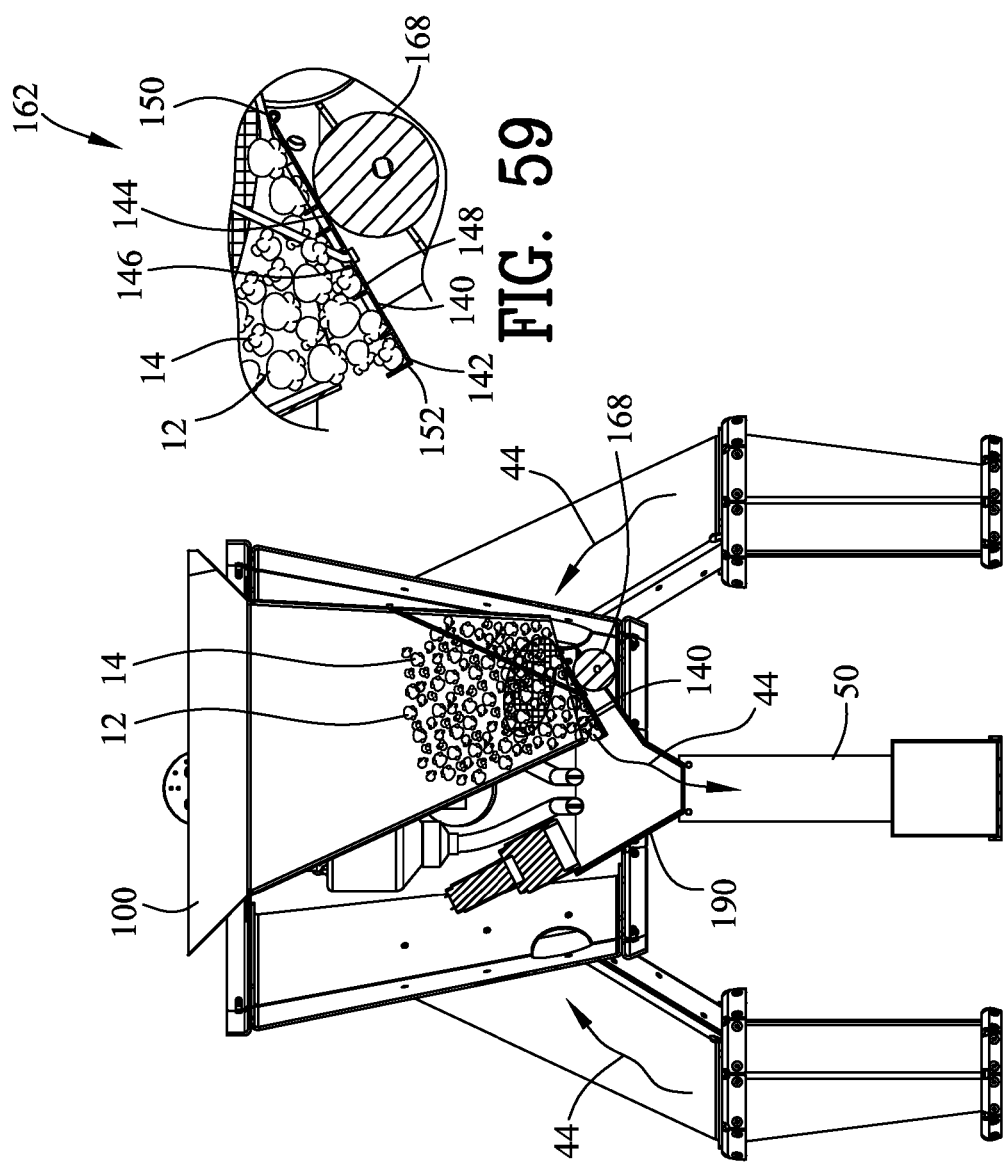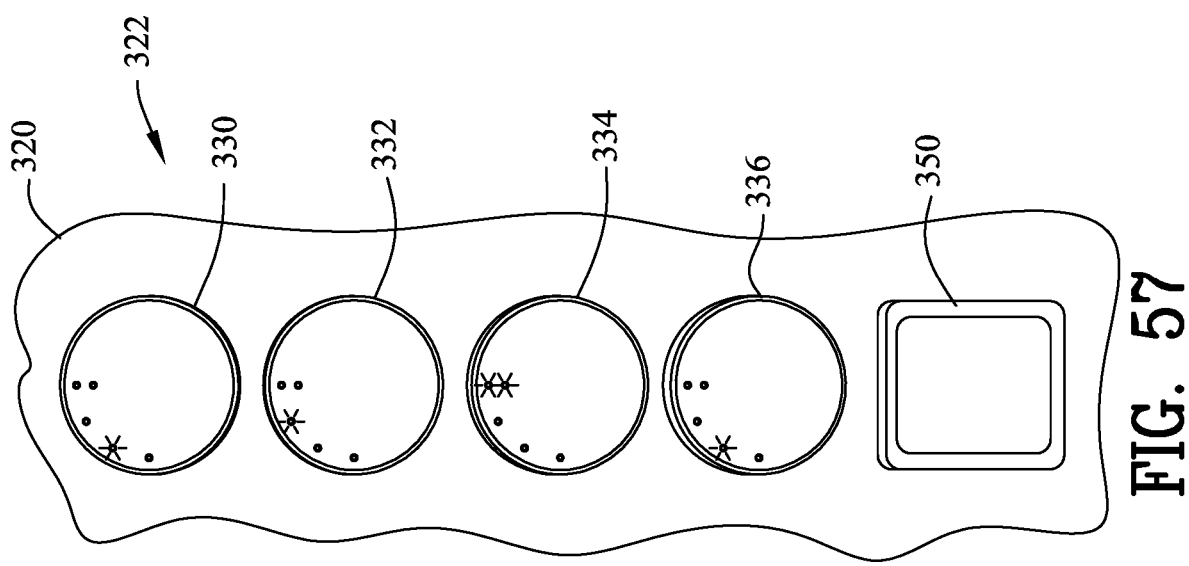

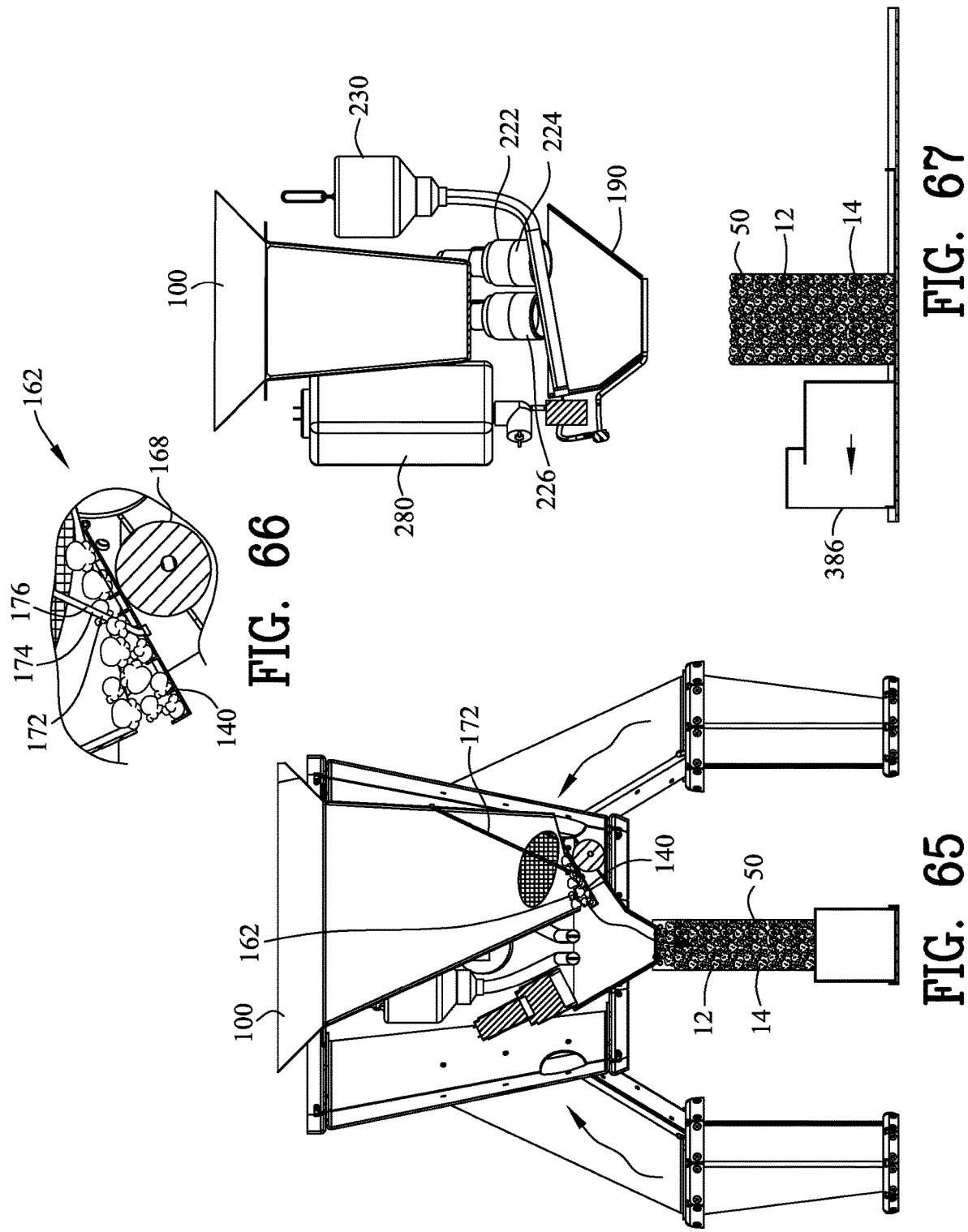

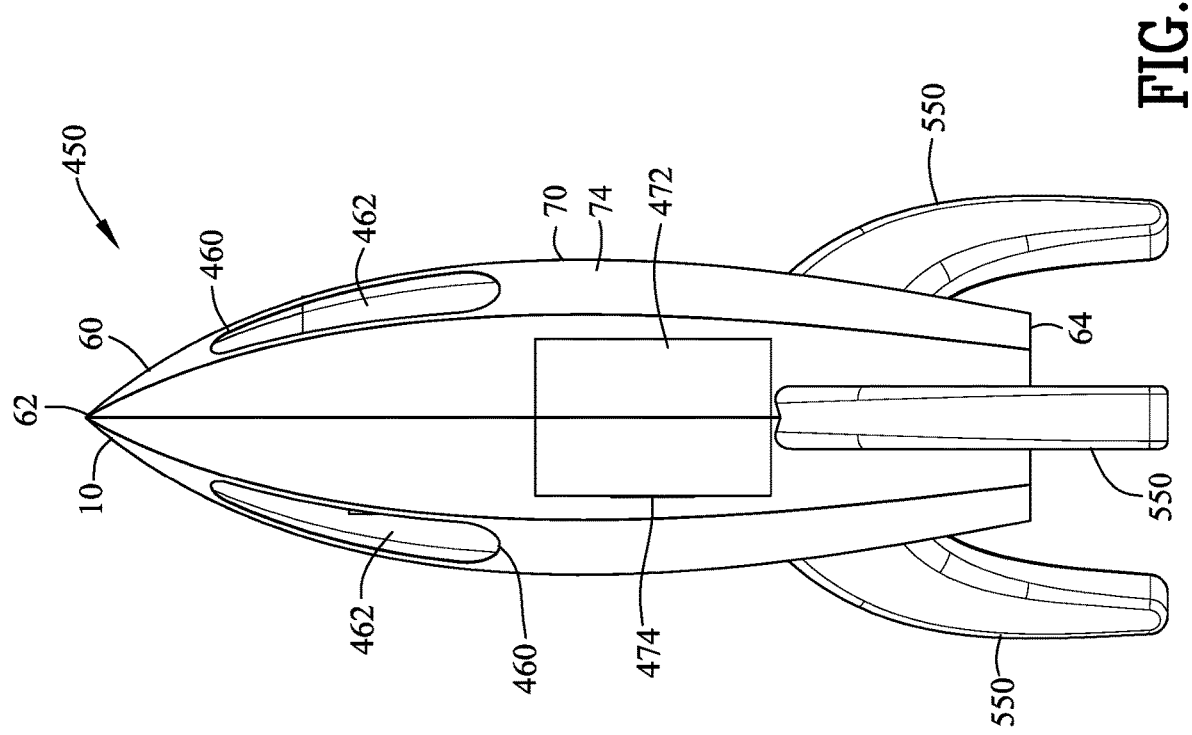
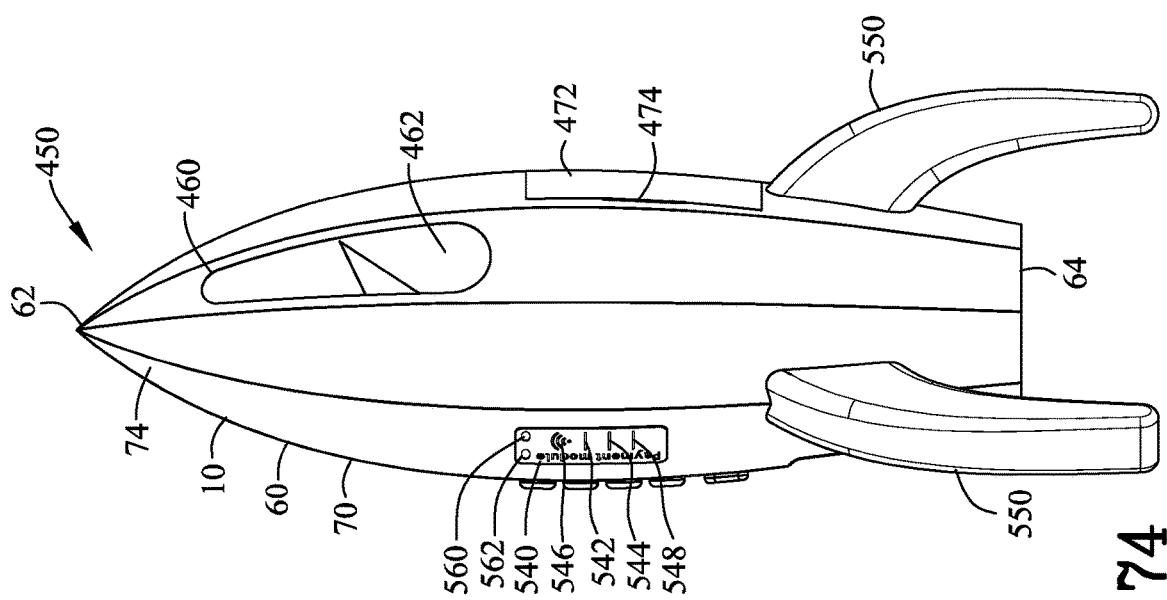

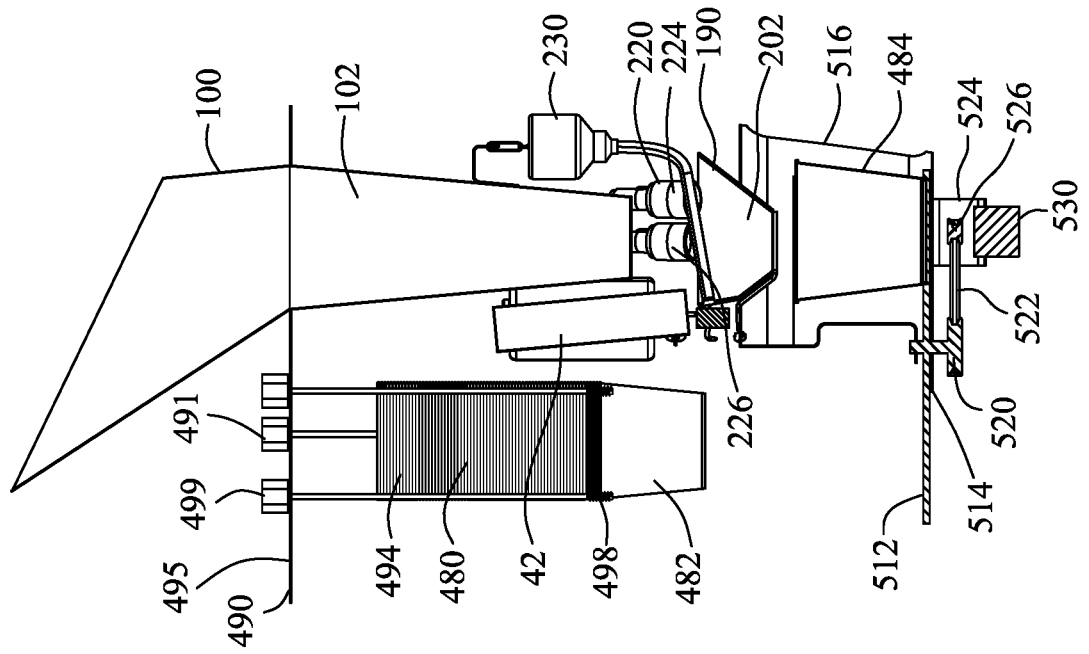
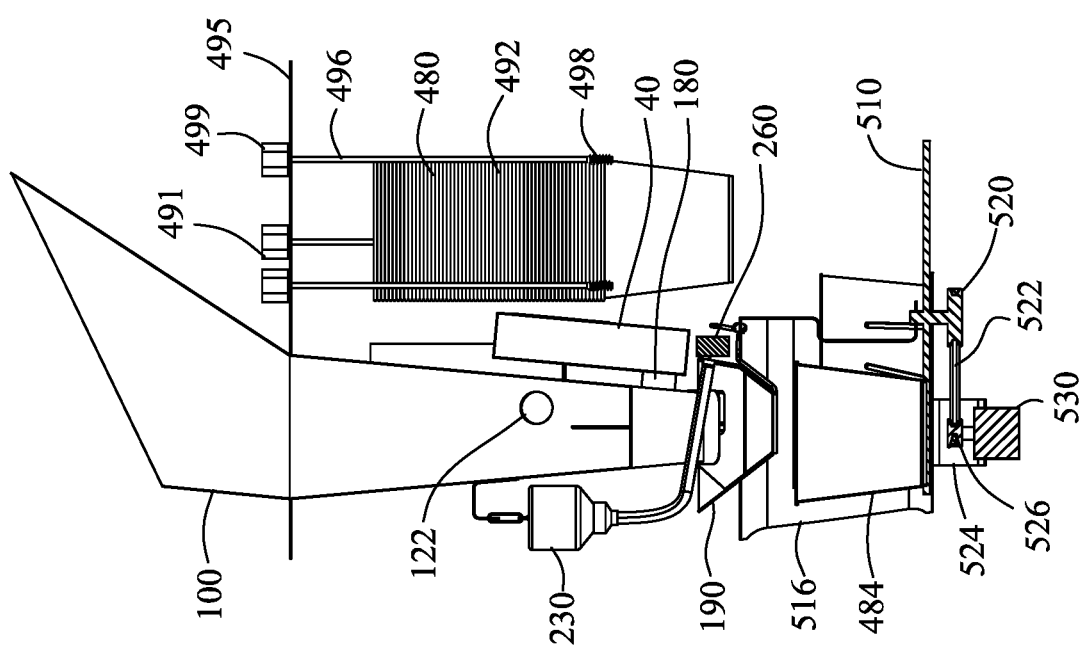

DEVICE FOR FLAVORING AND OR HEATING A CONSUMABLE SUBSTANCE

CROSS-REFERENCE TO RELATED APPLICATIONS

This application claims benefit of U.S. Patent Provisional application No. 62/454,026 filed Feb. 2, 2017. All subject matter set forth in provisional application No. 62/454,026 is hereby incorporated by reference into the present application as if fully set forth herein.

BACKGROUND OF THE INVENTION

Field of the Invention

This invention relates to flavoring and heating and more particularly to flavoring and or heating a consumable substance.

Background of the Invention

Until the late 1890's, popcorn was generally prepared manually. The invention of the popcorn maker by Charles Cretors opened a new venue for the snack. Over a period of time the development of popcorn makers advanced and new varieties of popcorn emerged. Popcorn makers appeared in public gathering places such as theaters. In addition to the commonly used popcorn seasonings of butter and salt, caramel and more exotic seasonings such as chocolate and bubble gum have been used to season popcorn.

The variety of seasonings and serving sizes desired by the consumer has presented a problem for the manufacturers of popcorn makers and vending machines.

There have been many in the prior art who have attempted to solve these problems with varying degrees of success. None, however completely satisfies the requirements for a complete solution to the aforestated problem. The following U. S. Patents are attempts of the prior art to solve this problem.

U.S. Pat. No. 1,364,430 to Freeburger discloses an automatic popcorn popping and dispensing machine comprising in combination a container for unpopped corn, a popping device, with means for heating the same, and a means for automatically and intermittently discharging a pre-determined quantity of unpopped corn from the container onto the popping device. Also provided is a revolving spaced member for lifting the popped corn from the unpopped corn on the popping device, a means for automatically seasoning the popped corn, and a measuring and dispensing device adapted to receive the popped con, with means for operating the same to discharge the popped corn therefrom.

U.S. Pat. No. 1,436,726 to Root discloses a pop corn machine, and particularly that type of ma chine which mechanically measures and discharges the unpopped corn into a hopper heated by an electric hot plate from which it is discharged after having been popped into a trough where it is mechanically buttered and discharged for sale.

U.S. Pat. No. 1,483,137 to Waltman, et al. discloses a pop corn machine comprising a supporting frame, a popping element mounted in the frame, a means for discharging unpopped corn therein, and a means for causing the discharge of the popped corn therefrom. A hopper is supported adjacent the popping element for receiving the discharged corn, and a means is provided for applying butter to the corn discharged therein, and a means is mounted in the hopper for engaging and removing the corn therefrom.

U.S. Pat. No. 1,492,987 to Isenhour discloses a corn-popping machine including a housing roof, a plurality of hanger rods secured to the roof and extending down ward therefrom, and a popping table and an agitator supported by the hanger rods. The popping table is rigidly secured to the rods and the agitator is movable upon the popping table and guided by the rods.

U.S. Pat. No. 1,497,025 to Priest discloses a corn popping and vending machine, comprising the combination of a stationary electric stove provided with a spillway in its side, a rotary stirring device operating in the stove and provided with radially extending fingers for sweeping the stove. A gate is slidably mounted on the stove and over the spillway therein, with a pivoted lever attached to the gate. A revolving cam is arranged to raise and lower the lever. A hopper and a feeder communicates alternately with the hopper and the stove, with a traveling carrier arranged to carry popcorn spilled from the stove. A bin is arranged to receive the popcorn spilled from the carrier.

U.S. Pat. No. 1,516,135 to Barnard discloses a pop corn machine comprising a housing, a tiltable popping bowl in the housing, a corn hopper and a flavoring container. A measuring and delivering means is provided between the corn hopper, flavoring container and the popping bowl, A means is provided for tilting the popping bowl for discharging popped corn therefrom, The means operating the measuring and delivering means for receiving a charge of corn and flavoring material from the hopper and container for subsequent delivery to the popping bowl after the discharge operation.

U.S. Pat. No. 1,545,357 to Schwimmer discloses a new is corn-popping machine having a shallow pan, a rotary shaft guided above the pan, a pan cover movably guided on the shaft, and a hub secured to the shaft and having agitator fingers thereon extending from the lower portion upwardly across the surface of the pan.

U.S. Pat. No. 1,586,950 to Hartman discloses a corn popping machine, a corn popping pan, means for applying heat to the pan, a rotatable hollow shaft for automatically supplying raw corn, salt and oil through the shaft to the pan. A means is carried by the shaft for agitating the corn in the pan, and a cover for the pan is slidably mounted so that it may be pushed upwardly for permitting the discharge of popped corn when the volume of popped corn increases to certain point.

U.S. Pat. No. 1,727,521 to Rossebo discloses a pop corn machine including a popping element, a means for feeding the corn thereon, a means for discharging the corn therefrom after being popped, and a normally closed receptacle associated with the popping element for receiving the popped corn and protecting it from dust and moisture until it is ready to be dispensed. A plurality of wire fingers are pivotally mounted in the bottom of the receptacle and extend across the bottom portion thereof. A means is provided for moving the fingers about their pivotal mounting for agitating the con contained in the receptacle and preventing the packing or bridging thereof at or near the bottom.

U.S. Pat. No. 1,789,902 to Jackson discloses an automatic popcorn machine including a popping vessel, a means for dumping and returning the vessel to a normal position. A means is provided for supplying the same with popcorn kernels and seasoning ingredients and a means operable by the increase in the volume of the popped corn for setting into motion the vessel dumping and returning means and for rendering active the means for supplying the vessel with its contents.

U.S. Pat. No. 2,017,293 to Priest discloses a measuring device for use in a pop corn vending machine, having a receptacle for containing a supply of corn, comprising a chamber for measuring a quantity of corn from the receptacle to be popped. The measuring chamber is provided with an opening in the top thereof for admitting corn from the receptacle. A plate member having an opening therein is provided for intermittently registering with the opening in the top of the supply chamber, with a means for controlling the operation of the plate. A closure member is positioned in the bottom of the measuring chamber, and means connecting the first mentioned plate to the closure member causes the closure member to be actuated to open position when the first plate is in closed position.

U.S. Pat. No. 2,193,392 to Coltman discloses a popcorn dispensing apparatus, in which a cup is adapted to contain a quantity of a granular substance and movable from an upright position to a discharge position. A means is provided for moving the cup from the upright position to the discharge position at a relatively fast rate. A positive stop is arranged to arrest movement of the cup in the discharge position thereof and effectively causes a discharge of the granular substance from the cup in the form of a spray.

U.S. Pat. No. 2,241,938 to Wilsey discloses a corn popping machine comprising a means for popping a batch of corn. The means includes a perforate gate for measuring out the next batch of corn to be popped, and a means for conducting a part of the heat and moisture from the corn being popped through the perforate gate to the next batch.

U.S. Pat. No. 2,316,989 to Scott discloses a popcorn popping machine comprising, a griddle, a beater having a radial arm lying adjacent and in contact with the surface of the griddle. The arm has one edge beveled toward the surface of the griddle and the other edge extending substantially normal to the surface of the griddle. A means is provided to rotate the heater arm slowly in one direction for rolling unpopped corn in contact with the surface of the griddle and the upper surface of the arm. A means to rotate the arm more rapidly in the opposite direction pushes popped corn oil the griddle.

U.S. Pat. No. 2,435,378 to Zideck discloses a popcorn dispensing apparatus including a popping chamber, a heating unit, a hot fat holder positioned for transmitting heat from the heating unit to the popping chamber. A conveyer is provided in the popping chamber, and a means is included for operating in timed relation with the conveyer for delivering unpopped corn into the chamber.

U.S. Pat. No. 2,771,836 to Denelue, et al. discloses a corn popping machine. The primary object of this invention is to provide a machine wherein the corn, the seasoning and the salt are fed into a popping chamber in measured quantities automatically and in a recurring selectively predetermined and accurately controlled cycle so as to pop the corn uniformly irrespective of the quality or moisture content of the corn; the machine operating entirely automatically according to its initial setting or adjustment. Another object of the invention is to provide a corn popping machine in which the corn is fed in predetermined quantity into a tiltable closed popping chamber, and seasoning and salt in accurately measured quantities are introduced together with the corn into the chamber, and wherein the period of popping is predetermined according to the quality of the corn for fully popping all the corn in the chamber, and wherein the chamber is automatically tilted to eject the popped corn into a separator for discharge of the popped corn unto a heated platform for dispensing, and for separately discharging the unpopped kernels into a separate collector.

U.S. Pat. No. 2,843,080 to Woodruff discloses a popcorn flavoring apparatus, having a base, a plate mounted for rotation beneath the base on a substantially vertical axis, and a fence carried by the base and extending around and adjacent the edge of the plate. A discharge extension on the fence, and a means is provided for feeding popped corn onto the plate adjacent the edge thereof and within the fence. A means is provided for dropping powdered flavoring material and liquid flavoring material onto the popped corn on and rotating with the plate. A rotatable feeding means for the powdered flavoring material and means for rotating the plate, and means driven by the plate rotating means drives the powdered flavoring feeding means.

U.S. Pat. No. 2,939,379 to Schmitt discloses an apparatus for cooking popcorn comprising a chamber having a pair of convergent opposed side walls of electrically non-conductive material pervious to electrical radiant energy. The walls are inclined to a vertical plane to define a wedge-shaped space at the bottom and a pair of opposed end walls. The chamber has an open top for deposit of a charge of raw popcorn into the space, a pair of spaced electrically-conductive electrodes with one disposed on each side wall opposite the space. The output of a high-frequency generator of radiant energy is connected to the electrodes.

U.S. Pat. No. 2,972,292 to Waas, et al. discloses a popcorn machine, comprising a cabinet, a popping kettle swingably suspended in the cabinet; and apparatus entirely separate from the kettle for charging ingredients into the latter. The apparatus includes a drawer structure having hopper means therein separately receiving the various ingredients and is provided with an outlet. The structure is shiftable into and out of the cabinet and is normally disposed in the latter above and to one side of the kettle. A mechanism on the structure automatically measures designated quantities of the ingredients and delivers the same to the outlet. A conduction means connected with the outlet directs the quantities of ingredients into the kettle through the top of the latter.

U.S. Pat. No. 3,029,751 to Gilmore discloses a machine for making objects of popped corn comprising, a popped corn hopper and an edible powdered binder hopper. A means is provided for mounting the same to discharge into a mixing hopper defining a mixing space and having a discharge opening at the bottom. The mounting means includes an inclined chute between the popper corn hopper and the mixing hopper. A means is supplied for supplying heat to the chute for heating the popped corn as the same flows therethrough. A forming means below the opening receives the popped corn coated with the binder and compresses the same into the desired shape.

U.S. Pat. No. 3,103,871 to Czulak, et al. discloses an apparatus for adding salt to cheese curd in controlled proportions. The apparatus comprises a conveyor assembly including a conveyor belt, support means carrying the conveyor belt and drive means carried by the support means and operative to move the conveyor belt at a substantially constant speed. A means is operative to feed cheese curd onto the conveyor belt. A beam balance is provided having a rockable beam, means suspending the support means of the conveyor belt from the beam of the beam balance including knife edges at which the load of the conveyor belt is transmitted to the beam to cause rocking of the latter, a balance control weight operatively connected to the beam to resist rockable displacement of the beam. A mixing drum is provided into which cheese curd is fed from the conveyor belt, including a means operative to rotate the mixing drum, and a hopper to hold salt. A stirring device is in the hopper and a star wheel feeding device operates to feed salt from the hopper to the cheese curd in the mixing drum. The star wheel feeding device comprises a cylindrical housing, a rotatable wheel member fitting closely within the housing, an inlet at the top of the housing, an outlet at the bottom of the housing and salt-receiving pockets in the rotatable wheel member. An electric motor rotates the rotatable wheel member in the star wheel feeding device and an electronic control unit controls the speed of the motor and thereby control the rate of feed of salt to the cheese curd, and a variable output transformer connected with the beam so as to be actuated in response to rocking of the latter and having a continuously variable output voltage corresponding to the extent of rocking of the beam. The output voltage is fed to the electronic control unit to continuously control the speed of the motor in accordance with variations in the position of the beam of the beam balance whereby the salt is added to the cheese curd in the mixing drum at a rate substantially proportional to the weight of the cheese curd on the conveyor belt. The conveyor assembly and the means suspending the conveyor is completely supported by the beam of the beam balance.

U.S. Pat. No. 3,120,168 to Lippert discloses control circuitry for a popcorn machine provided with a popping kettle, with a bottom. A popcorn storage container has. an actuatable slide gate providing dispensing means therefore and a fluid seasoning storage receptacle has fluid pump means coupled therewith. A shiftable hinge means swingably mounts the bottom on the kettle for movement from a position closing the kettle to a position clearing the kettle to permit gravitation of popped corn therefrom. The circuitry comprises an electrical heater means adapted to be disposed within the bottom in thermal interchange relationship thereto for heating the bottom and thereby popcorn within the kettle. An electrically responsive dumping means is adapted to be operably coupled with the hinge means for shifting the latter to thereby swing the bottom from the closing position to the clearing position, back to a partially closed, contents-retaining position, and then to the closing position. An electrical thermostat means is adapted to be disposed within the bottom in thermal interchange relationship thereto and operably coupled with the heater means for actuating the heater means when the thermostat means is in a closed position. The thermostat means is actuatable from the closed position thereof to an open position when the bottom is raised to a predetermined elevated temperature;

U.S. Pat. No. 3,140,952 to Cretors discloses a method of dispersing popcorn seasoning salt in a slurry comprising unpopped popcorn and cooking oil. The method includes the steps of mixing the salt with an edible higher fatty acid glyceride to produce a uniform mixture and tableting the mixture to form discrete pellets measuring a quantity of the pellets and adding them to the slurry to disperse the salt therein.

U.S. Pat. No. 3,253,532 to Jones discloses an apparatus for the automatic popping of popcorn including a housing, a basket supported for rotation in the housing. The housing has an inlet for unpopped corn and a discharge opening for popped corn. A supply bin is provided for unpopped corn and a transfer means transmits unpopped corn from the supply bin to the basket. A metering means discharges a measured quantity of unpopped corn to the transfer means. A product hopper is located relative to the basket so that popped corn can move into the hopper by the discharge action of gravity. A means below the product hopper discharges a metered quantity of product. A means forming a passage has a product receiving opening on one side and a product discharging opening on another side. Spaced longitudinally, a plunger in the passage is movable to close the product receiving opening in the hopper. A gate is pivotally mounted at a fixed point in the passage between the openings and is movable from a first position to a second position in the passage. In the first position, the gate is spaced from the plunger in its retracted position to define a receiving chamber for a product. A power means is adapted to move the plunger, and a metered quantity of product against the gate to shift the gate to a second position to allow the product to pass the gate and through the product discharge opening in the passage to a dispensing station.

U.S. Pat. No. 3,253,747 to Thomas discloses an automatic popcorn machines and, more particularly, to an apparatus for dispensing a measured amount of a granular seasoning material into the popping kettle of such a machine.

U.S. Pat. No. 3,254,800 to Baunach discloses an automatic corn popping machine of the type for use in establishments such as theaters, places of public recreation such as zoos and parks and other places where large volumes of popcorn are sold during the course of a day.

U.S. Pat. No. 3,282,470 to Thomas discloses an automatic popcorn machines and, more particularly, to apparatus for dispensing a measured amount of a granular seasoning material into the popping kettle of such a machine.

U.S. Pat. No. 3,294,546 to Fingerhut discloses an improved method and apparatus for popping corn that is especially adapted for use in public or semi-public locations and embodies automatic features which allow the corn to be popped in a continuous manner requiring a minimum of an operators time while providing increased operating efficiency and an improved yield of quality product U.S. Pat. No. 3,512,989 to Smith discloses a continuous popping apparatus including two successive heating stages including a pre-heating section, in which the material to be popped is heated to a temperature just below the temperature required for popping, and a popping section, in which the food to be popped is heated to a temperature above that required for popping. The material to be popped is continuously and positively moved through the pre-heating and the popping sections while hot gas is applied thereto to assure uniform heating.

U.S. Pat. No. 3,697,289 to Day, et al. discloses a method for automatically popping corn in a heated seasoning oil. Raw corn is fed by an air conveyor to a hopper above the popcorn popping pot, and an air current is used for injecting a charge of corn and salt into the pot. Seasoning oil is metered into the pot by an adjustable valve providing precise volume measurement. The pot remains closed throughout a series of popping cycles. A vacuum is created in the pot during the popping cycle to prevent effluent from discharging into the display case and to draw it into the condenser.

U.S. Pat. No. 3,783,820 to Hautly, et al. discloses a popcorn flavoring and dispensing apparatus, comprising a hopper for popped popcorn, an opening in the bottom of the hopper, a valve in the opening to control dispensing of popcorn through the opening, and a spray nozzle closely adjacent the opening to spray liquid butter or other flavoring uniformly and positively onto the popped popcorn as it is dispensed through the opening U.S. Pat. No. 3,812,774 to Day, et al. discloses a method and apparatus for automatically popping corn in heated seasoning oil. Raw corn is fed by an air conveyor to a hopper above the popping pot, and an air current is used for injecting a charge of corn and salt into the pot. Seasoning oil is metered into the pot by an adjustable valve providing precise volume measurement. The oil supply is delivered to the metering valve by a pump in an oil vat and with a heater adapted to melt the seasoning adjacent the pump intake, and melt along a telescoping feed tube to prevent pump cavitation. Electronic sensors in the corn and oil supply signal a control circuit for supplies refill as required. A rotary valve disc in the pot is mechanically interlocked with switching circuits of the control system to correlate corn and salt input into the pot, cooking, steam discharge to a condenser, and air discharge of popped corn to a display area. A deflector plate in the air stream into the pot directs the air into a path for optimum corn evacuation through a discharge tube opening downwardly inside the pot. The pot remains closed throughout a series of popping cycles for cleanliness, convenience, and safety. An agitator in the pot is formed in a configuration drawing the popped corn radially inwardly for evacuation into the discharge opening. A self-cleaning condenser is adapted to condense steam and waste oil exiting from the pot and a steam condensate trap is provided in a modified form. A venturi formed at the condenser outlet and communicating with a blower is adapted to create a vacuum in the pot during the popping cycle to prevent effluent from discharging into the display case and to draw it into the condenser. A spring-load agitator drive shaft releasably interlocks with a corresponding socket in the agitator base affording easy opening and closing of the pot by pivotal movement of the agitator and hot plate. "Old maids" in the discharge of popped corn from the pot are trapped and separated therefrom for removal through a chute in one form, or through a screen in the bottom of the display case in another form.

U.S. Pat. No. 4,166,208 to Martel, et al. discloses a microwave corn popper having means for dispensing butter during or shortly subsequent to the corn popping process, and comprising a chamber containing the corn kernels to be popped and having a cover with a recess in which is disposed a butter container, whereby the butter in the container is heated by the same microwave source as the kernels and consequently is melted during the popping process.

U.S. Pat. No. 4,171,667 to Miller, et al. discloses a popcorn vending apparatus including a hot air cooker assembly, an elevator type supply assembly for furnishing raw kernels to the cooker, a cup dispenser, a dispenser including a pump for withdrawing butter flavoring from its original container and dispensing to the vended container of popcorn, and a salt dispenser for delivering tubes of salt to the purchaser. The cooker includes a transparent receptacle tiltable from a cooking position to a dispensing position; and a chute assembly for delivering both the cups and cooked popcorn to a delivery station including means for preventing unauthorized access to the interior of the apparatus housing.

U.S. Pat. No. 4,828,146 to Stein discloses an apparatus for dispensing warm liquid food which comprises an insulating housing, heating coils for providing heat inside the housing, a supply tank for holding a predetermined amount of liquid food, the supply tank being located inside the housing and preferably including an agitator therein. Flexible tubing is provided for directing the heated supply of liquid food to a control valve and further to a dispensing nozzle. The control valve opens to allow a predetermined amount of liquid food from the pressurized tank to the dispensing nozzle to discharge the predetermined amount of food.

U.S. Pat. No. 5,065,927 to Wahl discloses an apparatus for dispensing melted butter into a container of popcorn having a mechanism in which the melted butter will be sprayed evenly throughout the popcorn.

U.S. Pat. No. 5,309,825 to Pinone discloses a vending popcorn machine for measuring out a metered amount of popcorn, cooking the popcorn fresh in the machine, and dispensing the freshly cooked popcorn into a manually positioned cup in the front of the machine. The vending machine includes a sealed, slidable dispensing mechanism that keeps the popcorn fresh at all times in its raw kernel reservoir, preventing moisture from escaping. The device also includes a liquid flavoring dispenser that is optional and that can allow for uniform distribution of a liquid flavoring on top of the freshly cooked corn.

U.S. Pat. No. 5,419,238 to Pinone discloses a popcorn machine for measuring a metered amount of popcorn, cooking the popcorn fresh in the machine, and dispensing the freshly cooked popcorn into a manually positioned cup in the front of the machine. The machine includes a sealed, slidable dispensing mechanism that keeps the popcorn fresh at all times in its uncooked kernel reservoir preventing moisture from escaping. The device also includes at least one optional liquid flavoring dispenser that allows for uniform distribution of liquid flavorings on top of the freshly cooked popcorn U.S. Pat. No. 5,657,684 to Chaikowsky discloses a popcorn vending apparatus including a cup dispenser for dispensing a cup in an area accessible by a purchaser, a cooker assembly for cooking corn kernels and dispensing the cooked kernels to a cup in the purchaser accessible area, and a corn dispenser for dispensing a measured quantity of corn to the cooker. The dispenser includes a hopper and a transporting mechanism for transporting measured quantities of corn from the hopper to the cooker. The transport mechanism includes a tubular member and a rotatable open spiral in the tubular member. The transporting mechanism includes a precision drive which is capable of rotating the open spira a predetermined number of revolutions. There is also a flavor dispenser for dispensing flavoring in a cup in the purchaser accessible area. The flavor dispenser includes a dispensing head and a support for moving the head over a cup in the dispensing area.

U.S. Pat. No. 6,187,353 to Wyman, et al. discloses a hot air popcorn machine including a programmable control system for precisely controlling various operating parameters including air flow and air temperature to enable the machine to consistently produce high quality popcorn in a low maintenance environment, e.g., a free-standing vending machine.

U.S. Pat. No. 7,082,891 to Watson discloses a food product flavoring apparatus including a receptacle having a dispensing base, nozzles positioned above the dispensing base, and a vessel holding a liquid flavoring. The liquid flavoring is delivered from the vessel to the nozzles via a conduit and a pump. The liquid flavoring is sprayed from the nozzles and uniformly covers a food product, such as popcorn, lying on the dispensing base. Following application of the liquid flavoring, vanes of the dispensing base are adjusted such that the flavored popcorn is released through the dispensing base. The popcorn is subsequently funneled through a hopper positioned below the dispensing base and into a container.

U.S. Pat. No. 8,276,504 to Korin discloses a popcorn making machine including a main unit comprising a fan pumping air into a chamber, enclosing a heater and a bowl. The bowl has sidewalls tapered downwardly with mini-nozzles attached thereto. Hot airflows are introduced from the chamber through the mini-nozzles into the bowl tangentially to its inner surface, forming a main hot airflow circulation. A central nozzle is mounted at the bowl's bottom, including slots, introducing additional airflows, tangential to the nozzle's surface, from the chamber into the bowl, forming an additional hot airflow circulation surrounding the nozzle, co-directed with the main circulation.

The main unit comprises a receptacle collecting popcorn coming from the bowl. The claimed machine optionally includes a coater unit for coating popcorn with oil, salt, etc., and a compact cabinet enclosing the main and coater units. The above design provides for a fast and essentially even heating of corn kernels for efficient popping thereof.

U.S. Pat. No. 8,464,634 to Cretors, et al. discloses popcorn machines having topping dispensing systems. A popcorn machine configured in accordance with an embodiment of the disclosure includes a popping kettle or other popping apparatus positioned in a cabinet. The popping apparatus is configured to heat un-popped corn kernels and pop the corn kernels. After popping, the corn is held in the cabinet. The popcorn machine of this embodiment further includes a topping outlet positioned in the cabinet and a topping pump. The topping outlet is operably connectable to a topping container, and the topping pump is configured to move topping from the topping container through the topping outlet and onto a serving portion of popcorn in response to operator activation of the pump.

United States Patent Application 2011/0027434 to Cretors discloses an apparatus for cooking, mixing, and dispensing candy popcorn, and various methods of manufacture and use. A vessel with a copper interior surface includes an agitator positioned at the bottom of the vessel. The agitator comprises a member that rotates around the bottom of the vessel to move the contents of the vessel. An auger with a helical surface is positioned in the vessel and is configured to rotate to mix popped popcorn with a candy mixture that has been cooked in the vessel. The vessel can be tilted manually or automatically to dispense the contents of the vessel.

United States Patent Application 2014/0251155 to Jacobsen, et al. discloses a popcorn vending machine, comprising a kernel holding chamber configured to store and dispense kernels, a beating chamber comprising an inlet configured to receive kernels from the kernel holding chamber, a microwave emitter configured to produce microwave energy within the heating chamber and heat the kernels, a single-mode resonant microwave applicator configured to generate a stable focused high intensity microwave region within the heating chamber. At least one air blower is provided disposed in communication with the heating chamber, wherein the air blower is configured to blow air into the heating chamber, thereby moving kernels within the heating chamber and selectively removing popped flakes from the high intensity microwave region when popped. A beating chamber outlet is connected to the heating chamber for receiving popped flakes from the heating chamber and dispensing the popped flakes into a container.

Although the aforementioned prior art have contributed to the development of the art of popped corn devices, none of these prior art patents have solved the needs of this art.

Therefore, it is an object of the present invention to provide an improved popped corn apparatus.

Another object of this invention is to provide an improved popped corn apparatus that evenly adds seasonings to the popped corn.

Another object of this invention is to provide an improved popped corn apparatus that provides for the inclusion of several types of seasonings.

Another object of this invention is to provide an improved popped corn apparatus that provides dispenses several differing measured quantities of popped corn.

Another object of this invention is to provide an improved popped corn apparatus that is easy to cost effectively produce.

Another object is to provide an apparatus that dispenses seasonings more directly into the popcorn container to keep the popped corn apparatus clean.

The foregoing has outlined some of the more pertinent objects of the present invention. These objects should be construed as being merely illustrative of some of the more prominent features and applications of the invention. Many other beneficial results can be obtained by modifying the invention within the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of summarizing the invention, the invention relates to an improved device for flavoring and or heating a consumable substance. The consumable substance is flavored by an edible substance. The consumable substance is dispensed into a container. The device comprises a body extending between an upper body end and a lower body end. An input aperture is proximal to the upper body end for receiving the consumable substance. A housing defining a housing chamber is below the input aperture for temporarily holding the consumable substance. A closure is pivotably coupled to the housing for dispensing the consumable substance from the housing. A flavor dispenser dispenses the edible substance below the closure and engages the consumable substance. An output aperture is proximal to the lower end for dispensing the consumable substance into the container.

In another embodiment of the invention, the device flavors and heats popcorn. The popcorn is heated by a heated airflow. A heating element produces the heated airflow and dispenses the heated airflow into the housing for heating the popcorn.

In a more specific embodiment of the invention, a loading hopper defines a loading chamber. A hopper pivot pivotably couples the loading hopper to the body for positioning the loading hopper between an exterior position and an interior position. The exterior position positions the loading hopper in an upright position for loading the popcorn into the loading chamber of the loading hopper. The interior position positions the loading hopper in an inverted position for pouring the popcorn from the loading chamber and into the housing.

In a more specific embodiment of the invention, the closure includes a closure plate including an upper closure surface, a lower closure surface, a pivoting edge, a distal edge, a primary side edge and a secondary side edge. A closure pivot pivotably couples the pivoting edge of the closure plate to the housing. A dispensing motor is coupled to the closure for reciprocating the closure between a generally closed position and an generally open position relative to lower housing aperture for dispensing the popcorn from the housing and into the container. The distal edge, the primary side edge and the secondary side edge define a general sheet of popcorn dispensing from closure and ascending into the container for uniformly covering the popcorn.

The invention further relates to a dispensing device removably coupled to a support. The dispensing device discharges an edible substance for flavoring a consumable good. The dispensing device comprises a reservoir extending between an upper reservoir end, a lower reservoir end and defines a reservoir chamber for storing the edible substance. An output aperture is in the lower reservoir end. A primary descending duct is coupled to the output aperture for receiving the edible substance. A secondary descending duct is coupled to the primary descending duct for receiving the edible substance. A terminal end is in the secondary descending duct. A plurality of apertures are in the secondary descending duct for discharging the edible substance and engaging the consumable good. An upper demountable link couples the reservoir to the support for permitting engagement and disengagement of the reservoir relative to the support. A lower demountable link couples the secondary descending duct to the support for permitting engagement and disengagement of the reservoir relative to the support. A drive is coupled to the lower demountable link producing a vibration through the lower demountable link, the secondary descending duct, the primary descending duct and the reservoir for channeling the edible substance from the reservoir through the primary descending duct, the secondary descending duct and discharging from the plurality of apertures.

The foregoing has outlined rather broadly the more pertinent and important features of the present invention in order that the detailed description that follows may be better understood so that the present contribution to the art can be more fully appreciated. Additional features of the invention will be described hereinafer which form the subject of the claims of the invention. It should be appreciated by those skilled in the an that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which:

FIG. 19 is a top view of FIG. 18;

FIG. 20 is a sectional view along line 20-20 in FIG. 19;

FIG. 21 is a sectional view along line 21-21 in FIG. 19;

FIG. 34 is a sectional view along line 34-34 in FIG. 29;

FIG. 35 is a sectional view along line 35-35 in FIG. 31;

FIG. 36 is an enlarged portion of FIG. 34 illustrating a liquid dispenser manifold;

FIG. 37 is an upper isometric view of a dispensing device for discharging an edible substance incorporating the present invention;

FIG. 38 is a similar view to FIG. 37 illustrating a first reservoir and a second reservoir, FIG. 39 is a right side view of the drive in FIG. 37;

FIG. 40 is a rear view of the drive in FIG. 37 illustrating a first drive shaft and a second drive shaft;

FIG. 53 is a view similar to FIG. 6 illustrating a first step for utilizing the device wherein a heating element is producing a heated airflow into the housing;

FIG. 54 is an elevational view of FIG. 53 with portions of the body removed illustrating the heating element producing the heated airflow traveling from the housing and into the container before dispensing popcorn into the container;

FIG. 55 is a view similar to FIG. 12 illustrating a second step for utilizing the device wherein popcorn is positioned into the loading hopper;

FIG. 56 is a view similar to FIG. 55 illustrating a third step for utilizing the device wherein the loading hopper is pivoted into an inverted position for pouring the popcorn into the housing;

FIG. 57 is a view similar to FIG. 13 illustrating a fourth step for utilizing the device wherein the electronic controls are selected for choosing the types and amount of flavoring to be added to the popcorn;

FIG. 58 is a view similar to FIG. 25 illustrating a fifth step for utilizing the device wherein heating element increase the temperature and velocity of the heated airflow for superheating the popcorn within the housing;

FIG. 59 is an enlarged portion of FIG. 58 illustrating the closure maintaining the popcorn within the housing;

FIG. 65 is a view similar to FIG. 61 illustrating an eighth step for utilizing the device wherein after the container is filled with popcorn the closure is terminated from pivoting for terminating dispensing of popcorn from the housing;

FIG. 66 is an enlarged portion of FIG. 65 illustrating the closure maintaining the popcorn within the housing;

FIG. 67 is a view similar to FIG. 32 illustrating a ninth step for utilizing the device wherein the base support slidably engaging along the base guide for permitting the container to be lowered from the flavoring channel and permitting the container to be withdrawn from the device;

FIG. 74 is a right side view of FIG. 72;

FIG. 75 is a rear view of FIG. 72;

FIG. 86 is a sectional view along line 86-86 in FIG. 80;

FIG. 87 is a sectional view along line 87-87 in FIG. 81; and

Similar reference characters refer to similar parts throughout the several Figures of the drawings.

DETAILED DISCUSSION

Figure 2:
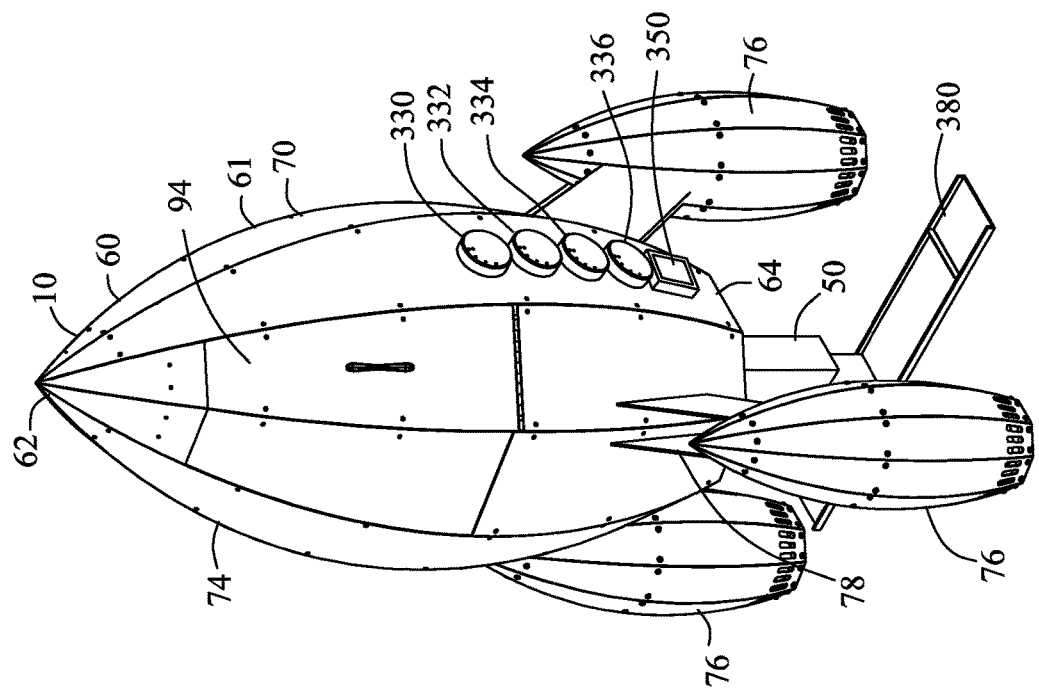
FIG. 2 is a front upper isometric view of FIG. 1.
Figure 1:
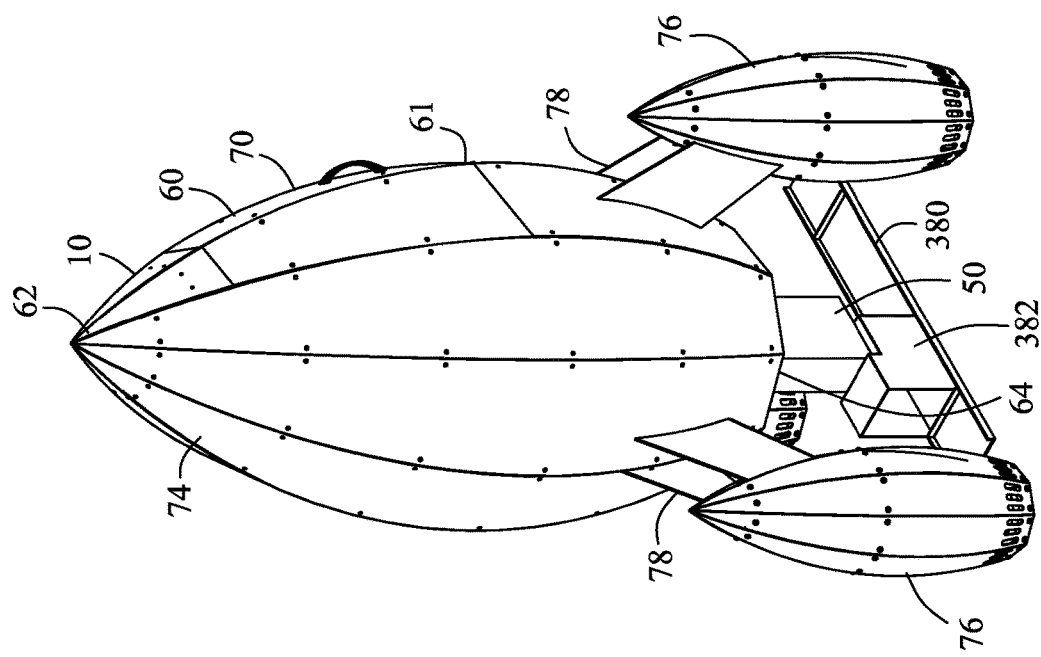
FIG. 1 is rear upper isometric view of a device for flavoring and or heating a consumable substance incorporating the present invention.
Figure 3:
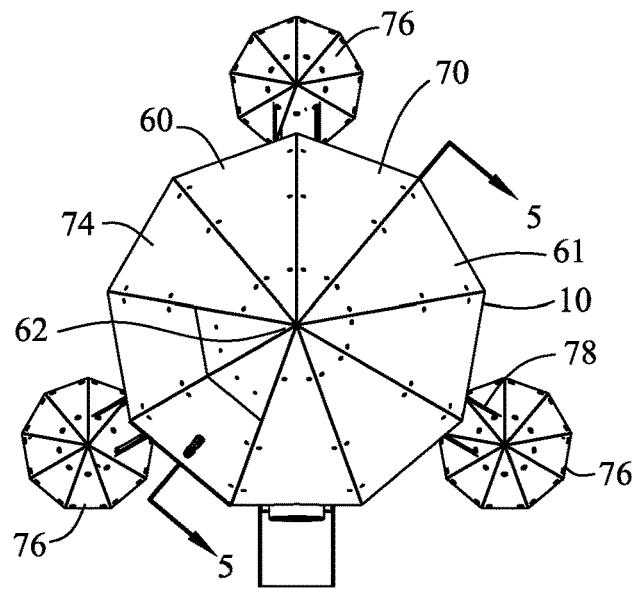
FIG. 3 is a top view of FIG. 2.
Figure 4:
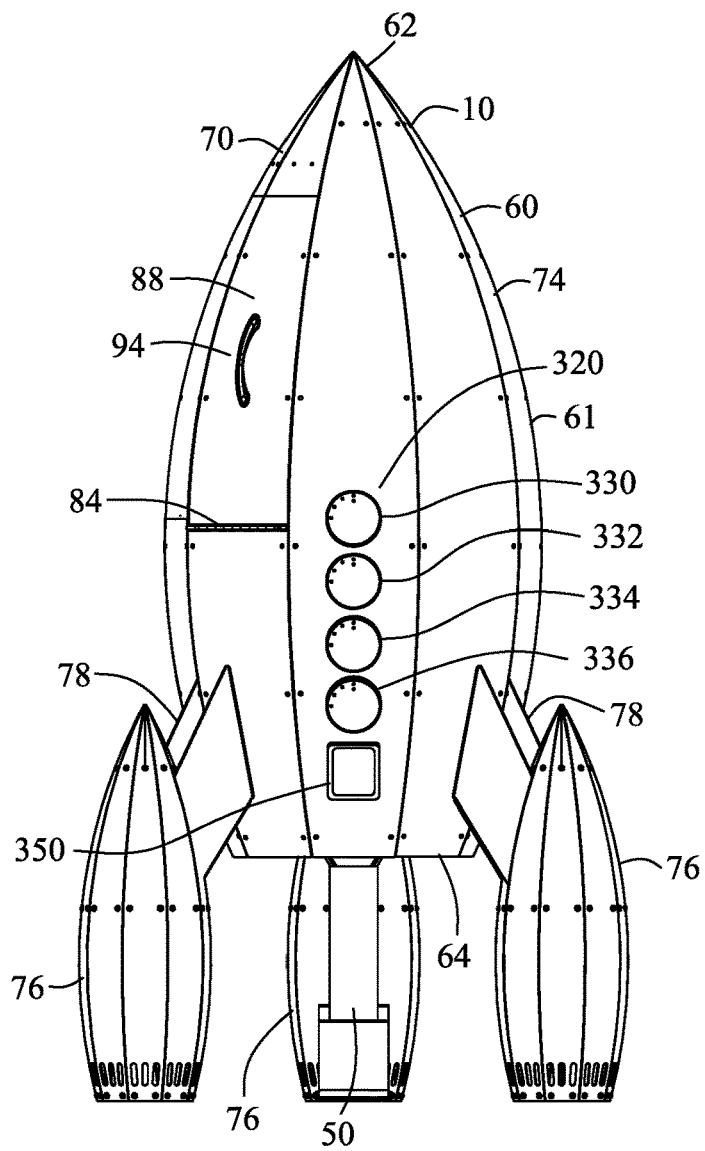
FIG. 4 is a front view of FIG. 2.
Figure 5:
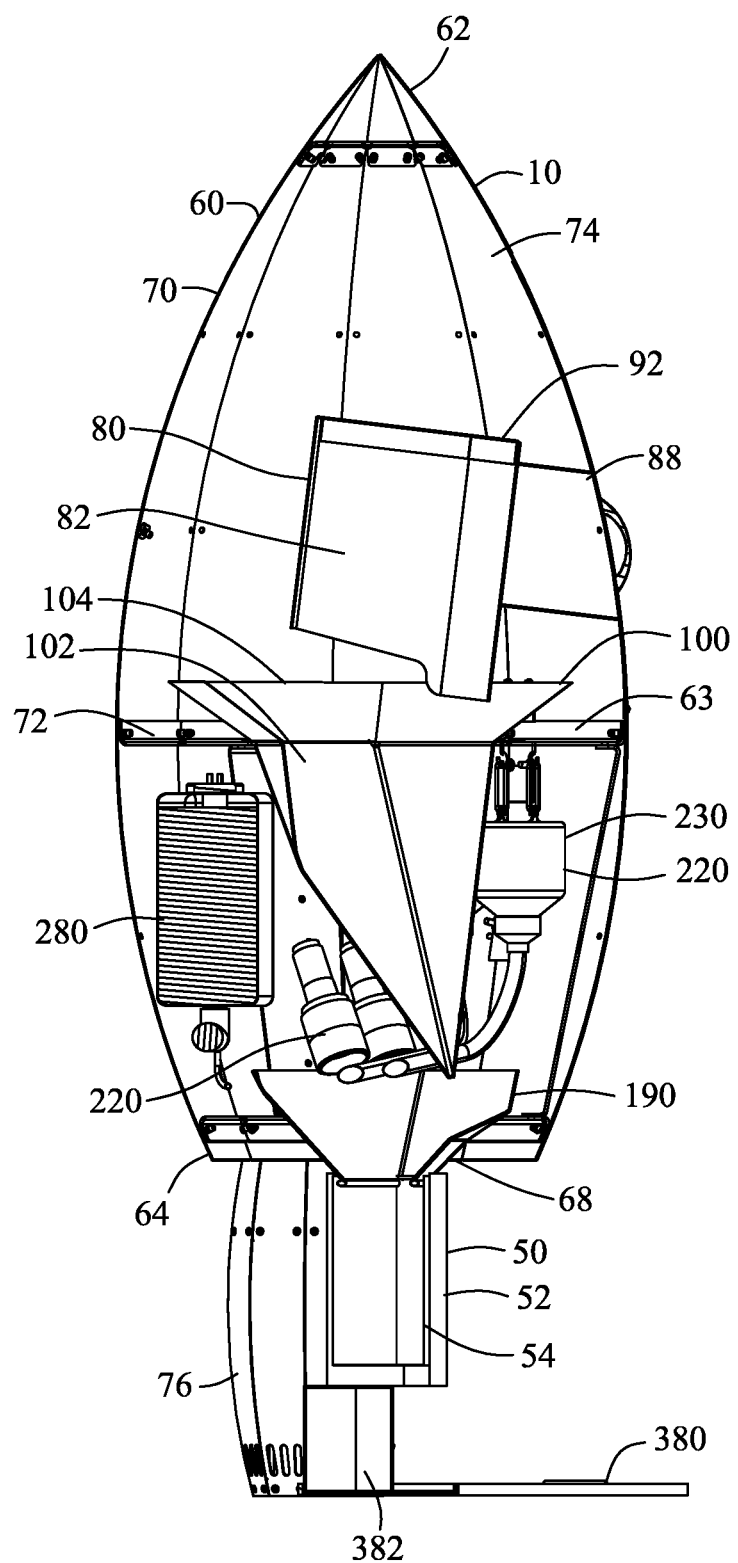
FIG. 5 is a sectional view along line 5-5 in FIG. 3.
Figure 7:
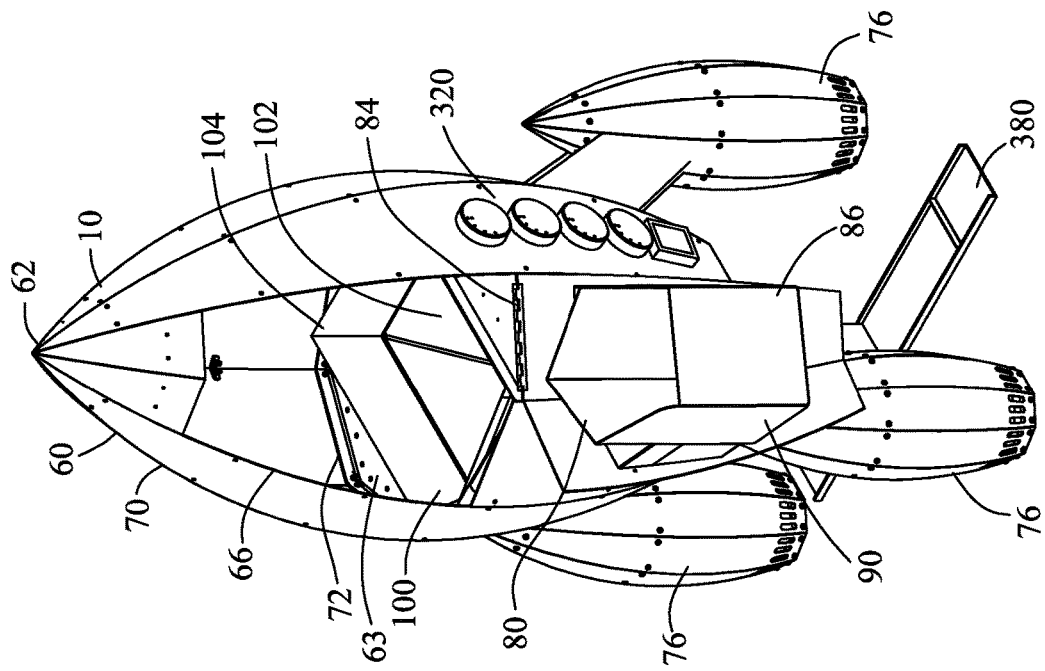
FIG. 7 is a view similar to FIG. 2, illustrating the loading hopper in the upright position for loading the popcorn into the loading hopper.
Figure 6:
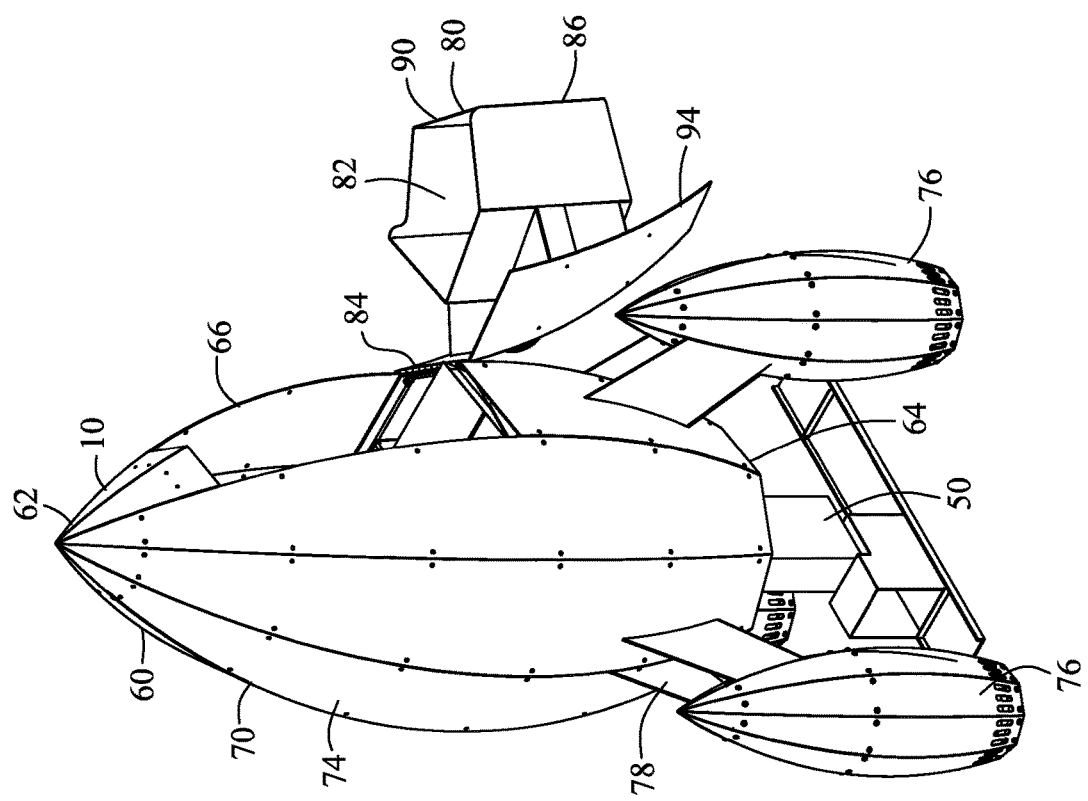
FIG. 6 is a view similar to FIG. 1, illustrating a loading hopper in an upright position for loading the popcorn into the loading hopper.
Figure 8:
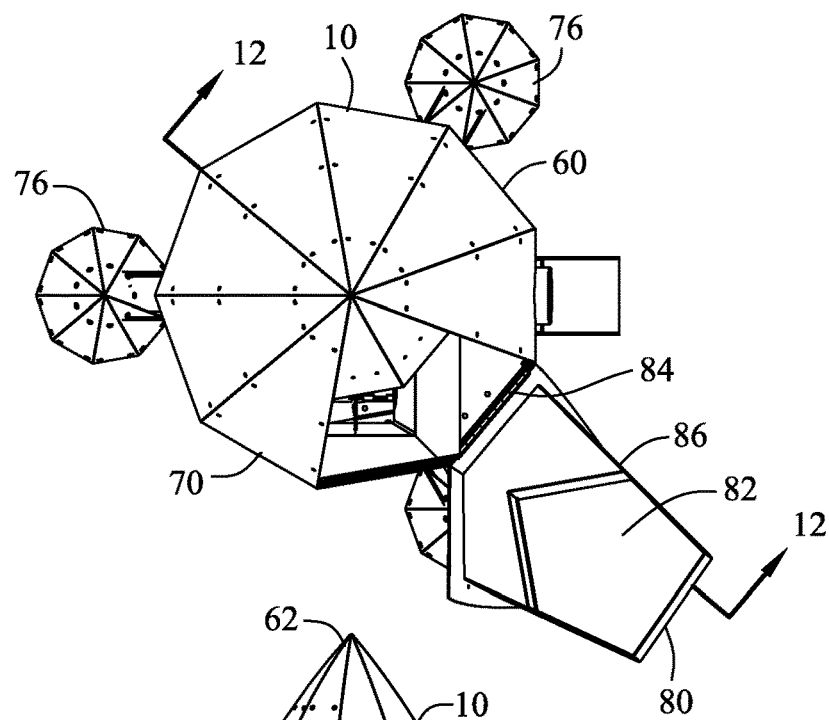
FIG. 8 is a view similar to FIG. 3, illustrating the loading hopper in the upright position for loading the popcorn into the loading hopper.
Figure 9:
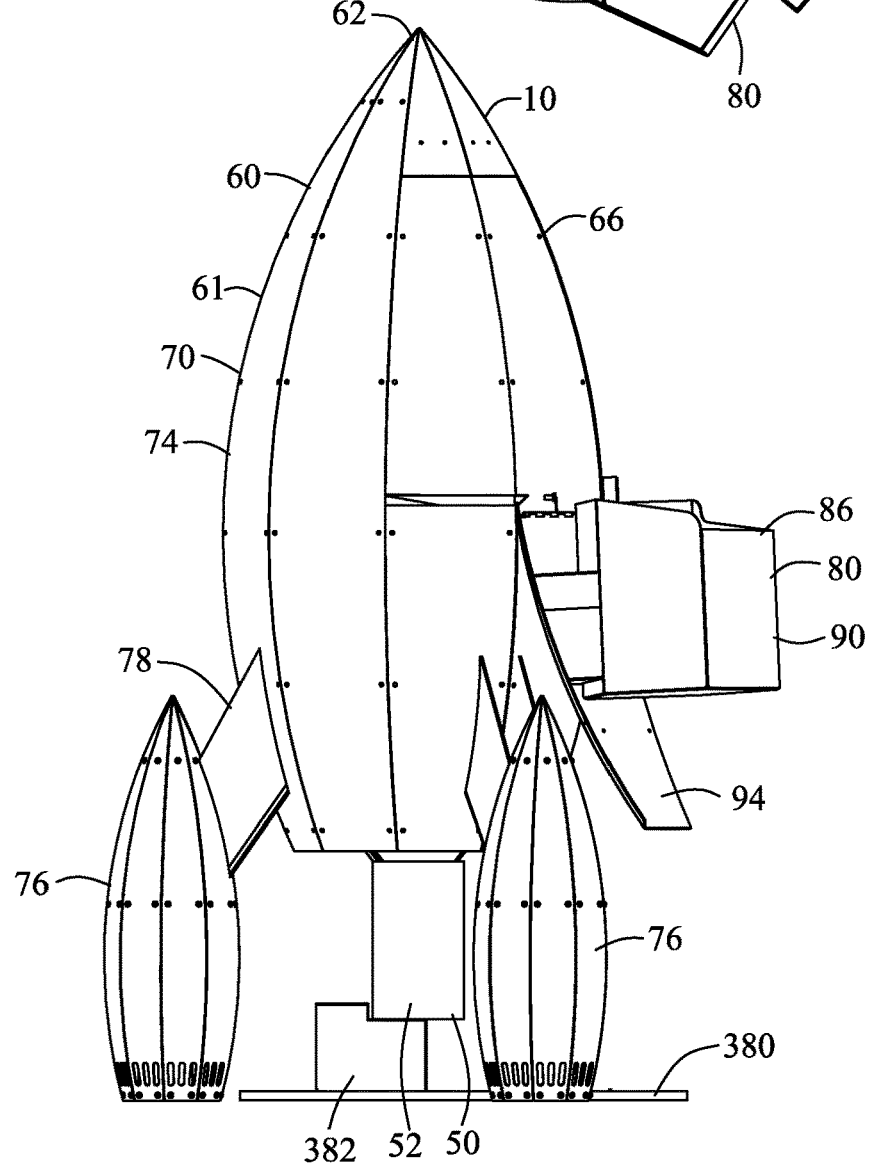
FIG. 9 is a front view of FIG. 8.
Figure 11:
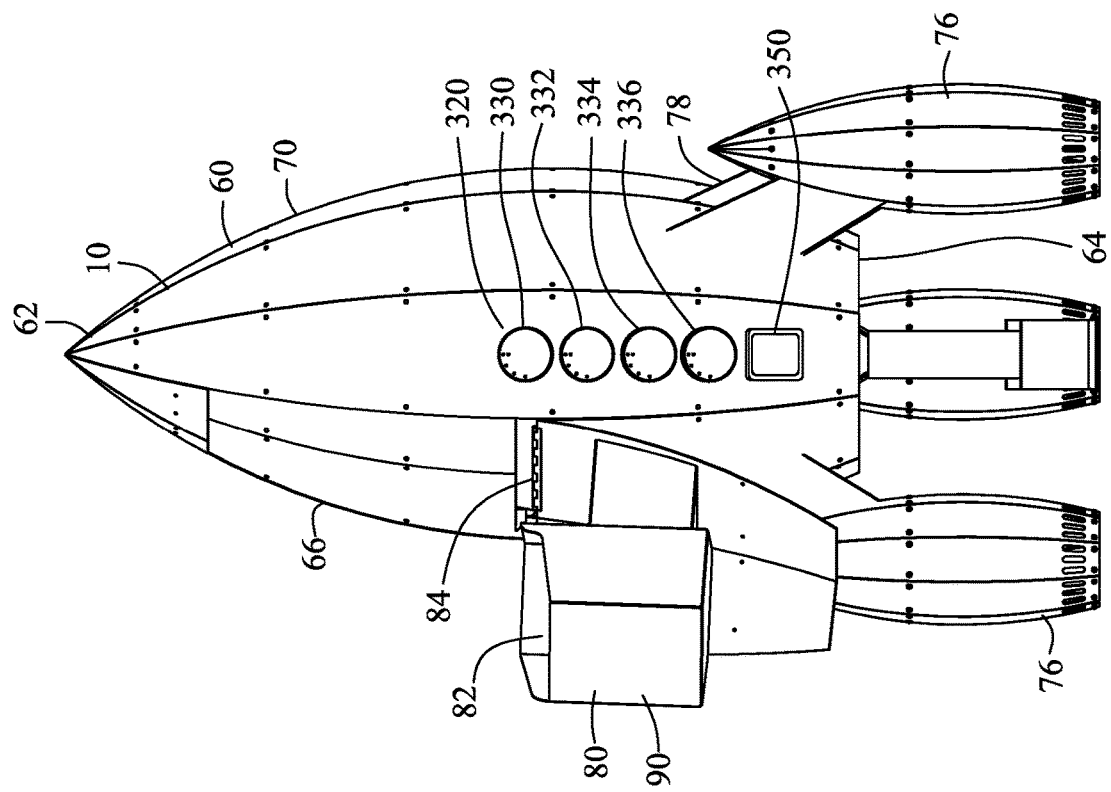
FIG. 11 is a right side view of FIG. 9.
Figure 10:
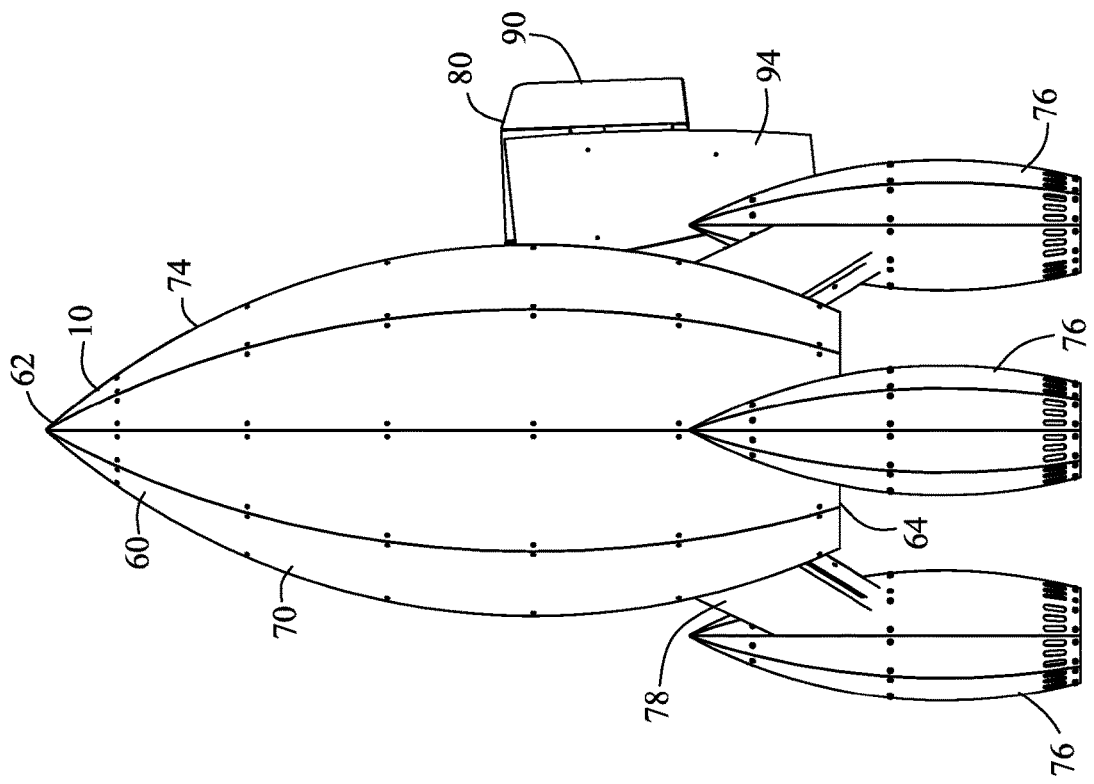
FIG. 10 is a left side view of FIG. 9.
Figure 12:
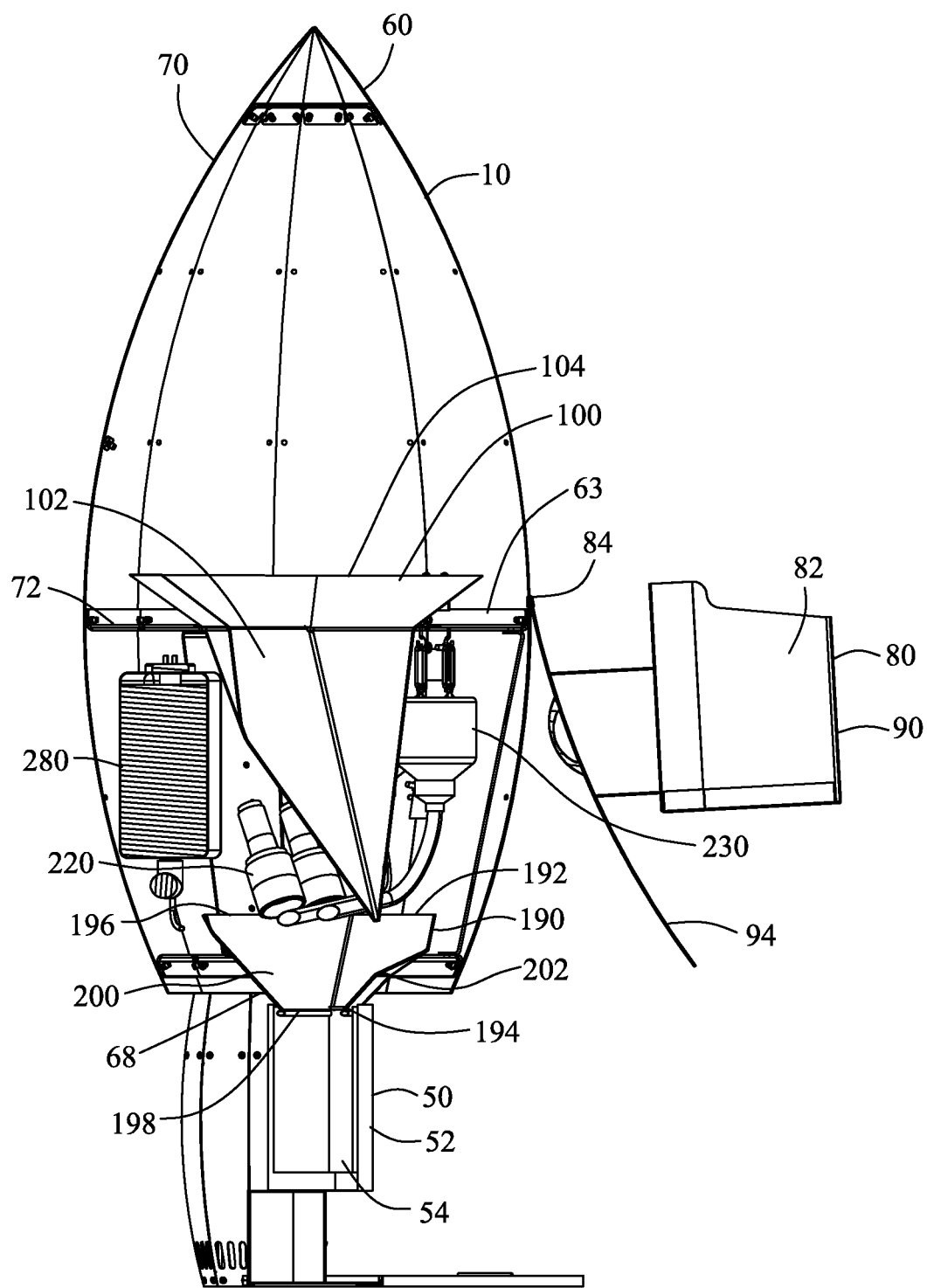
FIG. 12 is a sectional view along line 12-12 in FIG. 8.
Figure 13:
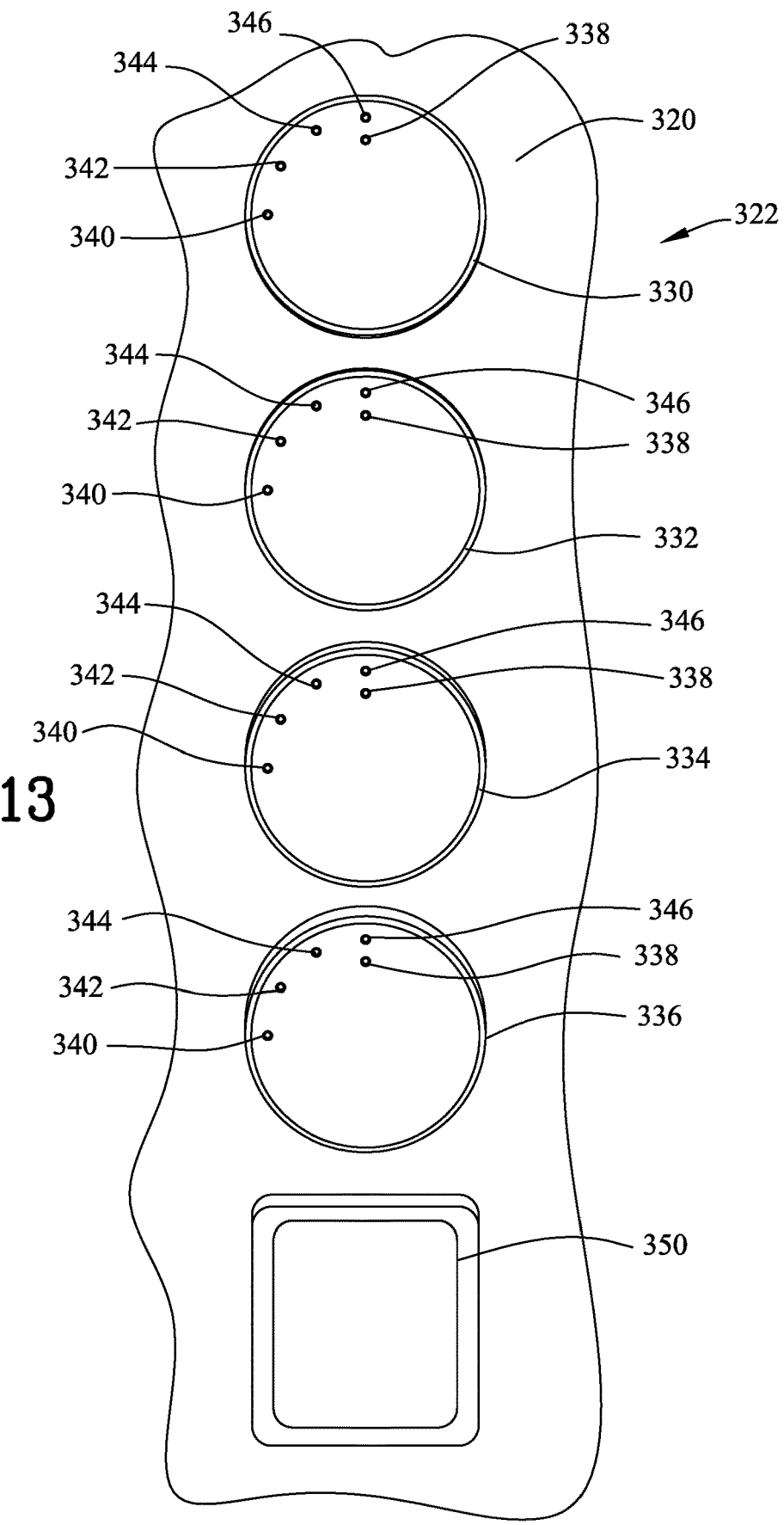
FIG. 13 is an enlarged portion of FIG. 11 illustrating a plurality of electronic controls for operating the device.
Figure 14:
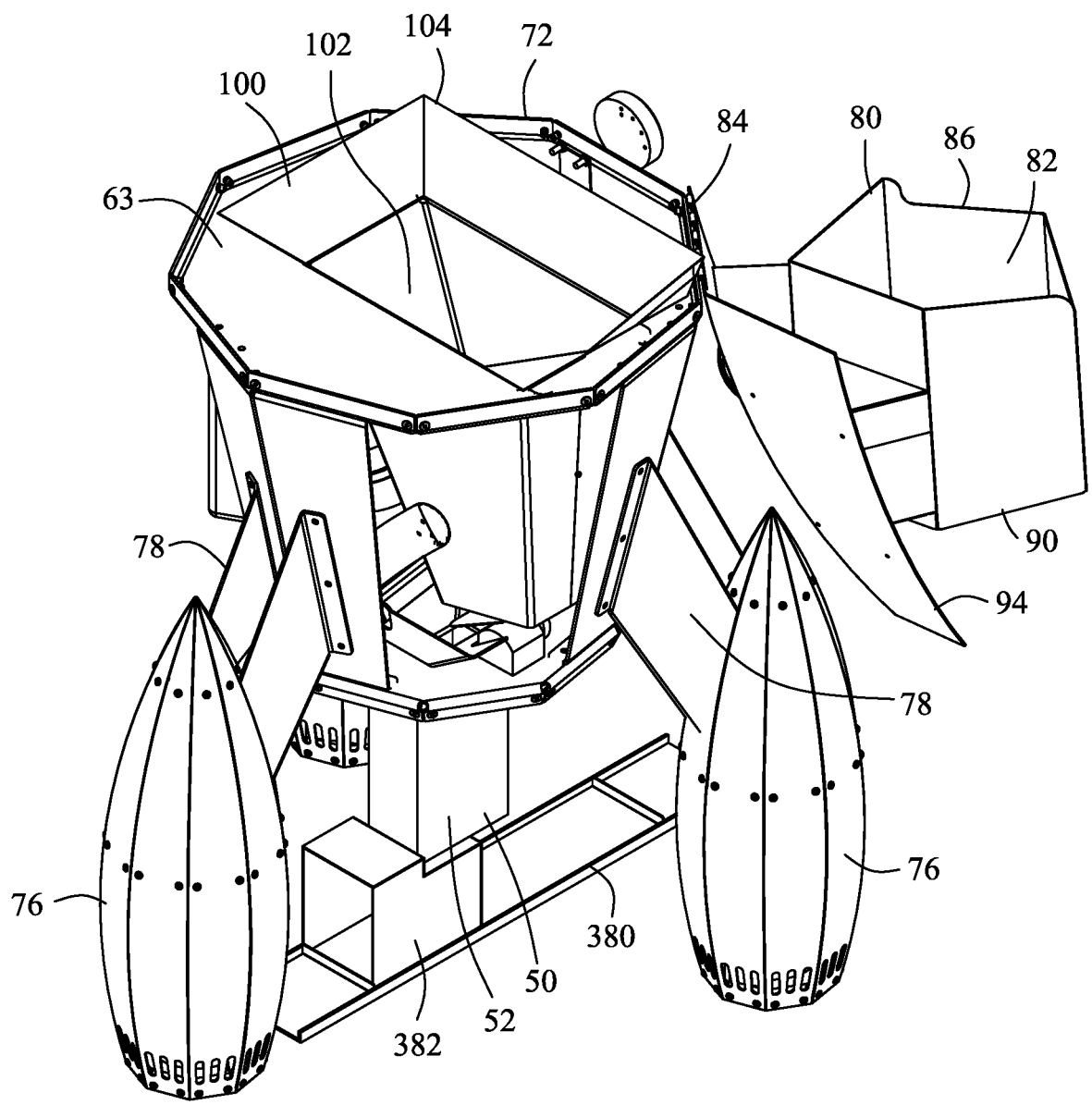
FIG. 14 is an enlarged view of FIG. 6 with portions of the body removed.
Figure 15:
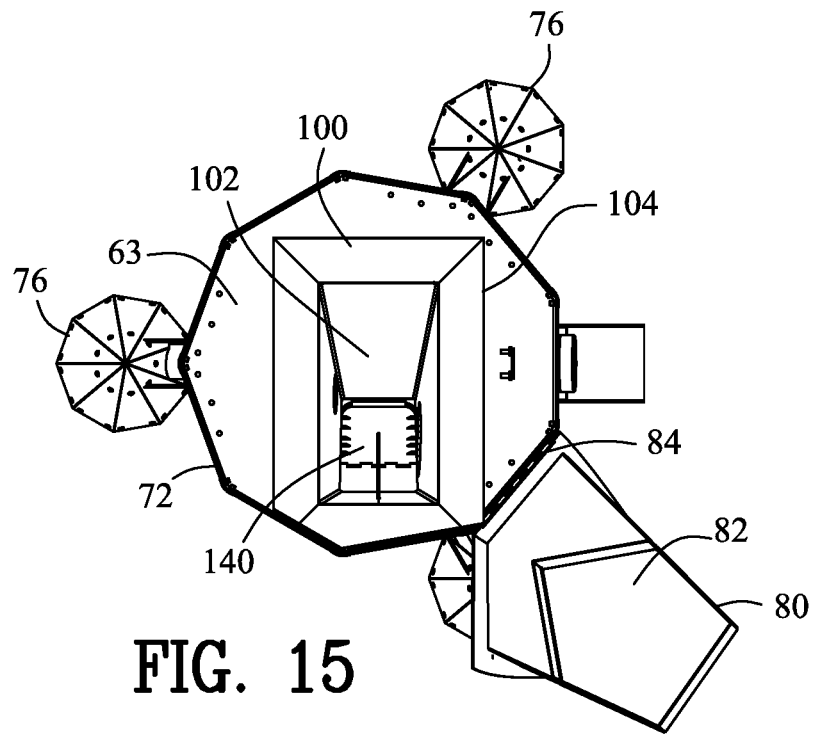
FIG. 15 is a top view of FIG. 14.
Figure 16:
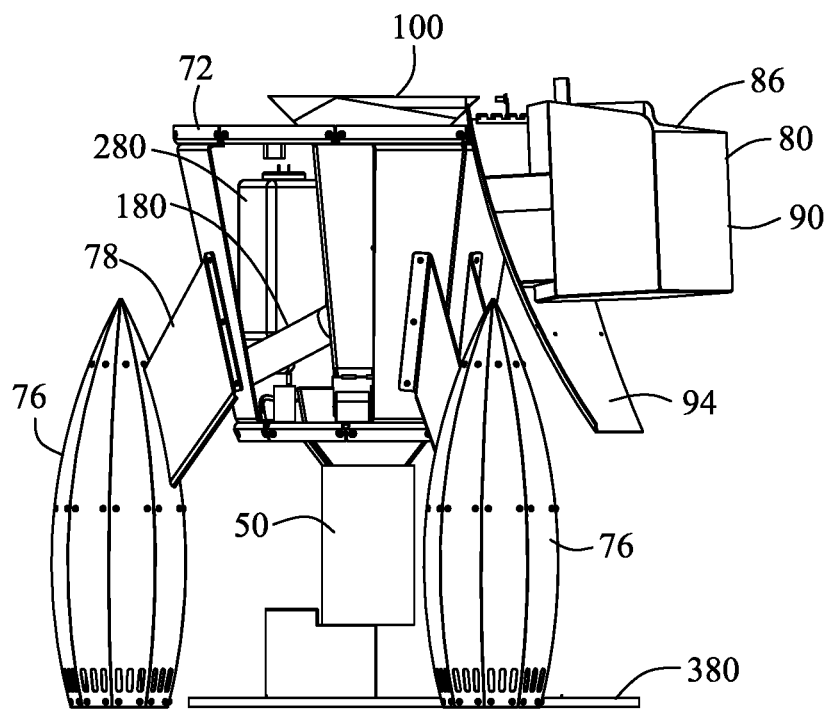
FIG. 16 is a front view of FIG. 15.
Figure 17:
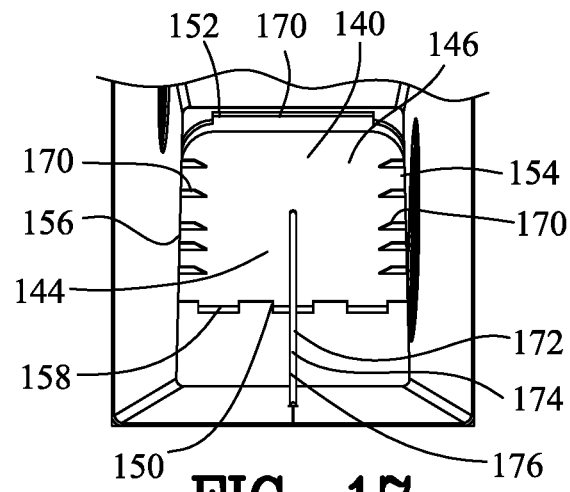
FIG. 17 is an enlarged portion of FIG. 15 illustrating a closure pivotably coupled to the housing.
Figure 18:
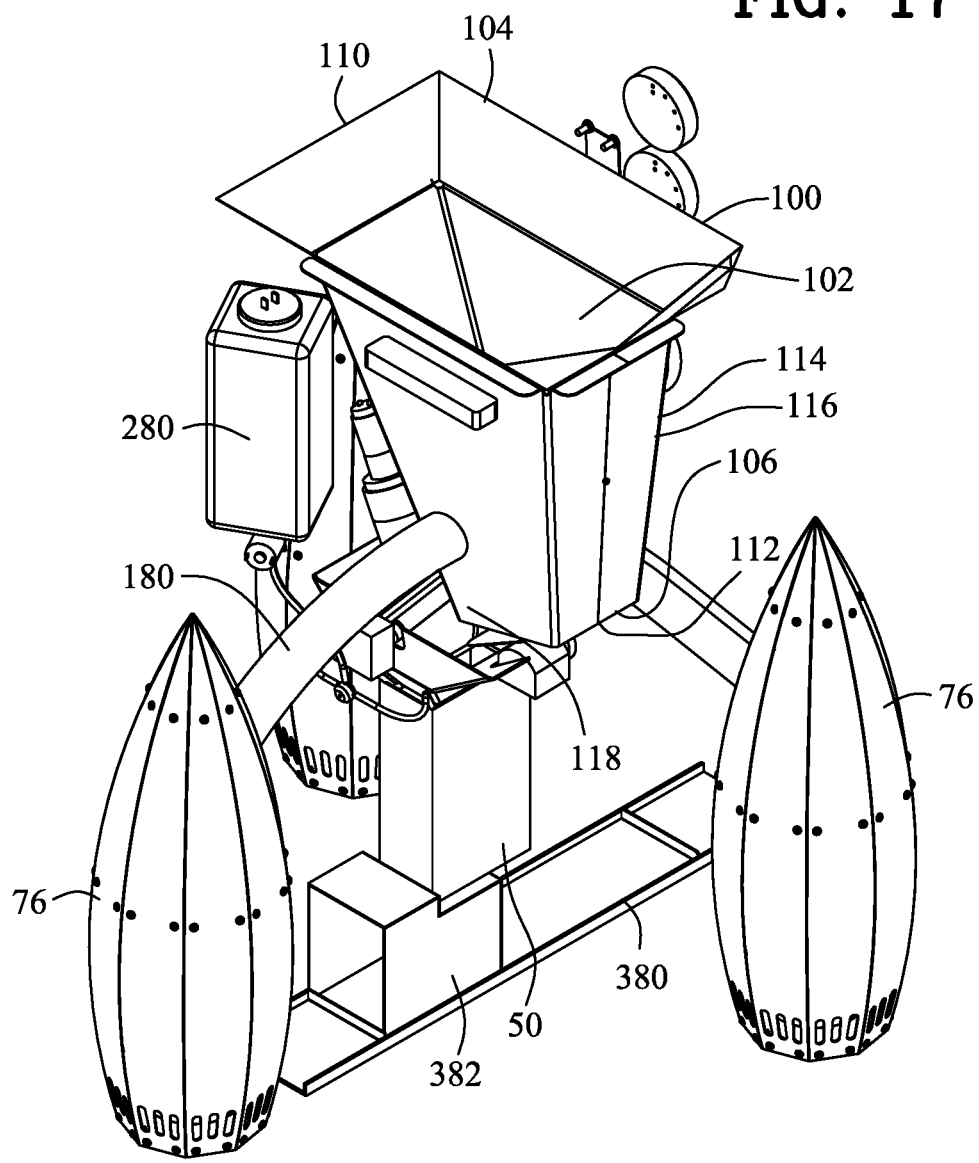
FIG. 18 is a similar view of FIG. 14 with further portions of the body removed.
Figure 22:
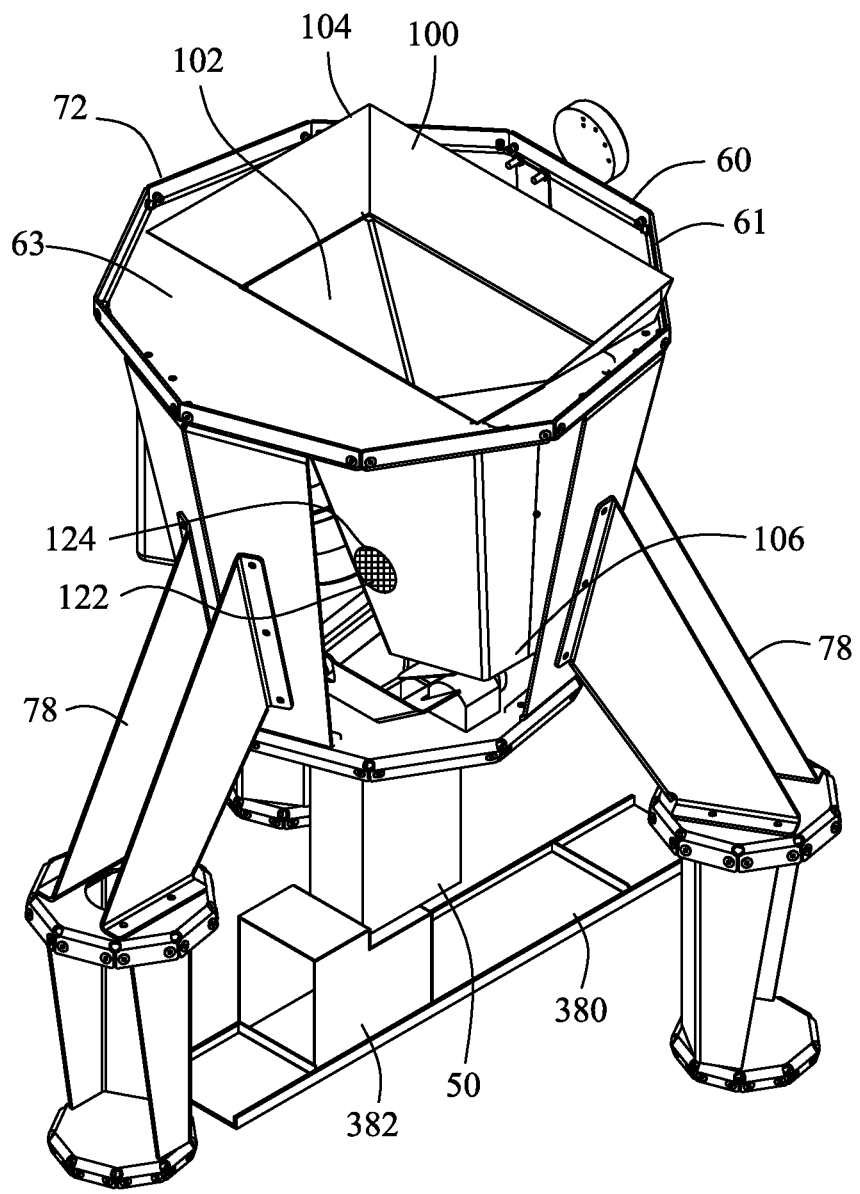
FIG. 22 is a is a similar view of FIG. 14 with further portions of the body removed.
Figure 23:
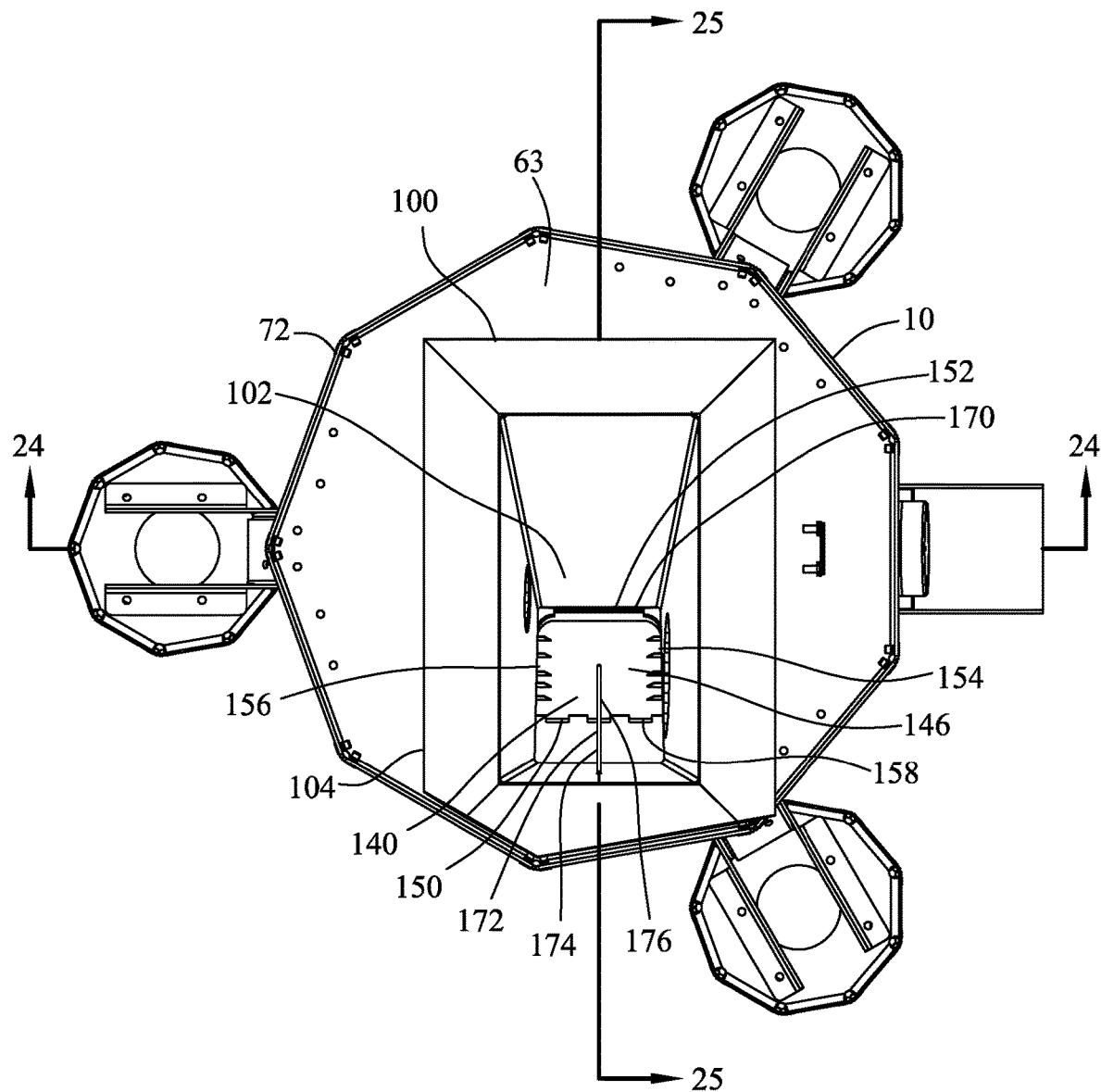
FIG. 23 is a top view of FIG. 22.
Figure 25:
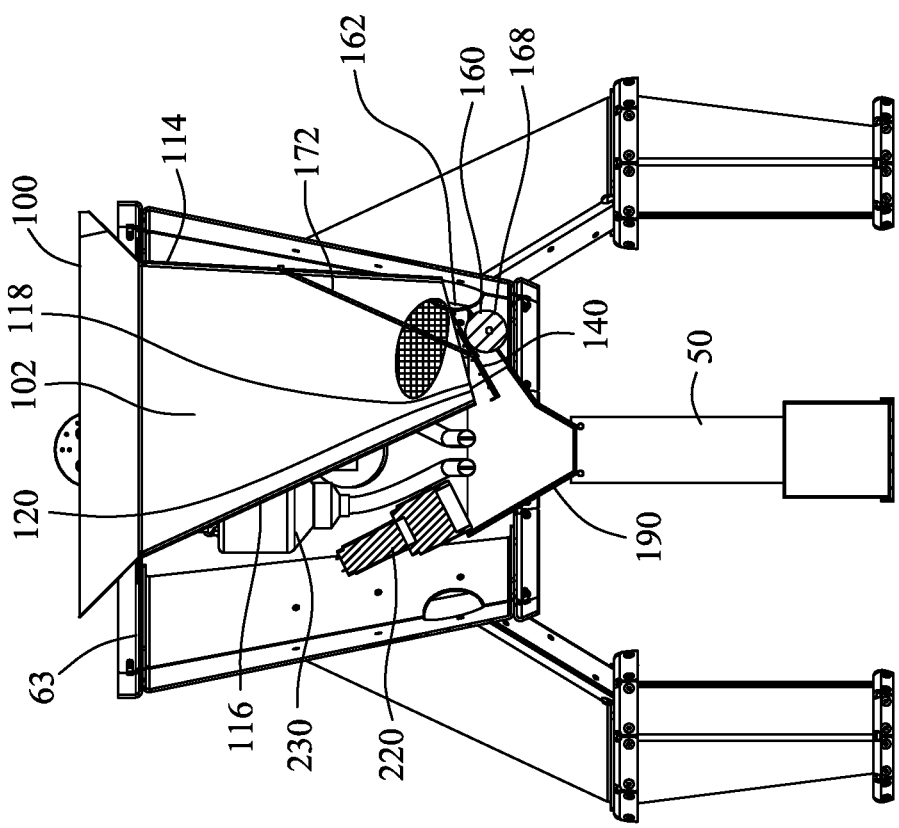
FIG. 25 is a sectional view along line 25-25 in FIG. 23.
Figure 24:
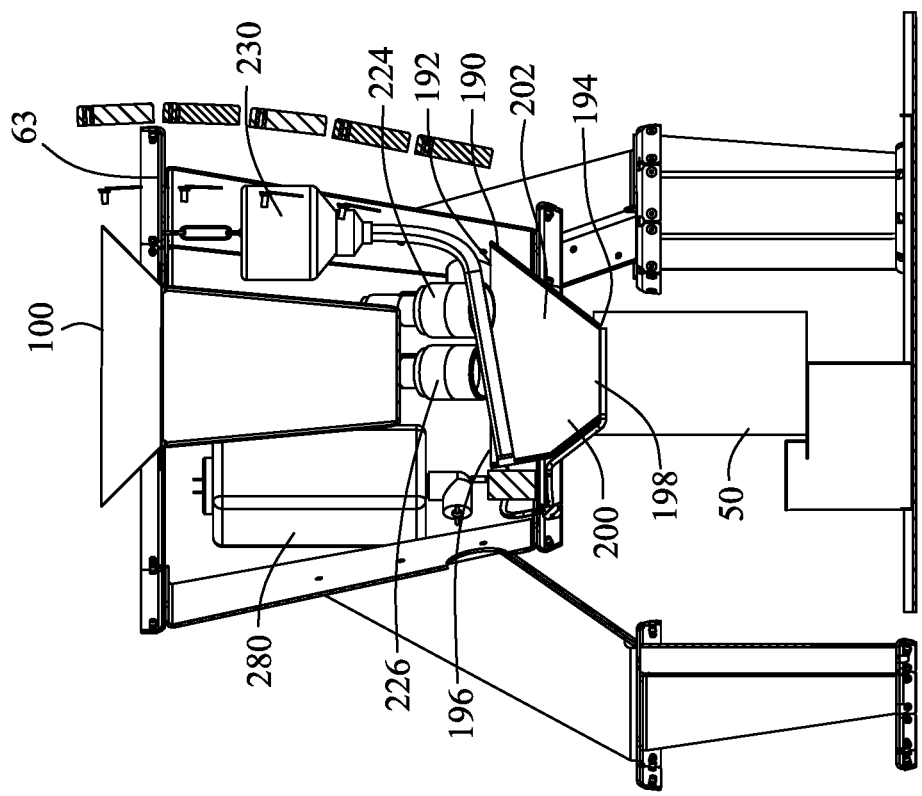
FIG. 24 is a is a sectional view along line 24-24 in FIG. 23.
Figure 27:
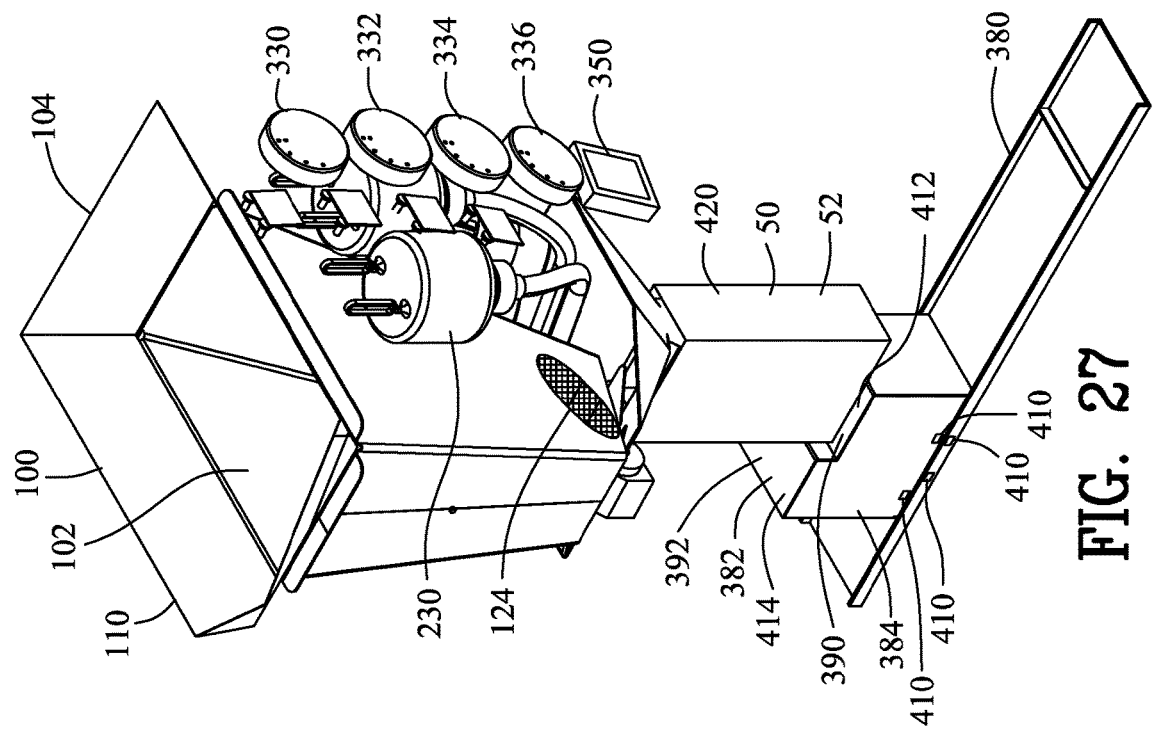
FIG. 27 is a front isometric view of FIG. 26.
Figure 26:
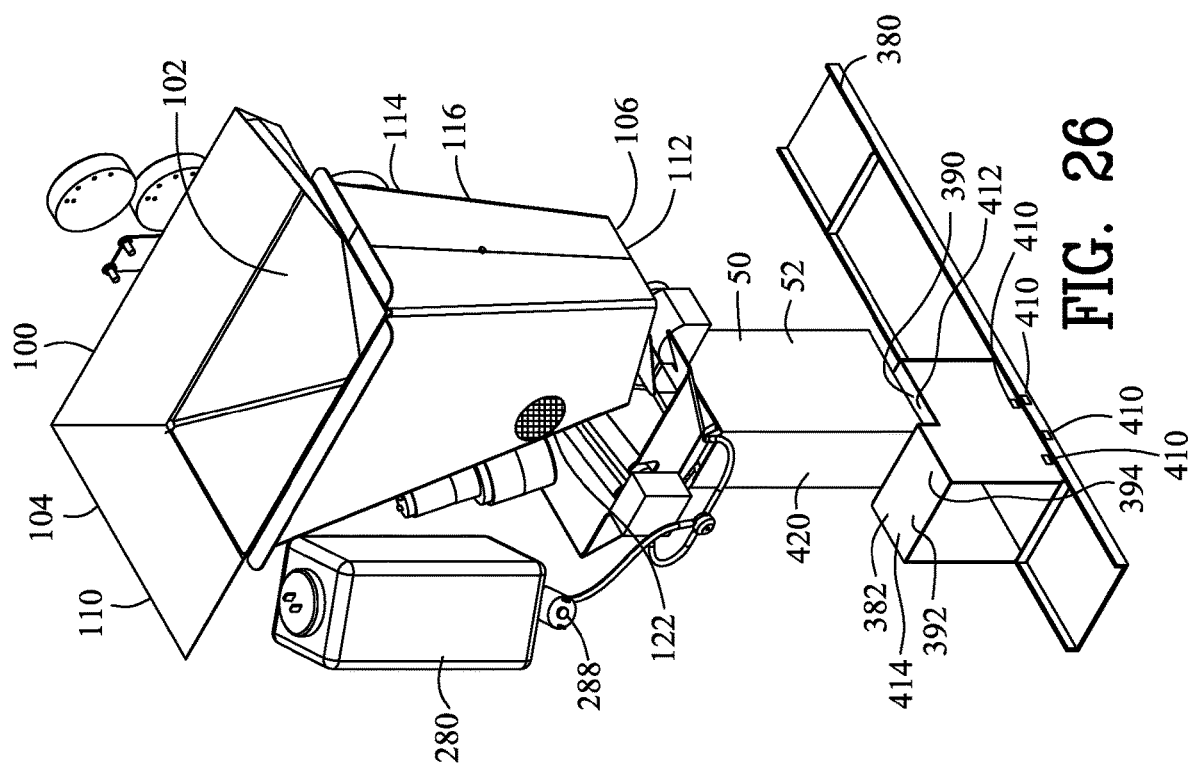
FIG. 26 is a view similar to FIG. 18 illustrating a base support slidably engaging a base guide and a container sensor in a first position for indicating a large size container.
Figure 28:
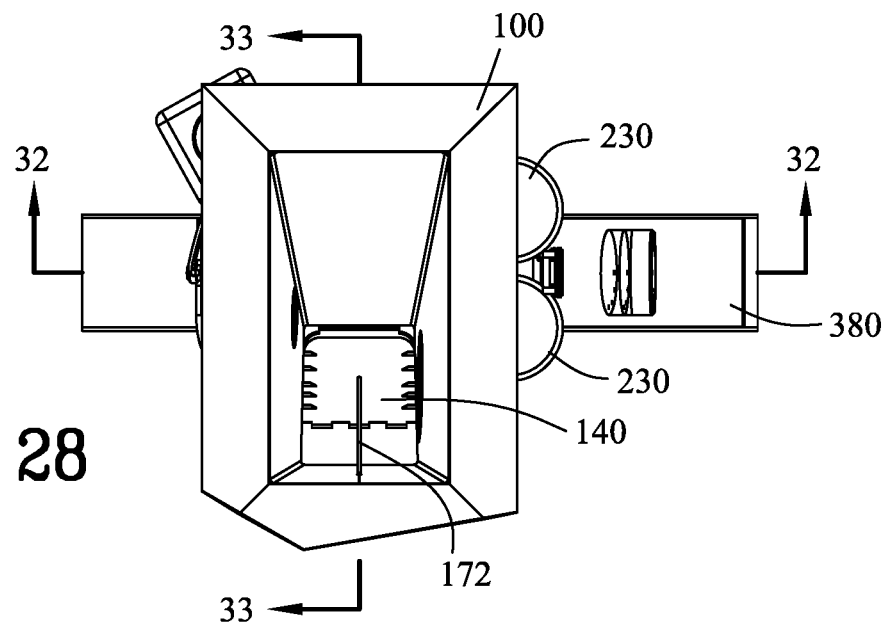
FIG. 28 is a top view of FIG. 27.
Figure 29:
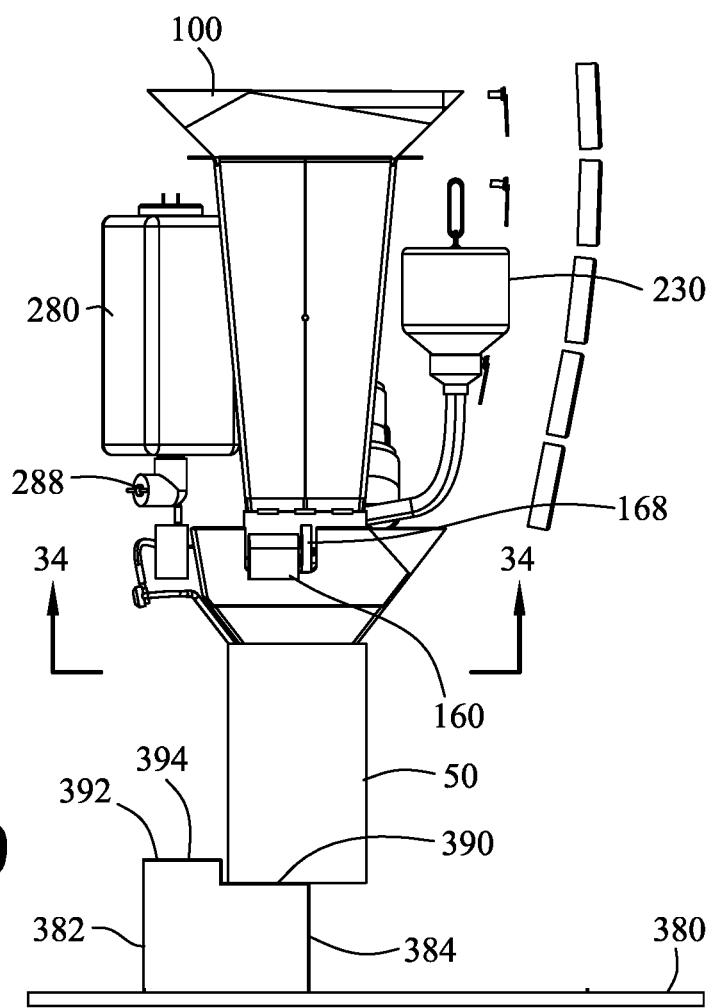
FIG. 29 is a front view of FIG. 28.
Figure 31:
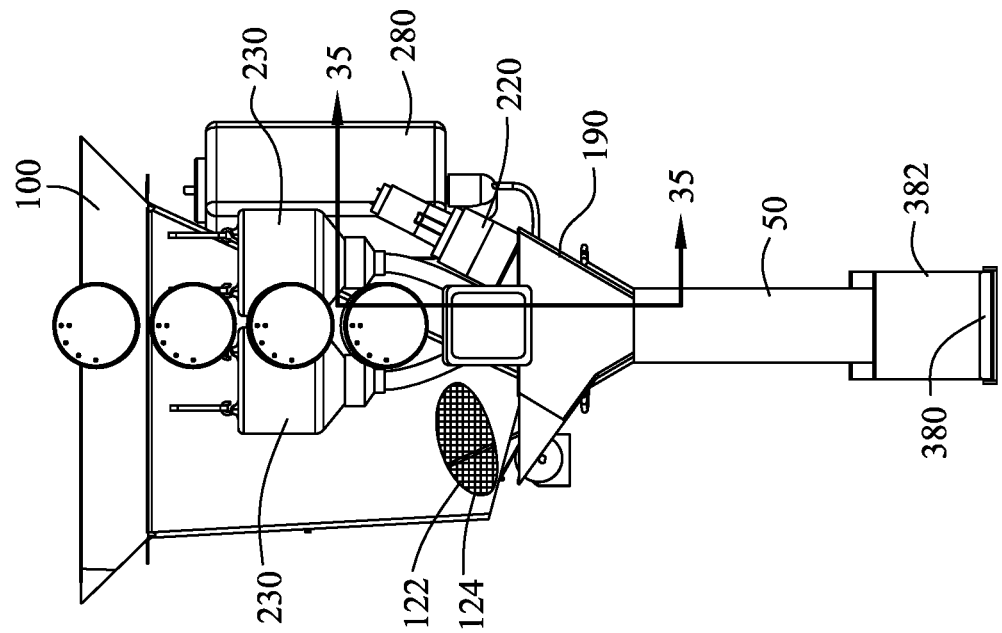
FIG. 31 is a right side view of FIG. 29.
Figure 30:
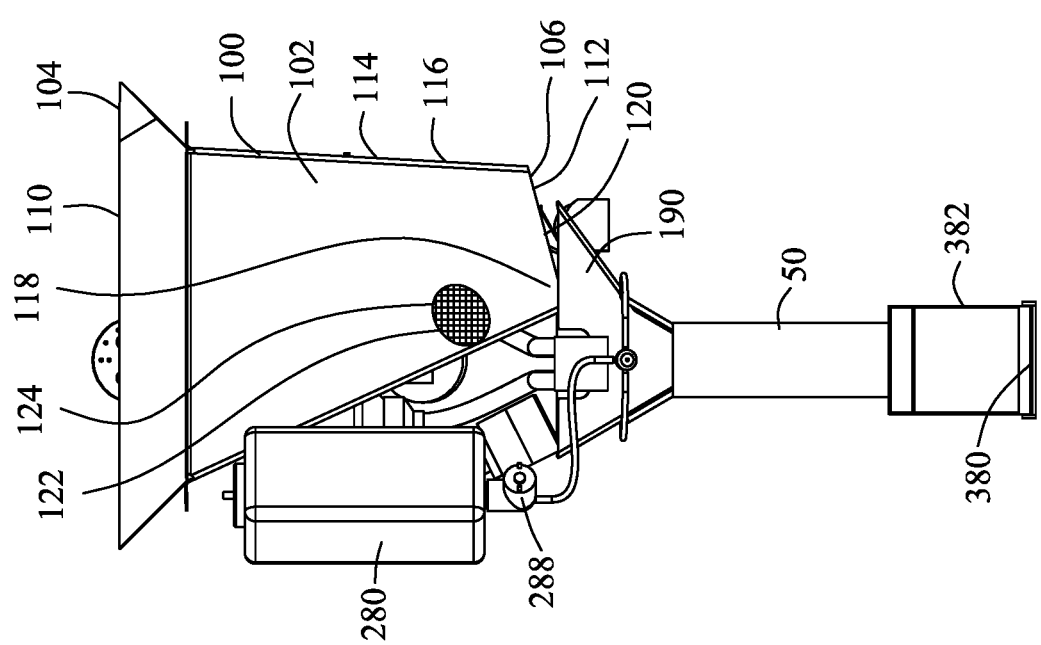
FIG. 30 is a left side view of FIG. 29.
Figure 33:
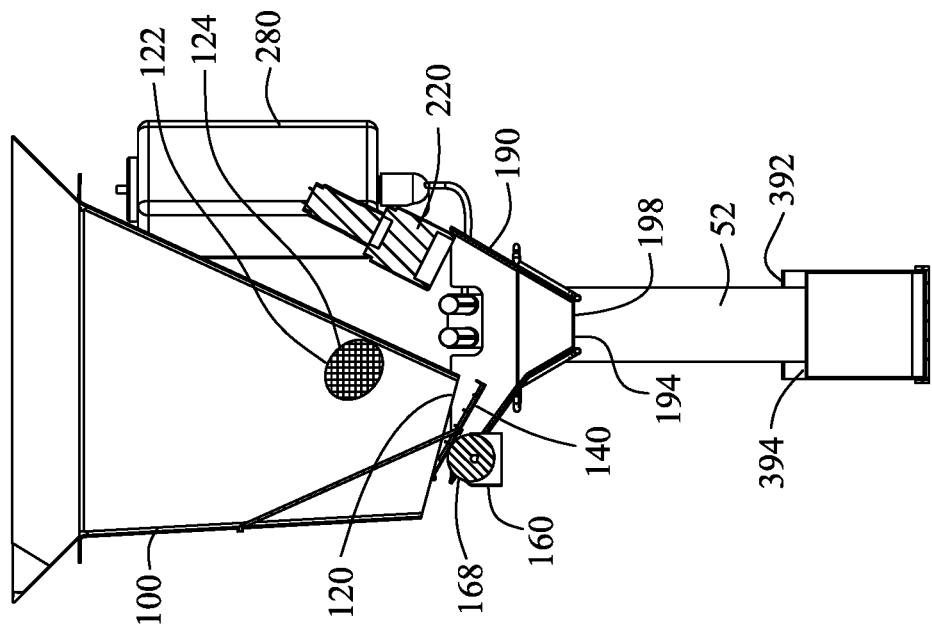
FIG. 33 is a sectional view along line 33-33 in FIG. 28.
Figure 32:
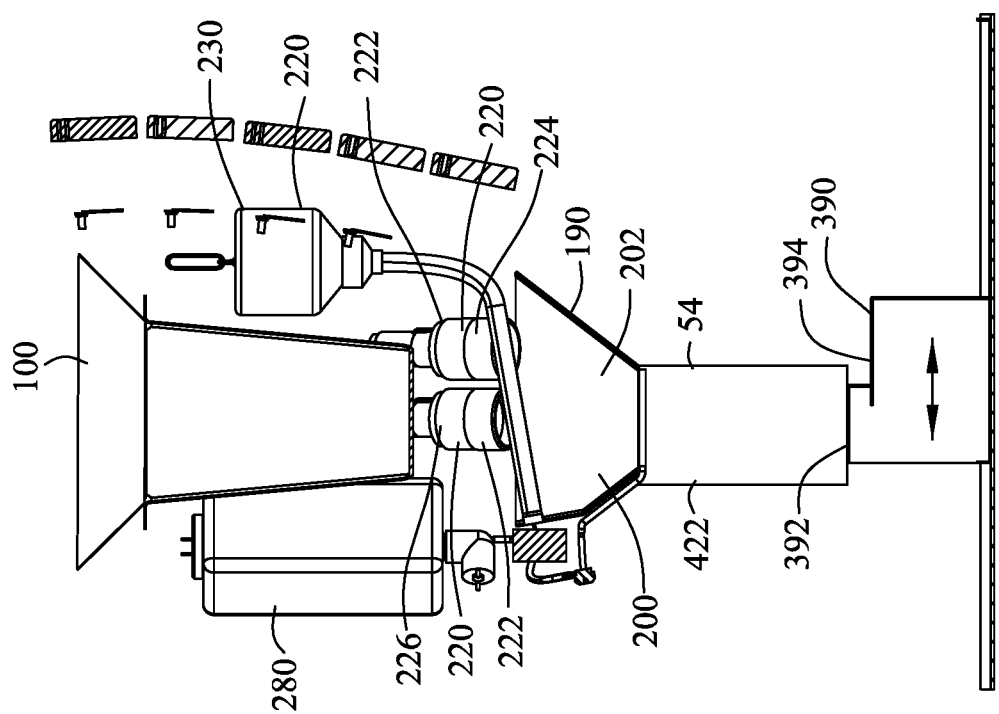
FIG. 32 is a sectional view along line 32-32 in FIG. 28 illustrating the base support slidably engaging the base guide and the container sensor in a second position for indicating a small size container.
Figure 41:
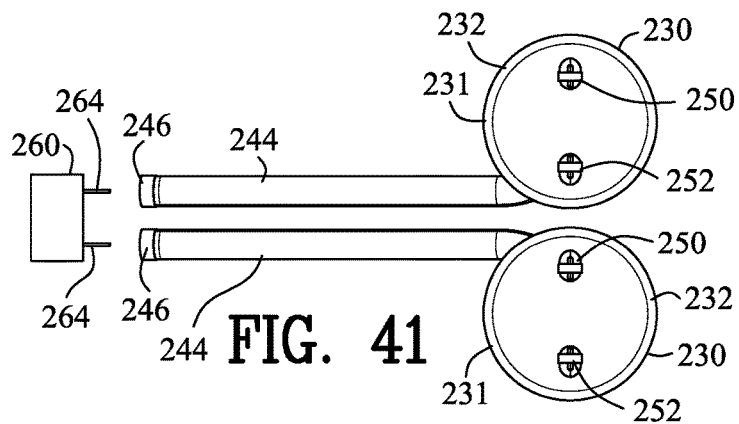
FIG. 41 is a top view of the first reservoir and the second reservoir positioned adjacent to the drive in FIG. 37.
Figure 42:
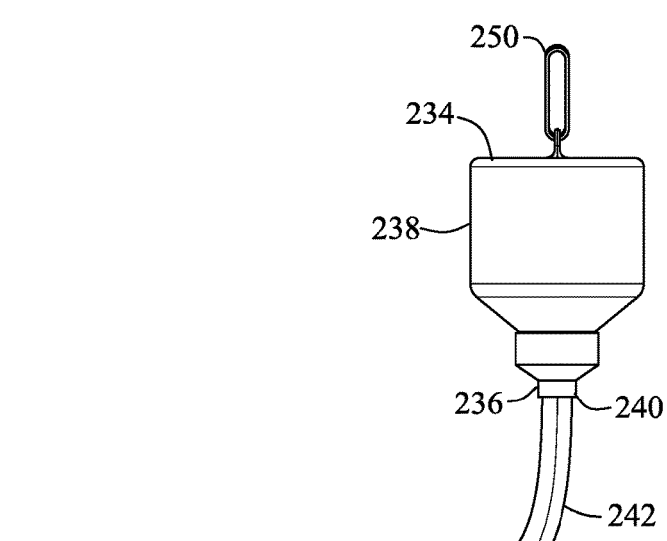
FIG. 42 is a front view of FIG. 41 illustrating the first reservoir and the second reservoir positioned adjacent to the drive.
Figure 43:
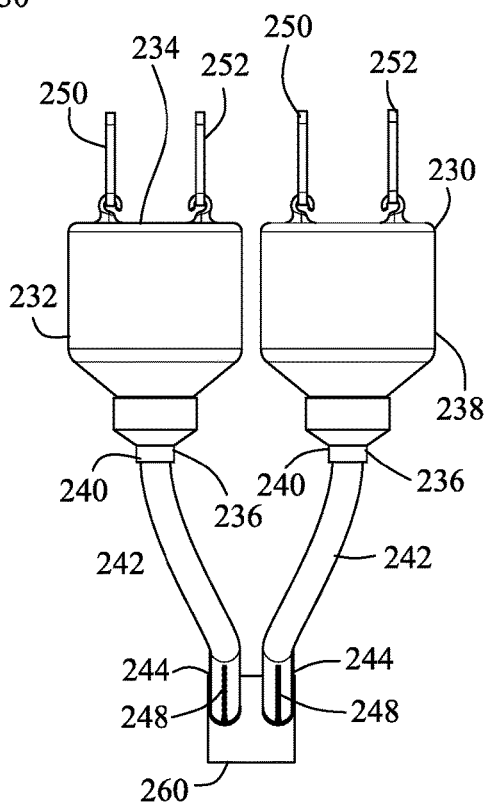
FIG. 43 is a right side view of FIG. 41.
Figure 44:
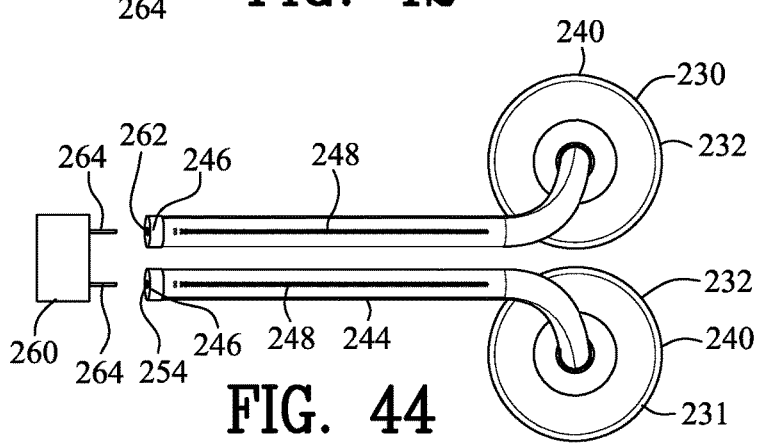
FIG. 44 is a bottom view of FIG. 41.
Figure 45:
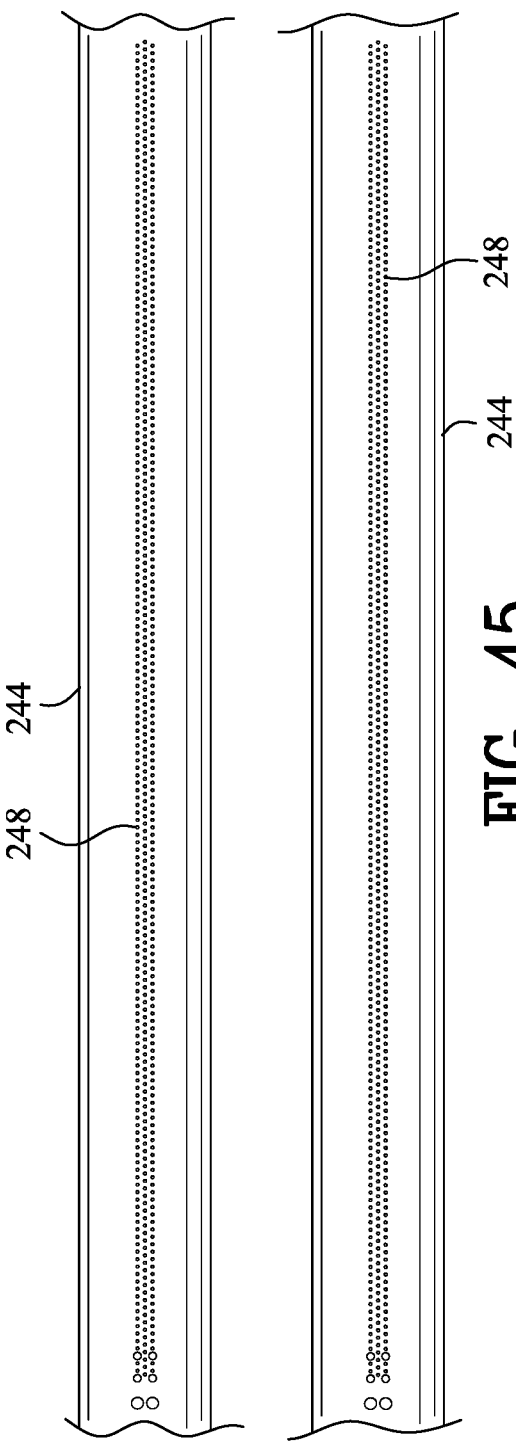
FIG. 45 is an enlarged view of a portion of FIG. 44 illustrating a first duct and a second duct having a plurality of discharging apertures.
Figure 46:
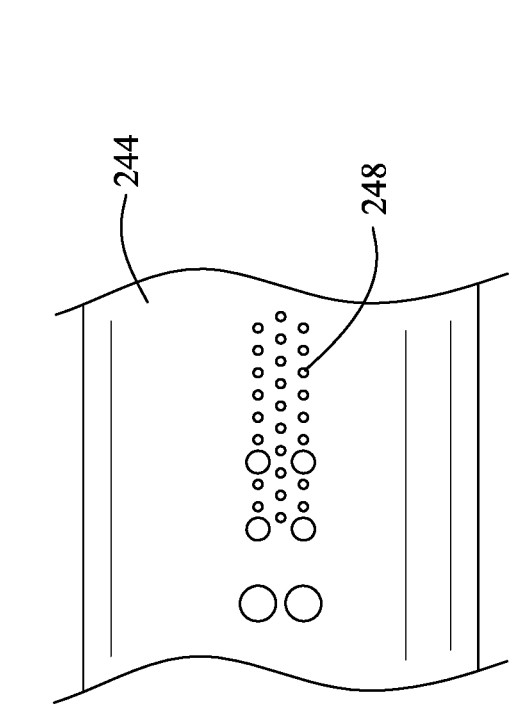
FIG. 46 is an enlarged view of a portion of FIG. 45 illustrating the first duct having the plurality of discharging apertures.
Figure 47:
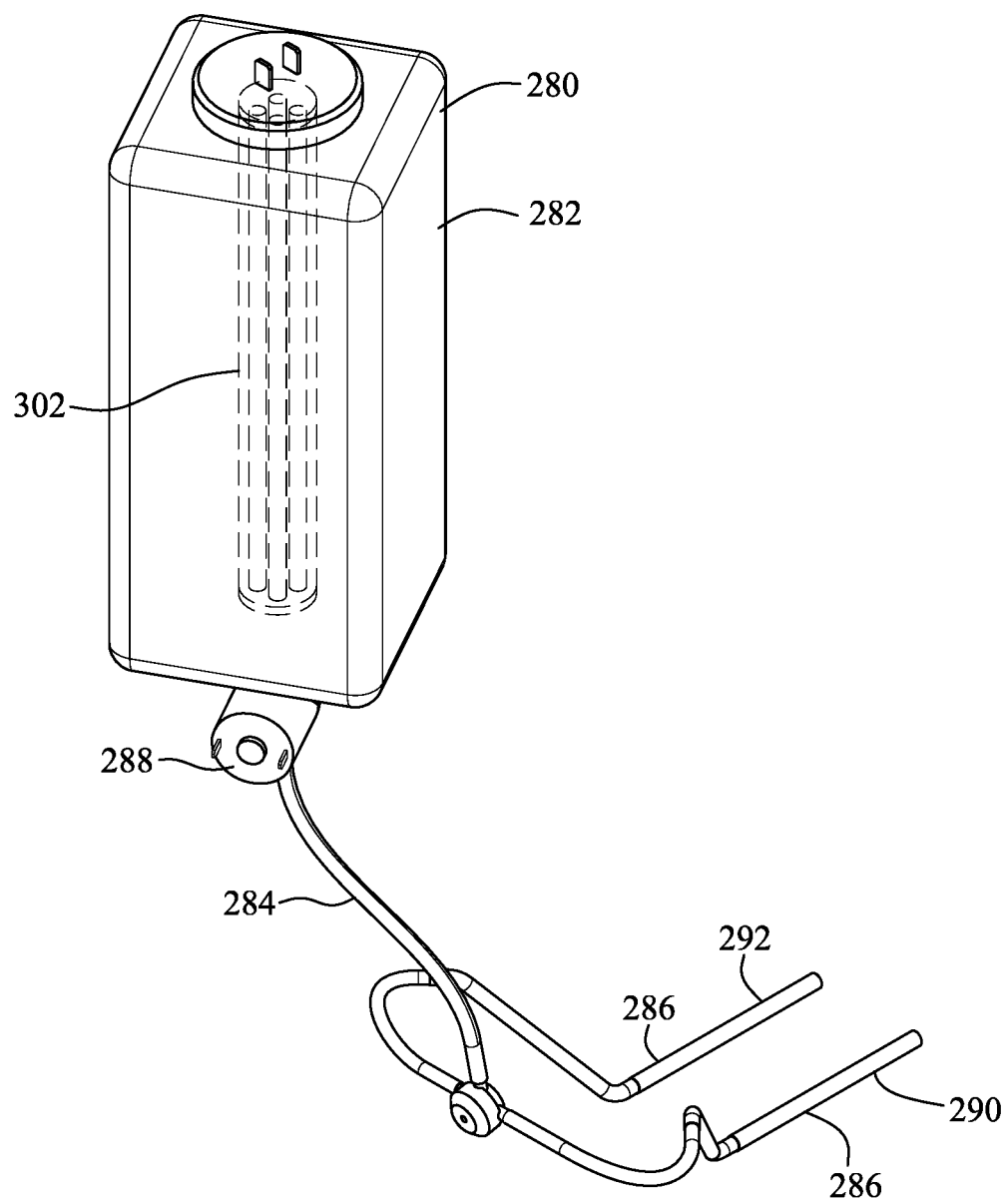
FIG. 47 is an upper isometric view of a liquid pump dispenser for discharging a liquid.
Figure 48:
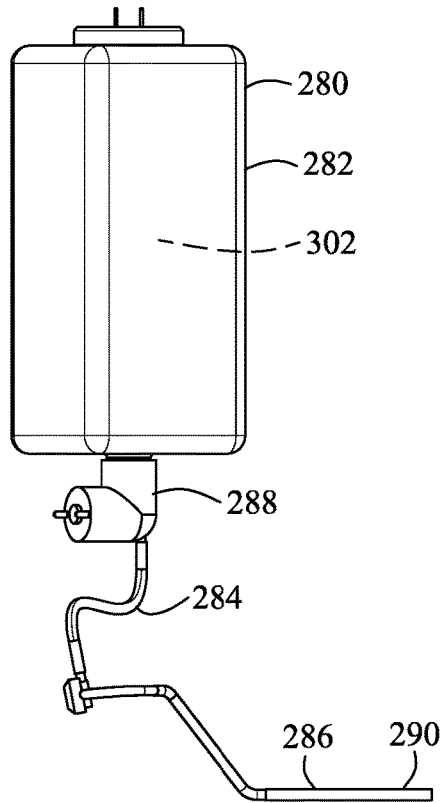
FIG. 48 is a front view of FIG. 47.
Figure 49:
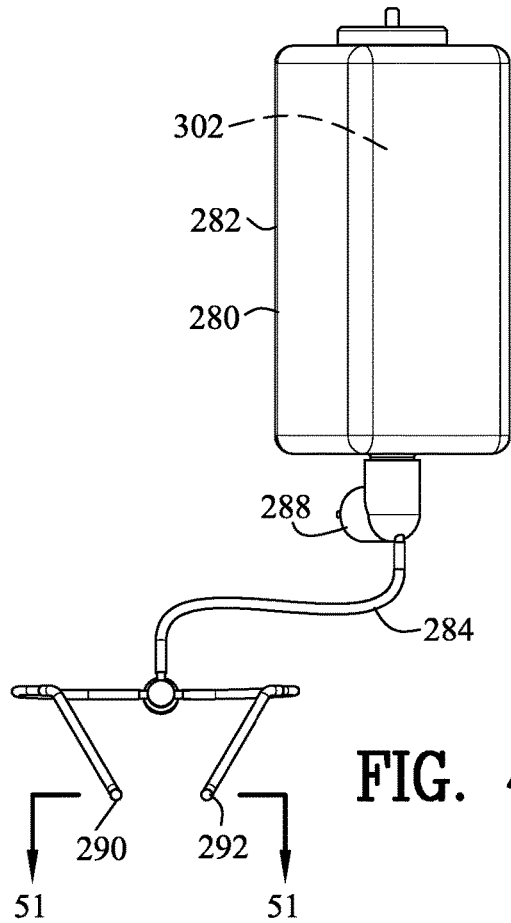
FIG. 49 is a right side view of FIG. 47.
Figure 50:
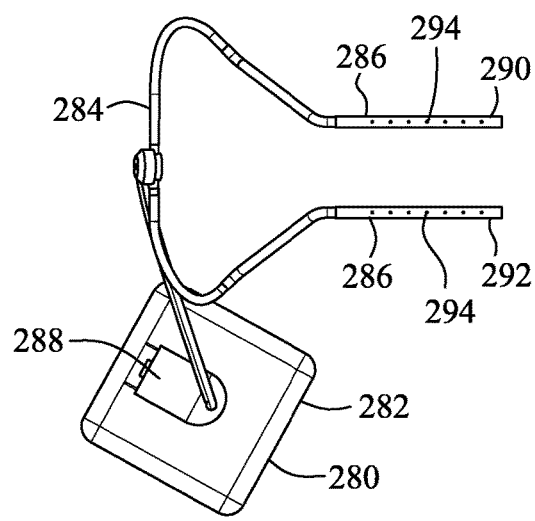
FIG. 50 is a bottom view of FIG. 47.
Figure 51:
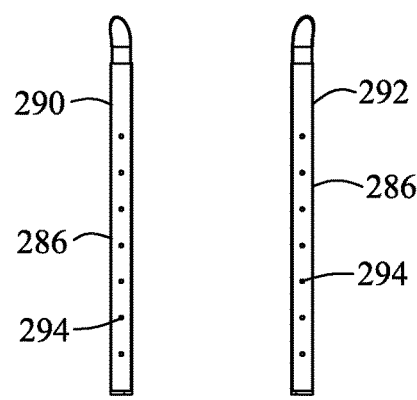
FIG. 51 is an enlarged portion of FIG. 50 illustrating a liquid dispenser manifold.
Figure 52:
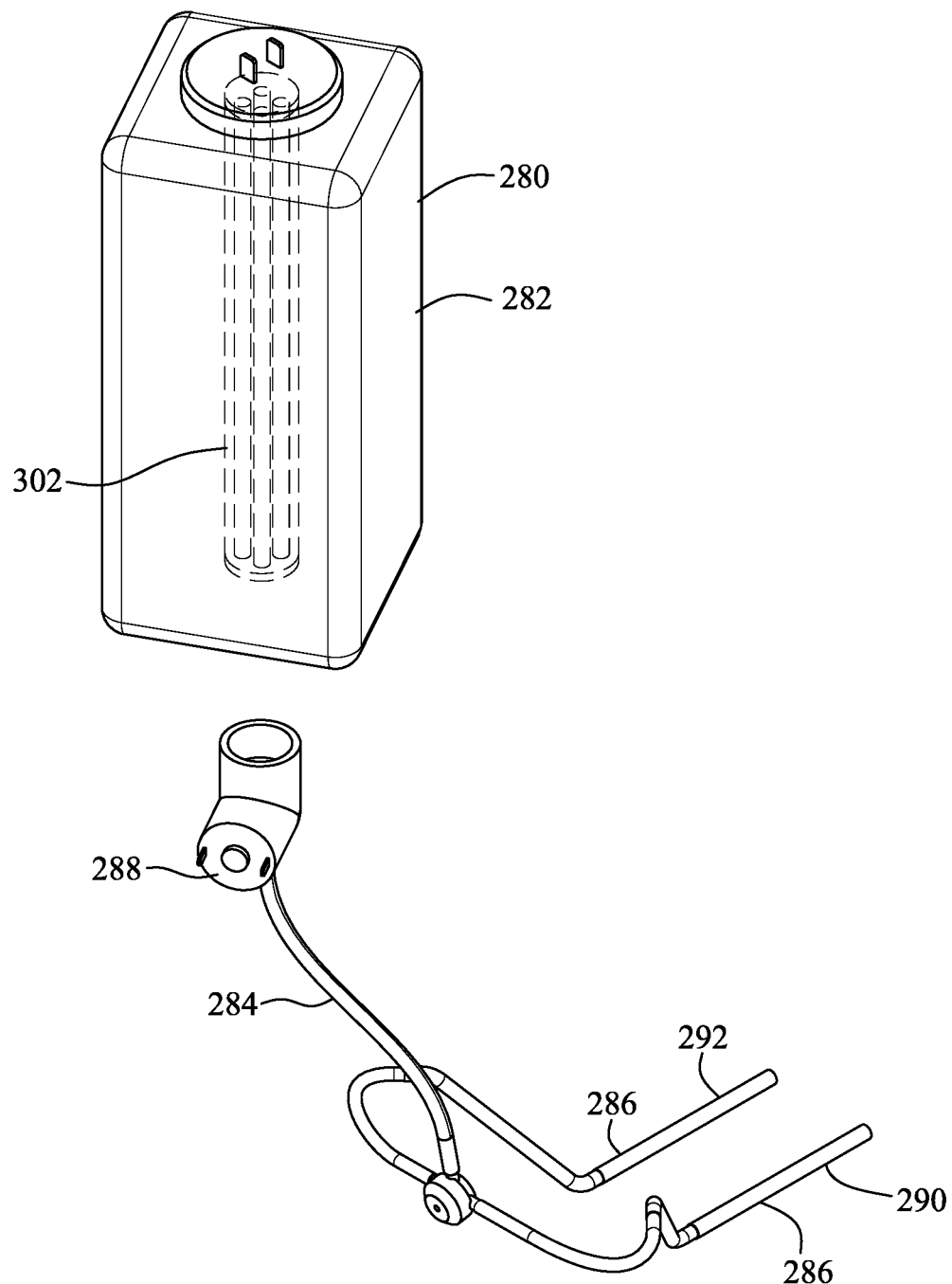
FIG. 52 is a similar view of FIG. 47 illustrating a liquid dispenser container being disengaged from a liquid pump.
Figure 61:
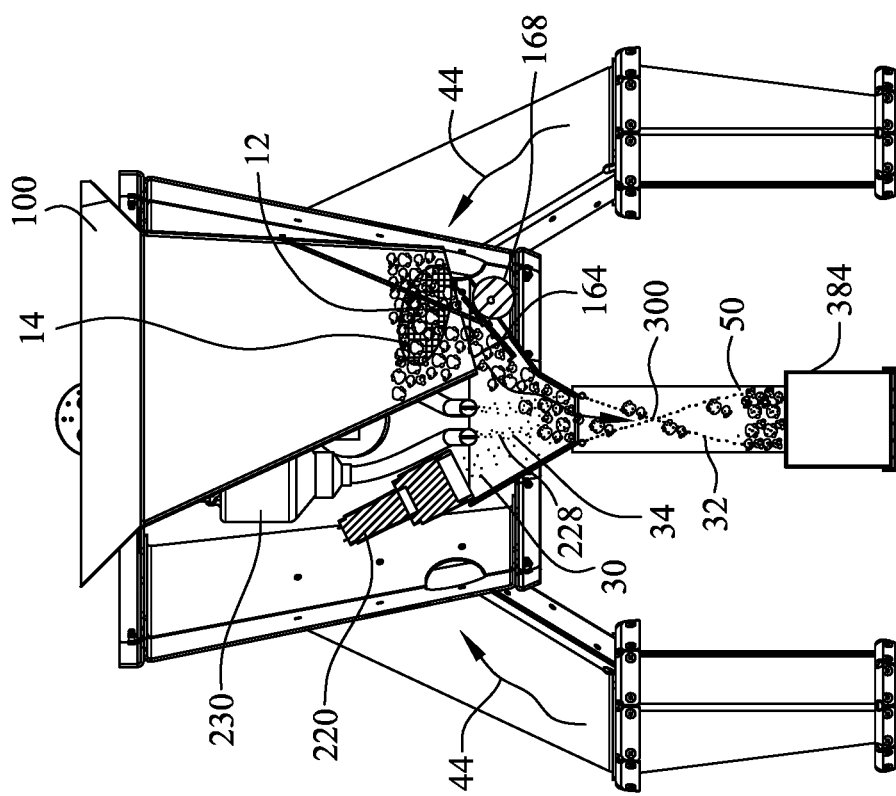
FIG. 61 is a view similar to FIG. 60 illustrating a seventh step for utilizing the device wherein a flavoring channel funnels the popcorn into the container and a liquid pump dispenser dispenses liquid flavoring below the flavoring channel.
Figure 60:
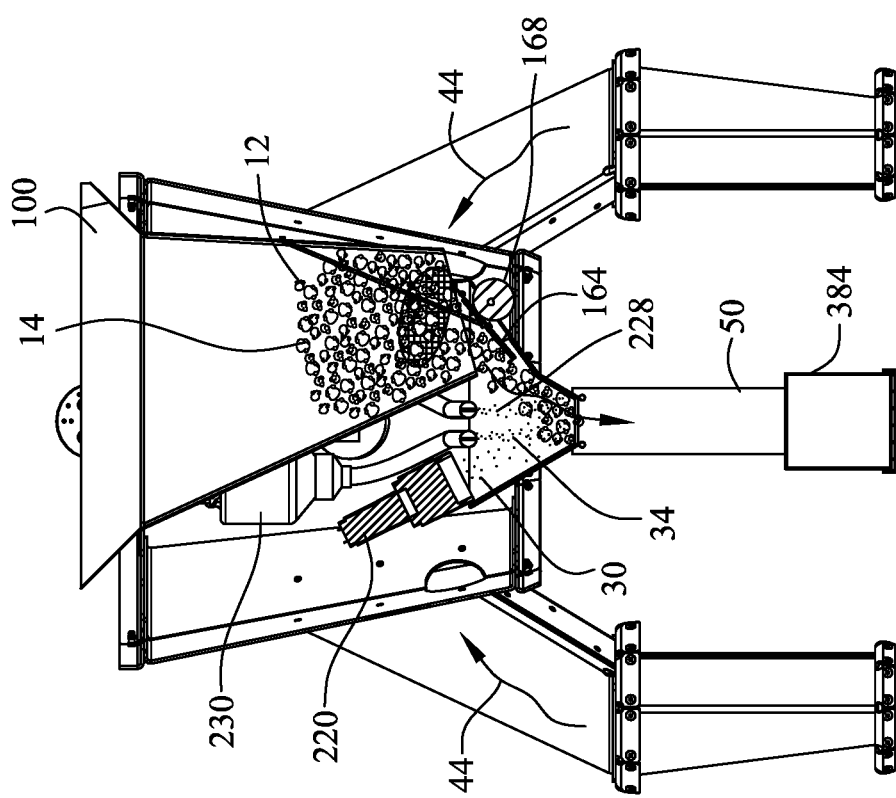
FIG. 60 is a view similar to FIG. 58 illustrating a sixth step for utilizing the device wherein the heating element continues the increased temperature and velocity of the heated airflow for superheating the popcorn within the housing and the closure is pivotably or reciprocating between an generally open position and a generally closed position for dispensing the popcorn from the housing and thereafter the popcorn contact the flavoring.
Figure 63:
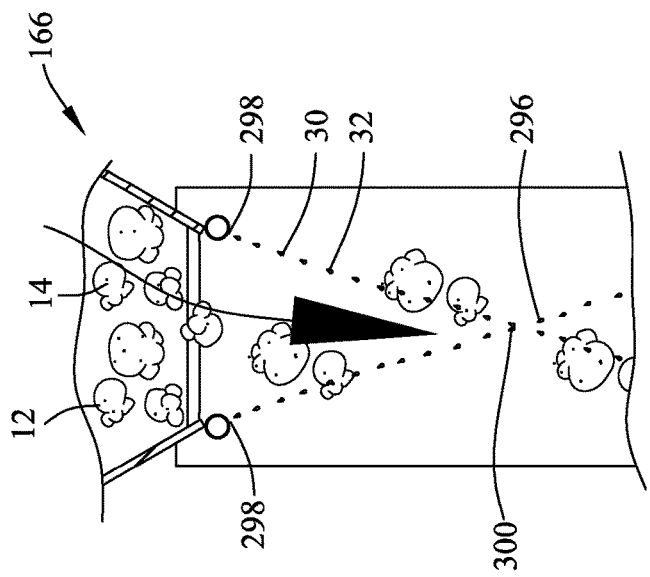
FIG. 63 is an enlarged portion of FIG. 62 for illustrating the a criss-cross pattern and uniformly covering the popcorn.
Figure 64:
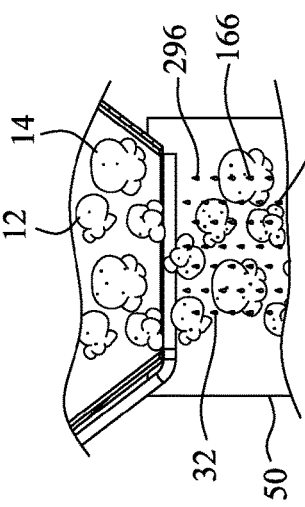
FIG. 64 is a right side view of FIG. 63 illustrating the first liquid dispenser manifold and the second dispenser manifold dispensing the curtain or elongated wall of liquid flavoring for uniformly covering the popcorn.
Figure 62:
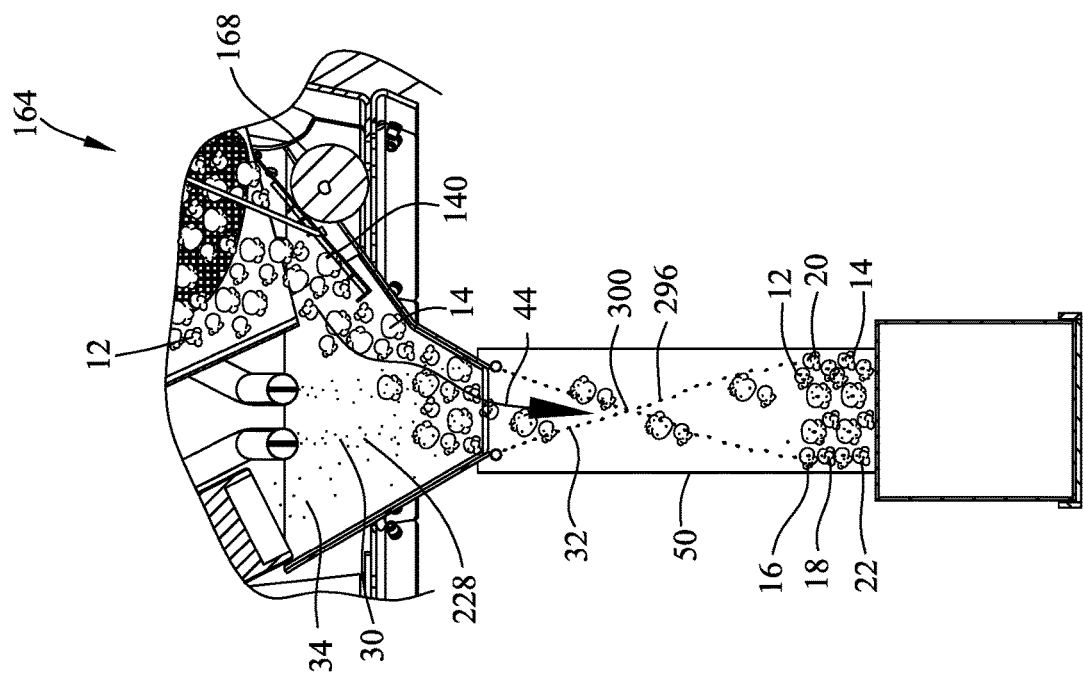
FIG. 62 is an enlarged portion of FIG. 61 illustrating a first liquid dispenser manifold and a second dispenser manifold simultaneously dispensing the liquid flavoring for creating a criss-cross pattern and uniformly covering the popcorn.
Figure 68:
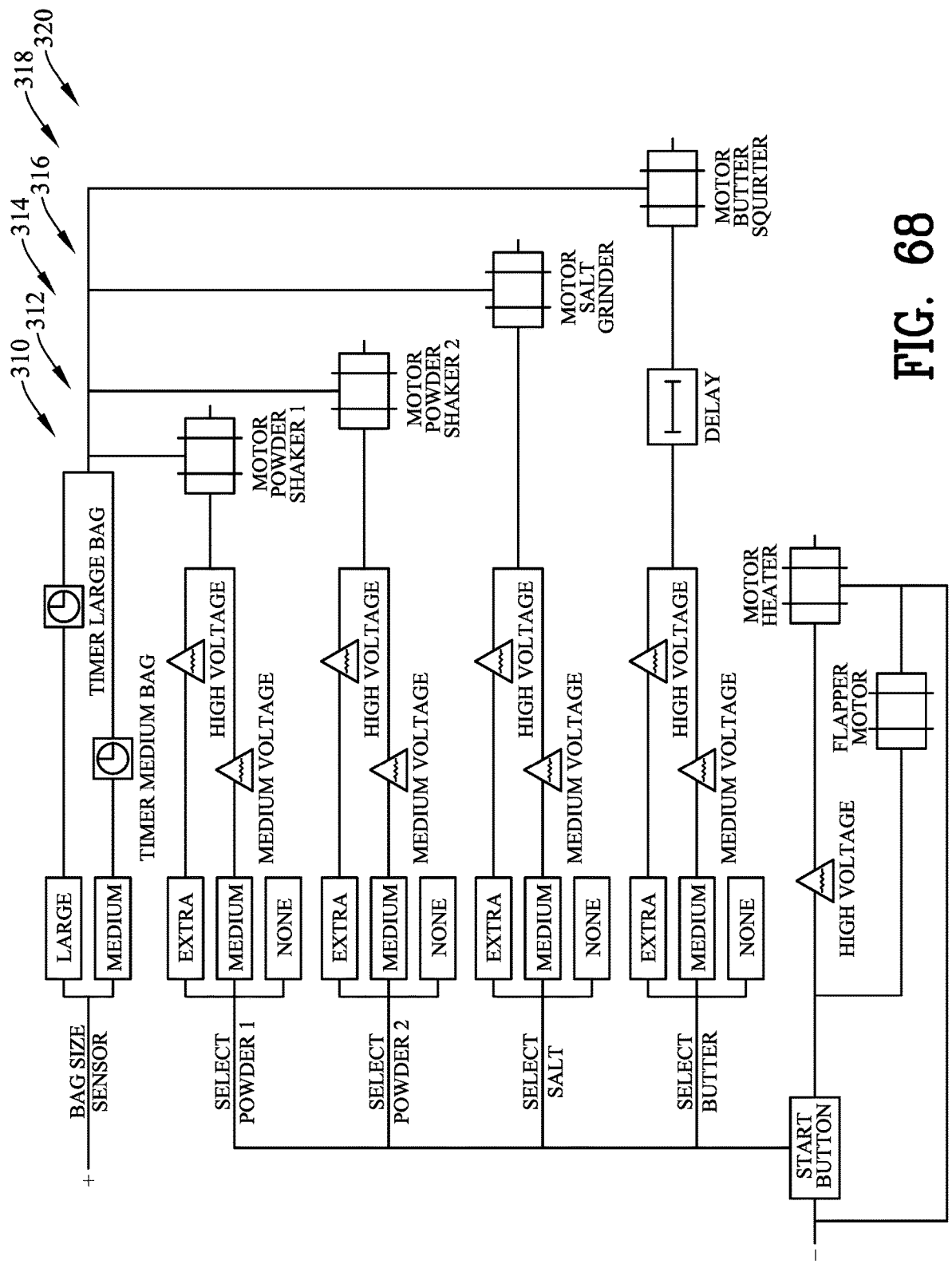
FIG. 68 is an electrical diagram utilized for the device.
Figure 70:
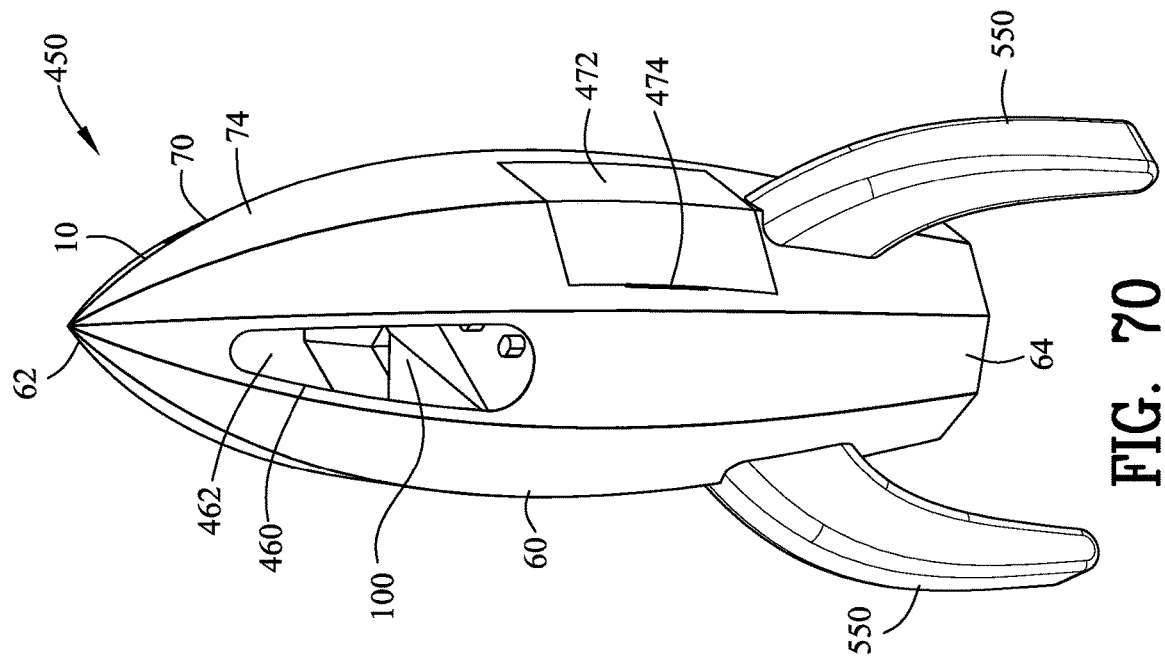
FIG. 70 is a rear upper isometric view of FIG. 69.
Figure 69:
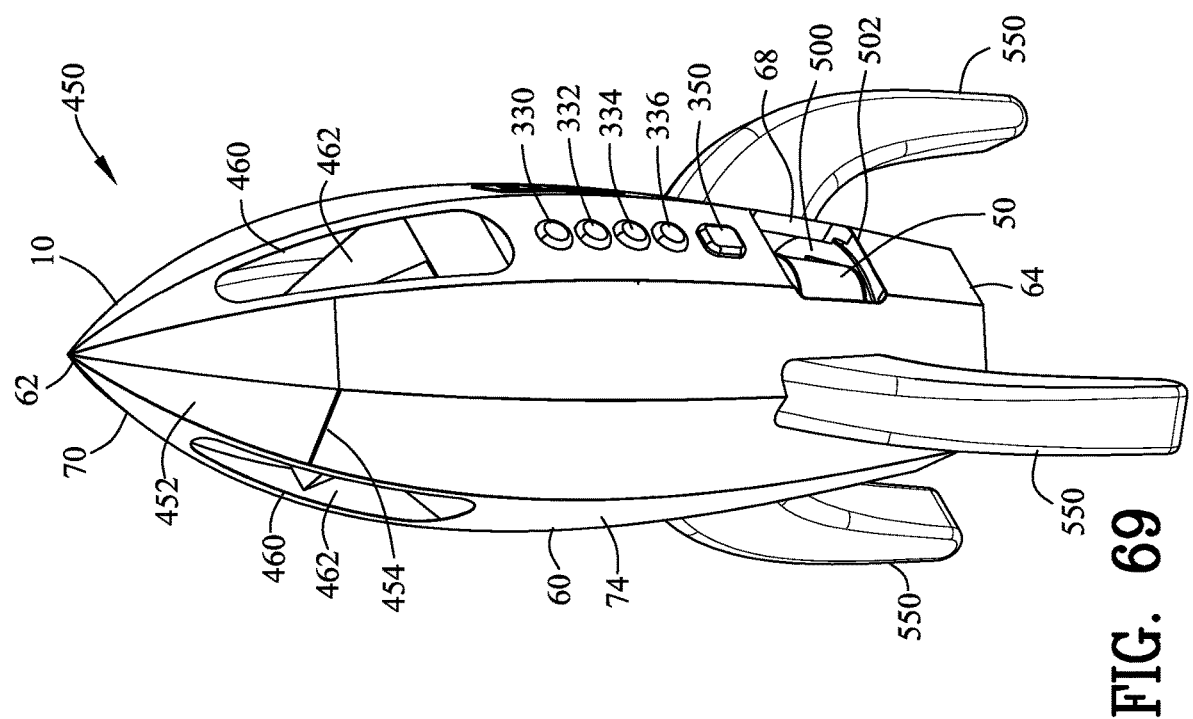
FIG. 69 is a front upper isometric view of a second embodiment for flavoring and or heating a consumable substance incorporating the present invention.
Figure 71:
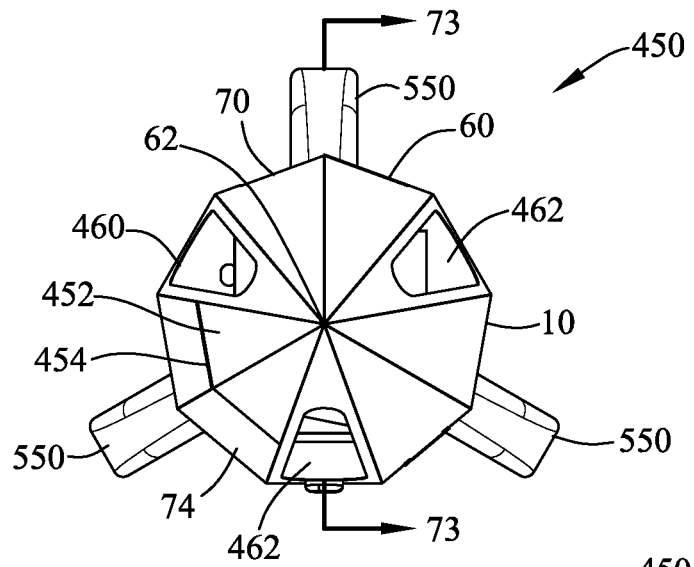
FIG. 71 is a top view of FIG. 69.
Figure 72:
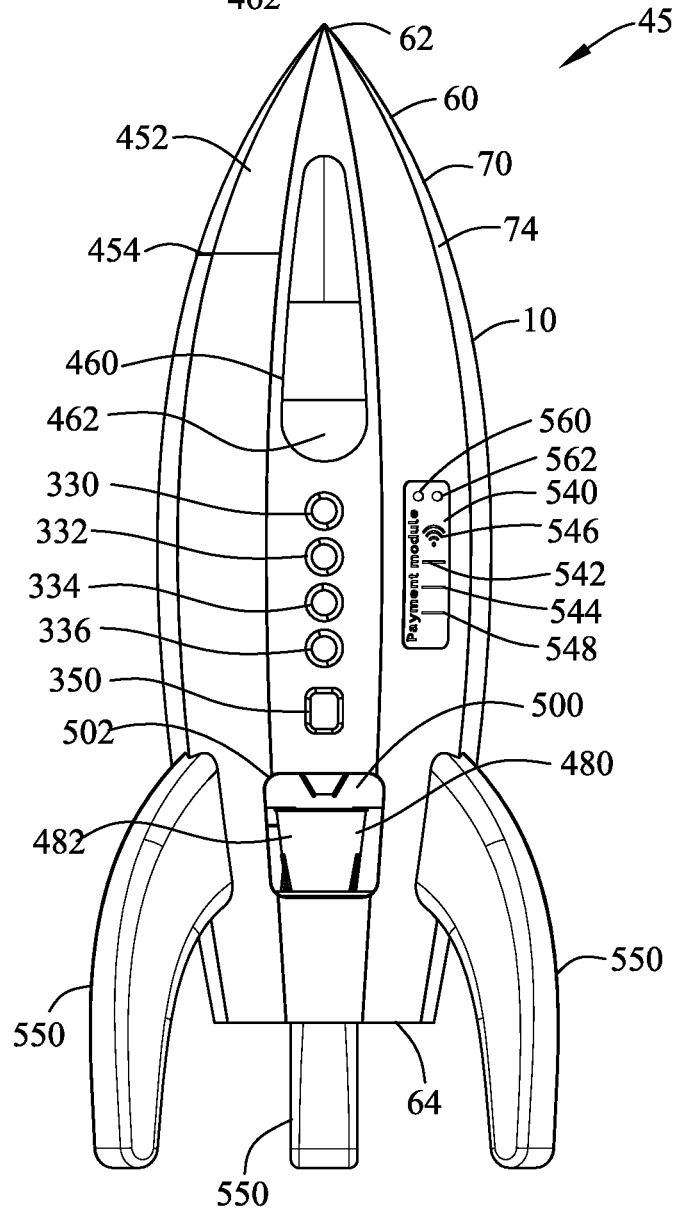
FIG. 72 is a front view of FIG. 69.
Figure 73:
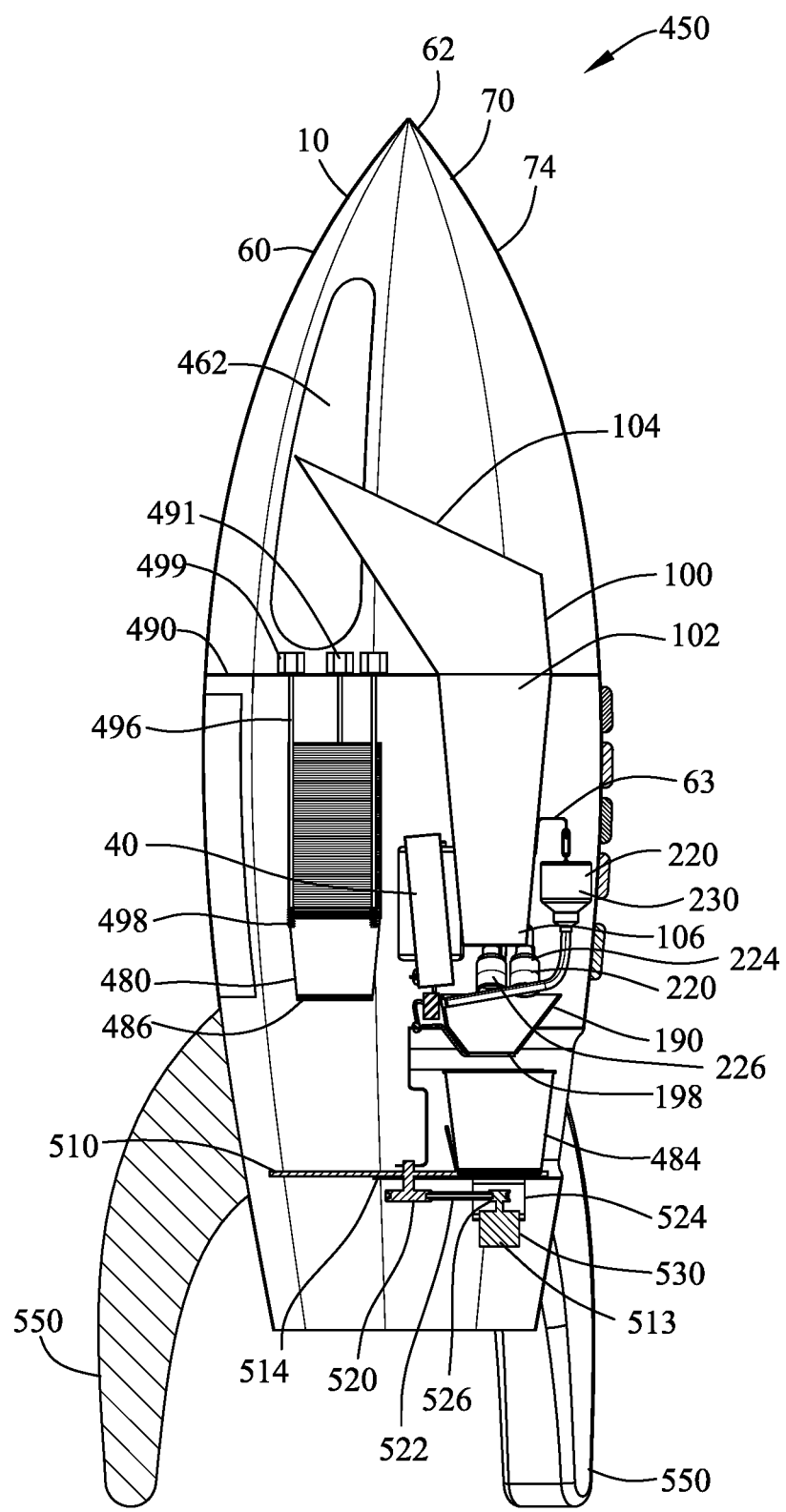
FIG. 73 is a sectional view along line 73-73 in FIG. 71.
Figure 77:
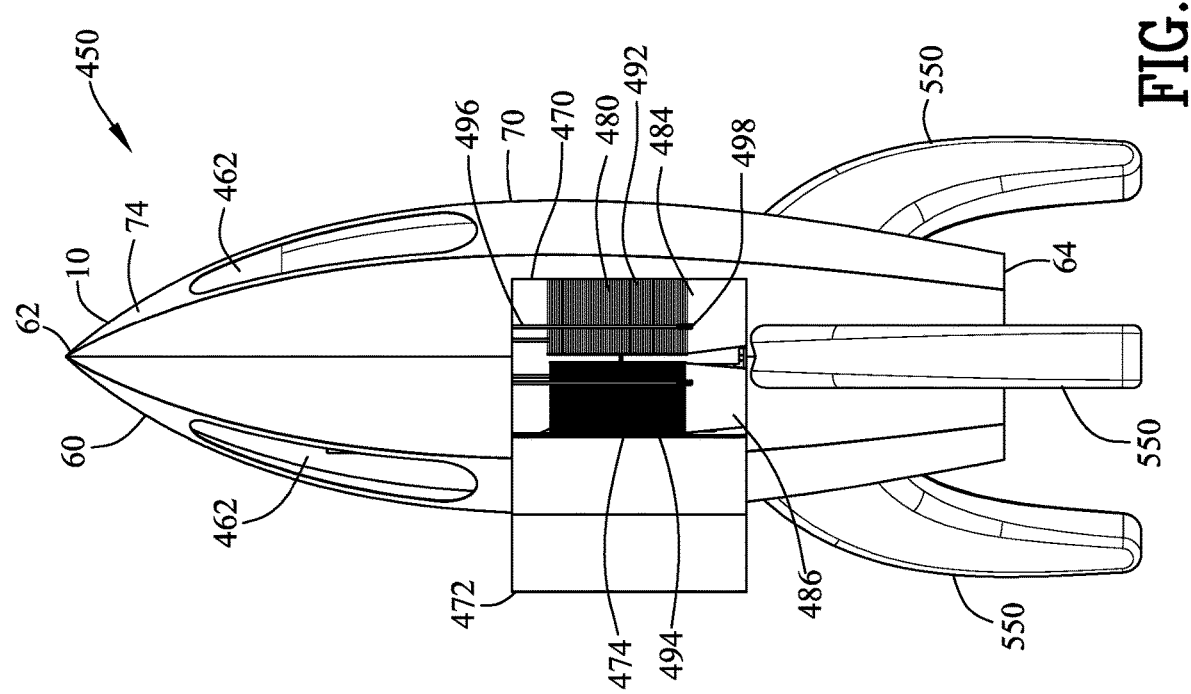
FIG. 77 is a view similar to FIG. 75 illustrating an input container door in the open position.
Figure 76:
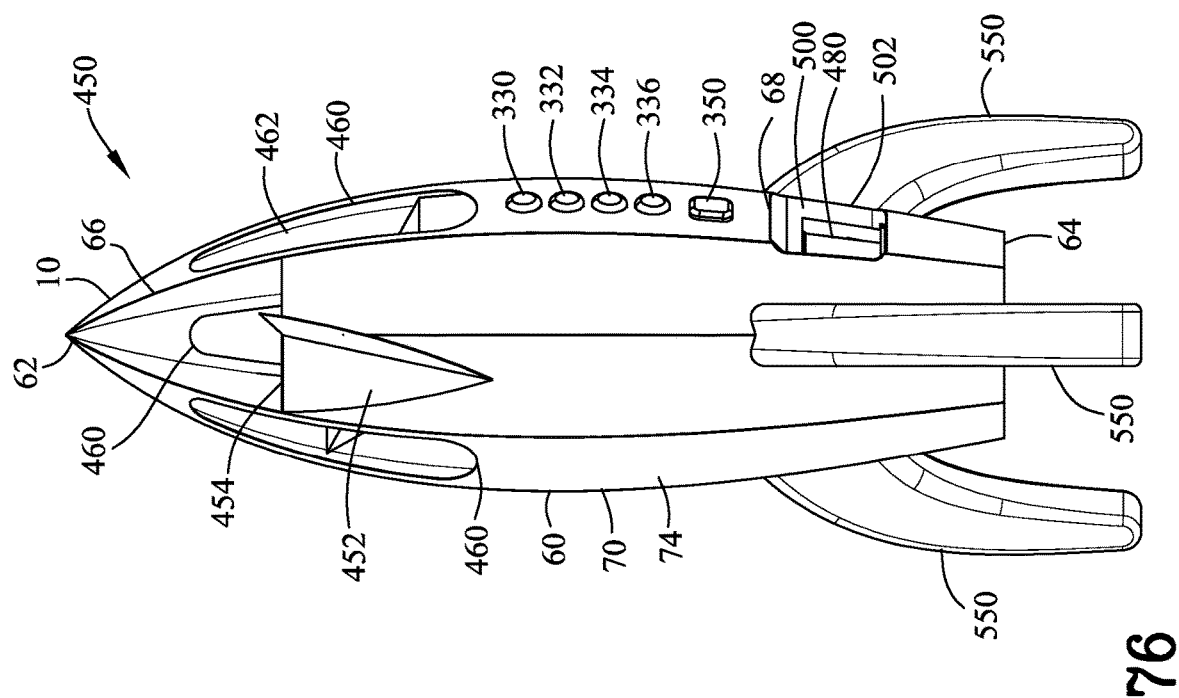
FIG. 76 is a left side view of FIG. 72 illustrating an input aperture closure in the open position.
Figure 79:
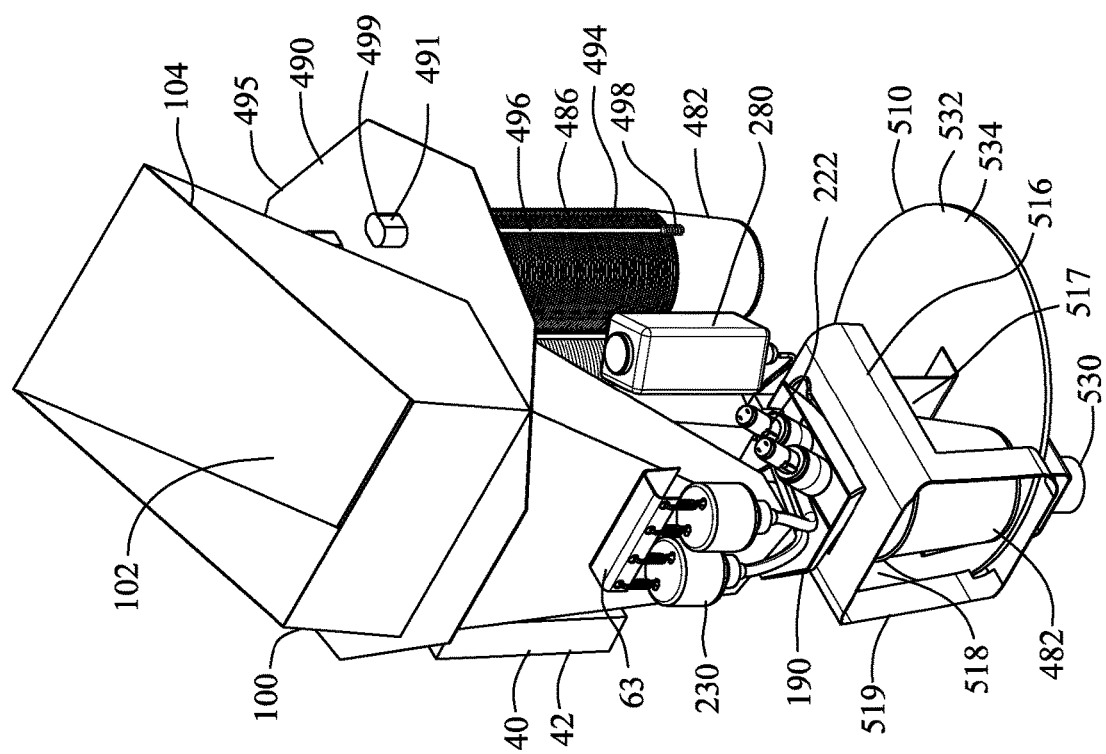
FIG. 79 is a upper right isometric view of FIG. 78.
Figure 78:
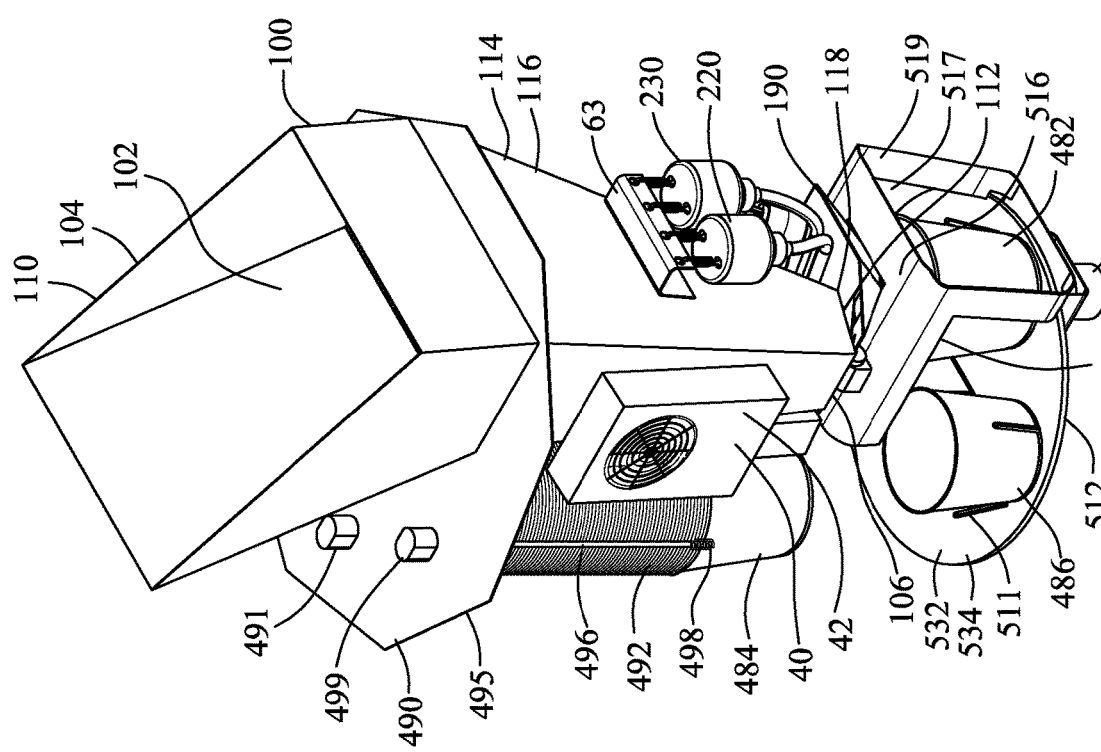
FIG. 78 is an upper left isometric view of FIG. 73 with the body removed.
Figure 80:
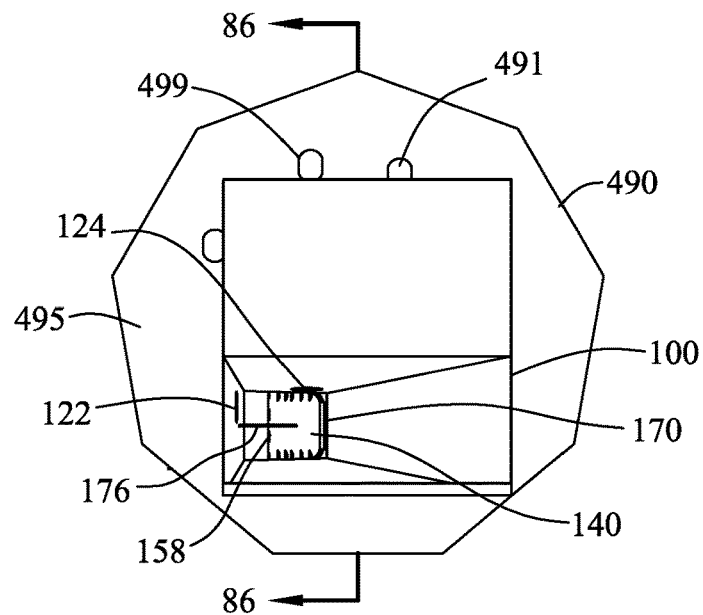
FIG. 80 is a top view of FIG. 78.
Figure 81:
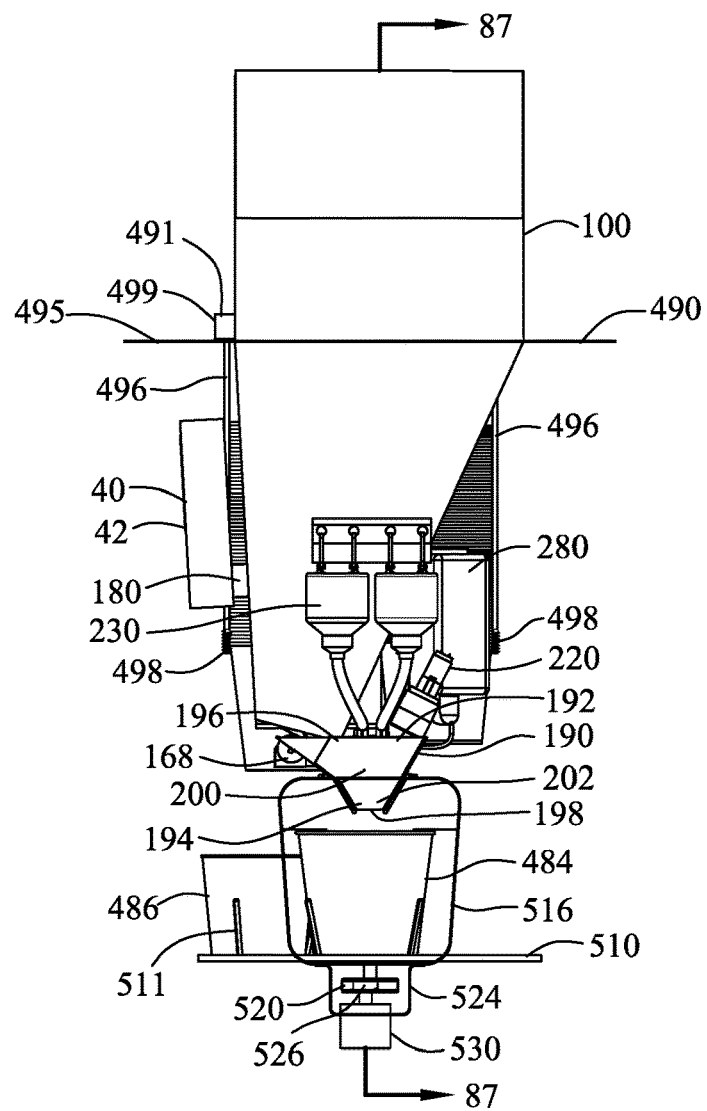
FIG. 81 is a front view of FIG. 78.
Figure 83:
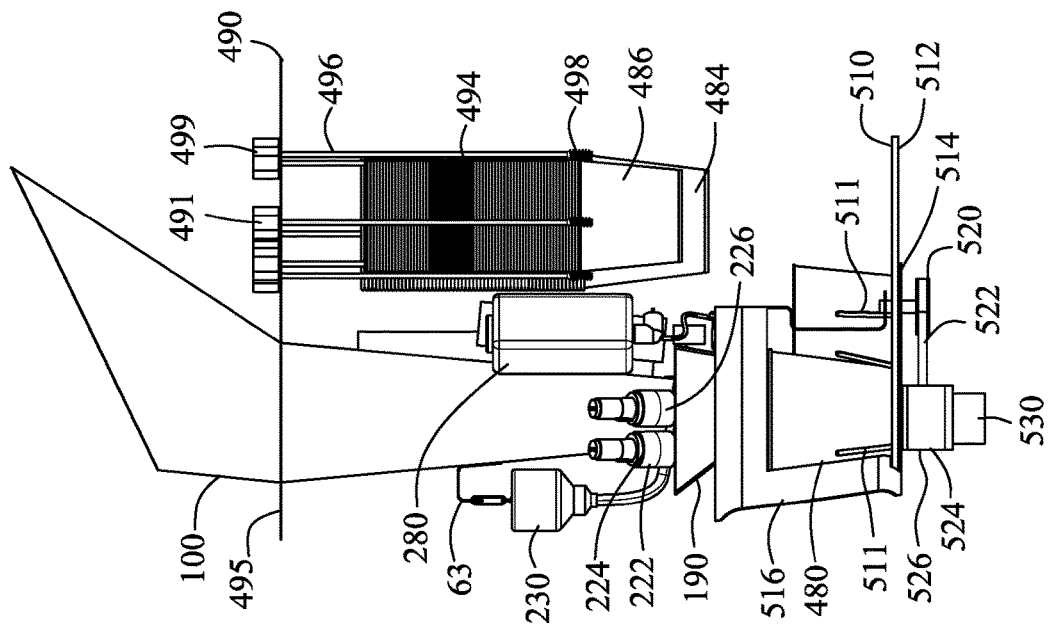
FIG. 83 is a right side view of FIG. 78.
Figure 82:
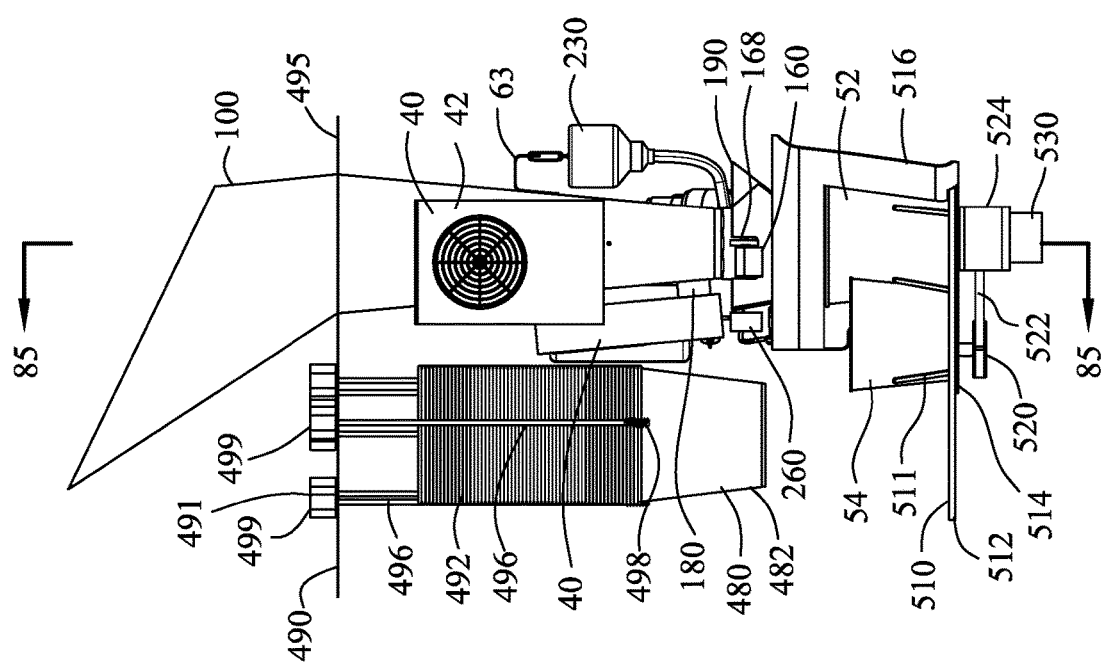
FIG. 82 is a left side view of FIG. 78.
Figure 85:
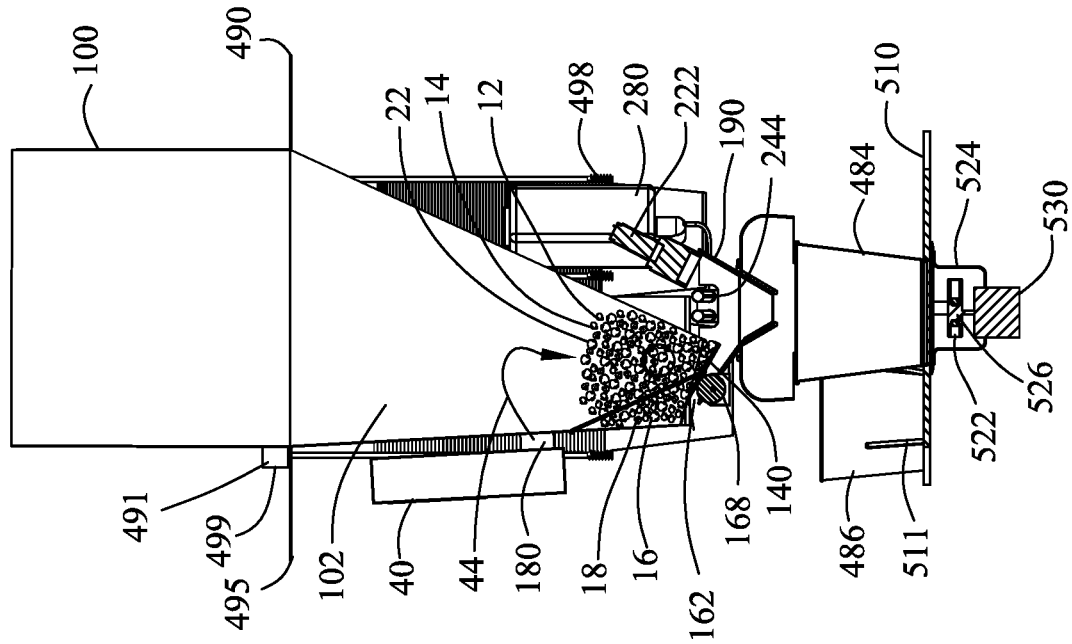
FIG. 85 is a sectional view along line 85-85 in FIG. 82.
Figure 84:
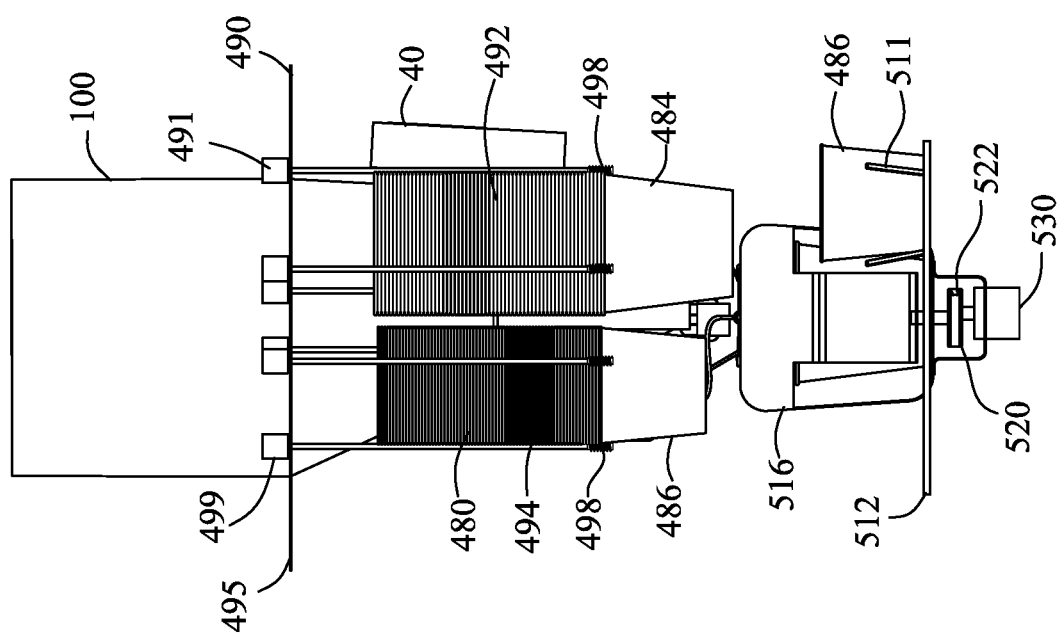
FIG. 84 is a rear view of FIG. 78.

FIGS. 1-68 are various views of a device 10. The device 10 may be utilized for flavoring a consumable substance 12. Alternatively, the device 10 may be utilized for heating the consumable substance 12. Furthermore, the device 10 may be utilized for both flavoring and heating the consumable substance 12.

The consumable substance 12 is shown as popcorn 14, but may also include nuts 16, dried fruit 18, dried vegetables 20, candy 22 or other edibles. The consumable substance 12 may be flavored by an edible substance 30. The edible substance 30 may include a liquid 32 including butter, olive oil, coconut oil, sauces, or other liquids 32. In addition, the edible substance 30 may include a solid 34 including salt, pepper, dry/powder seasonings, dry/powder flavoring or other solids.

The consumable substance 12 may be heated by a heating source 40 including conduction, convention or radiation. For example, the heating source 40 may include an electric heating element and force air device 42 for producing a heated airflow 44.

The consumable substance 12 is dispensed into a container 50 after contacting either the consumable substance 12, the heating source 40 or both the consumable substance 12 and the heating source 40. The container 50 may include a paper bag, cardboard tub, plastic tub, metallic tub or other rigid container.

The device 10 comprises a body 60 extending between an upper body end 62 and a lower body end 64. The body 60, in FIGS. 1-67, are illustrated as a rocket 70 having a main body frame 72, a body covering 74, a plurality of propulsion pods 76 coupled to the main body frame 72 by a supporting channels 78. The body 60 may alternatively take the shape of a building tower, a tornado, a volcano, a traditional vending popcorn cart, or other elongated bodies. The body 60 may further include advertisement portions.

The body 60 includes an input aperture 66 proximal to the upper body end 62 for receiving the consumable substance 12. A housing 100 defines a housing chamber 102 below the input aperture 66 for temporarily holding the consumable substance 12. A closure 140 is pivotably coupled to the housing 100 for dispensing the consumable substance 12 from the housing 100.

A flavor dispenser 220 dispenses the edible substance 30 below the closure 140 and engages the consumable substance 12. The edible substance 30 may include a liquid 32 and or a solid 34. The heating element 42 produces the heated airflow 44 and dispenses the heated airflow 44 into the housing 100 for heating the consumable substance 12. An output aperture 68 is proximal to the lower body end 64 for dispensing the consumable substance 12 into the container 50.

A loading hopper 80 may be utilized for positioning the consumable substance 12 through the input aperture 66. The loading hopper 80 defines a loading chamber 82. A hopper pivot 84 pivotably couples the loading hopper 80 to the body 60 for positioning the loading hopper 80 between an exterior position 86 and an interior position 88. The exterior position 86 positions the loading hopper 80 in an upright position 90 for loading the consumable substance 12 into the loading chamber 82 of the loading hopper 80. The interior position 88 positions the loading hopper 80 in an inverted position 92 for pouring the consumable substance 12 from the loading chamber 82 and into the housing 100. The loading hopper 80 may further include a contoured covering 94 for covering the input aperture 66 when the loading hopper 80 is in the interior position 88 for maintaining the heat within the housing 100.

The housing 100 extends between an upper housing end 104 and a lower housing end 106 and defines an upper housing aperture 110 and a lower housing aperture 112. The housing defines a reduced cross-sectional area 114 from the upper housing aperture 110 and the lower housing aperture 112 for defining a housing funnel shape 116. The closure 140 is pivotably coupled to the lower housing aperture 112. The lower housing end 106 may include a protruding flange 118 for positioning the lower housing aperture 112 in a non-horizontal orientation 120. The protruding flange 118 positions the closure 140 in a declining orientation 142 during dispensing the consumable substance 12 from the housing 100 and for preventing jamming of the consumable substance 12 between the housing 100 and the closure 140.

The closure 140 includes a closure plate 144 including an upper closure surface 146, a lower closure surface 148, a pivoting edge 150, a distal edge 152, a primary side edge 154 and a secondary side edge 156. A closure pivot 158 pivotably couples the pivoting edge 150 of the closure plate 144 to the housing 100.

A dispensing motor 160 is coupled to the closure 140 for reciprocating the closure 140 between a generally closed position 162 and a generally open position 164 relative to lower housing aperture 112 for dispensing the consumable substance 12 from the housing 100 and into the container 50. The dispensing motor 160 maybe coupled to the closure 140 by an offset cam turn 168 to reciprocate the closure 140 for permitting the consumable substance 12 to flow out of housing 100 at a steady rate and with the general sheet 166 of consumable substance 12 into the container 50. Alternatively, the dispensing motor 160 maybe coupled to the closure 140 by a linear motor, a pneumatic actuator, a hydraulic actuator or other displacement devices.

The distal edge 152, the primary side edge 154 and the secondary side edge 156 define a general sheet 166 of consumable substance 12 dispensed from closure 140 and ascends into the container 50 for uniformly covering the consumable substance 12 with the edible substance 30. The closure 140 may further including a plurality of ribs 170 extending from the upper closure surface 146 of the closure plate 144 adjacent to the distal edge 152, the primary side edge 154 and the secondary side edge 156 for preventing jamming of the consumable substance 12 between the housing 100 and the closure 140. In addition, the plurality of ribs 170 assist in holding the consumable substance 12 within the housing 100 during inaction of the dispensing motor 160. Furthermore, the plurality of ribs 170 assist in controlling flow of consumable substance 12 between the housing 100 and the closure 140 during action of the dispensing motor 160 while minimizing breakage of the consumable substance 12. The distal edge 152 may include a single rib having approximately a two (2) inch width and approximately a quarter (¼) inch height. The primary side edge 154 and the secondary side edge 156 may include a plurality of ribs that have varying rib heights. The single rib and the plurality ribs assist in preventing the continued fallout of the consumable substance 12 after termination of the displacement of the closure 140.

A semi-tensioned string 172 or elastic band 174 may extending between the upper closure surface 146 of the closure 140 and the housing 100 for defining an anti-clog string 176 for preventing clogging of the consumable substance 12 in the housing 100 and closure 140 during dispensing. More specifically, during reciprocating the closure 140 by the dispensing motor 160, the closure 140 gently agitates the anti-clog string 176 for keeping the consumable substance 12 free flowing.

An airflow duct 180 may couple the heating element 42 with the housing 100 for transporting the heated airflow 44 from the heating element 42 to the housing chamber 102. The housing 100 includes an airflow duct aperture 122 positioning adjacent to the airflow duct 180 permitting the heated airflow 44 to enter the housing chamber 102. Preferably, the airflow duct aperture 122 includes an aperture screen 124 for preventing the consumable substance 12 from entering into the airflow duct 180. The device 10 may include one or more of the heating elements 42. Preferably the heating elements 42 are positioned within the propulsion pods 76 and the airflow duct 180 traverse the supporting channels 78. The heating element 42 may be thermostatically controlled (temp. sensor, heat coils, fans) to maintain the consumable substance 12 at a very warm optimal ready state for a dispersion cycle.

The heating elements 42 preferably include two (2) operating states wherein the first includes maintaining a very warm thermostatically controlled storage state, and second including a serving-cycle high-burst heat to make the final serving bag contents & air reach a highest safe temperature for customer carry away.

The device 10 may further include a flavoring channel 190 extending between an upper channel end 192 and a lower channel end 194 and defining an upper channel aperture 196 and a lower channel aperture 198. The flavoring channel 190 defines a reduced cross-sectional area 200 from the upper channel aperture 196 and the lower channel aperture 198 for defining a channel funnel shape 202. The flavoring channel 190 engages the container 50 for transitioning the consumable substance 12 from the housing 100, through the lower channel aperture 198 and into the container 50. More specifically, the flavoring channel 190 assists in maintaining the container 50 in an open position such that the consumable substance 12 is not positioned outside of the container 50.

The flavor dispenser 220 may include a motor grinding dispenser 222 for dispensing the edible substance 30 namely the solid 34 by grinding. The motor grinding dispenser 222 may further include a first motor grinding dispenser 224 for grinding and dispensing salt and a second motor grinding dispenser 226 for grinding and dispensing pepper. The flavor dispenser 220 may further include a vibrating dispenser 230 for dispensing the edible substance 30 by vibration. The vibrating dispenser 230 includes a reservoir 232 extending between an upper reservoir end 234, a lower reservoir end 236 and defines a reservoir chamber 238 for storing the edible substance 30. An output aperture 240 is in the lower reservoir end 236. A primary descending duct 242 is coupled to the output aperture 240 for receiving the edible substance 30. A secondary descending duct 244 is coupled to the primary descending duct 242 for receiving the edible substance 30. A terminal end 246 is in the secondary descending duct 244. A plurality of apertures 248 is in the secondary descending duct 244 for discharging the edible substance 30 and engaging the consumable good 12.

An upper demountable link 250 couples the reservoir 232 to the body 60 for permitting engagement and disengagement of the reservoir 232 relative to the body 60. The upper demountable link 250 may include an upper elastic band 252, flexible link, flexible band or other semi-flexible couples. A lower demountable link 254 couples the secondary descending duct 244 to the body 60 for permitting engagement and disengagement of the reservoir 232 relative to the body 60. The device 10 may include one or more vibrating dispensers 230. Preferably, the secondary descending duct 244 are positioned immediately above the flavoring channel 190 and adjacent to the closure 140 for promoting a thorough coating of the edible substance 30 over substantially all of the consumable substance 12.

A drive 260 is coupled to the lower demountable link 254 for producing a vibration through the lower demountable link 254, the secondary descending duct 244, the primary descending duct 242 and the reservoir 232 for channeling the edible substance 30 from the reservoir 232 through the primary descending duct 242, the secondary descending duct 244 and discharging from the plurality of apertures 248.

The lower demountable link 254 may include a recessed channel 262 in the terminal end 246. A driving pin 264 extends from the drive 260 and engages the recessed channel 262 for transmitting the vibration from the dive 260, through the driving pin 264 and into the recessed channel 262. Preferably, the vibrating dispenser 230 is a sealed unit wherein the end user is unable to open the reservoir 232 to replenish the reservoir chamber 238 with any edible substance 30. The upper demountable link 250 and the lower demountable link 254 permit the vibrating dispenser 230 to be entirely removed from the device 10 and replaced with a new vibrating dispenser 230. The driving pin 264 may be retained within the recessed channel 262 by gravity, elastic bands, magnetic attraction or other fastening devices.

The flavor dispenser 220 may include a liquid pump dispenser 280 for dispensing the edible substance 30 namely the liquid 32 by pressure. The liquid pump dispenser 280 may include a liquid container 282 for storing the liquid 32. Preferably, the liquid container 282 may be removed from a liquid pump 288 for permitting engagement and disengagement of the liquid container 282 relative to the body 60.

A liquid supply conduit 284 is coupled to the liquid container 282 for transporting the liquid 32 from the liquid container 282. A liquid dispenser manifold 286 is coupled to the liquid supply conduit 284. Preferably, the liquid dispenser manifold 286 includes a primary dispenser manifold 290 and a secondary dispenser manifold 292 positioned adjacent to and below the lower channel aperture 198 of the flavoring channel 190. Since the liquid dispenser manifold 286 is positioned below the flavoring channel 190, the device 10 maintains cleanliness by positioning the liquid 32 into contact with the consumable substance 12 as the consumable substance 12 is positioned within the container 50.

Preferably, liquid dispenser manifold 286 includes a plurality of apertures 294 for defining a general sheet of liquid 296 dispensed from the liquid dispenser manifold 286. The plurality of apertures 294 are preferably oriented in a non-vertical orientation 298 such that the dispensing of the liquid 32 forms a crisscross stream 300 in combination with the primary dispenser manifold 290 and the secondary dispenser manifold 292. The crisscross stream 300 promotes a thorough coating of the liquid 32 over substantially all of the consumable substance 12. Preferably, the activation of the liquid pump dispenser 280 is delayed from the activation of the closure 140 for preventing the wasteful dispensing of the liquid 32 into an empty container 50. The liquid pump dispenser 280 may further include a liquid heater 302 within the liquid container 282 for maintaining an elevated temperature in the liquid 32.

The device 10 includes an electrical control circuit 310 electrically coupled to the flavor dispenser 220 and the heating source 40 for activating and deactivating the flavor dispenser 220 and the heating source 40 during activating and deactivating the closure 140 respectively. More specifically, the electrical control circuit 310 is electrically coupled to the motor grinding dispenser 222, the vibrating dispenser 230, the liquid pump dispenser 280 and the heat source 44 for activation and deactivation during activating and deactivating of the closure 140 respectively. The electrical control circuit 310 may include an electrical timing circuit 312 for defining a timed activation 314 of the flavor dispenser 220, the heating source 40 and the closure 140 for metering the amount of the edible substance 30 dispensed from the flavor dispenser 220 and for timing the amount of heated airflow 44 engaging the consumable substance 12.

The device 10 may include an electrical control panel 320. The electrical control panel 320 may include a plurality of dial switches 322 electrically coupled to the electrical control circuit 310. The plurality of dial switches 322 may include four (4) separate dials including a first electrical control dial 330, a second electrical control dial 332, a third electrical control dial 334 and a fourth electrical control dial 336. Each of the plurality of dial switches 322 providing a setting for the option and quantity of the edible substance 30 to be dispensed. More specifically, each of the plurality of dial switches 322 are electrically coupled to the motor grinding dispenser 222, the vibrating dispenser 230, and the liquid pump dispenser 280 for activation or non-activation in addition to the amount dispensed. Furthermore, each of the plurality of dial switches 322 may include a LED position indicator 338 that corresponds to a selected option including a ready position 340, a non dispensing edible substance position 342, a normal dispensing edible substance position 344 and an extra dispensing edible substance position 346. The dials 322 have discrete steps with a mechanical click to indicate the dial is set higher or lower and are stateless and have no specific setting. The dials 322 can be used to go up or go down one step with each click. There is a dial 322 to set the amount for flavor one (1), a dial for flavor two (2), a dial for fresh ground salt and a dial for butter. Each dial 322 has four discrete steps, with start setting at a 9'o'clock position being a "ready state" 340, which prompts the user to make a choice for that flavoring (choice either: none, normal, extra). The dials 322 can be set independently from each other. Each dial has a visual feedback in the form of LED lights 338 to indicate options chosen. The visual feedback is given from the control board 310 which translates each click of the dial 322 to light a corresponding LED. The ready state 340 and maximum state 346 are the limits of the dial 322. If a user turns the dial beyond maximum 346 or below the ready state 340 the maximum state 346 or ready state 340 will be set and visualized. The control mechanism 320 has a start button 350 to start the device 10 to dispense popcorn 12 with the dialed in settings.

The electrical control panel 320 including the plurality of dials 322 and start button 350 are in a logical downward "countdown" sequence from top down leading to the final hit of START button 350 (for "blastoff" in this rocket theme example). The operator first sets dial 1 (330), then 2 (332), 3 (334), 4 (336) and finally hits start button 350 to engage all automated actions. Each dial 322 (or near it) has a spot or receptacle for placing a professional looking descriptor for the flavor it will dispense, e.g. cheddar, bacon, ground-sea-salt, butter.

The dials 322 are electronically linked to a logic board 310 to read out all inputs and drive all necessary components to deliver the desired combination of flavors. At the beginning of each operation cycle, the logic board 310 sets all dials to the ready state. The first step in the operation is the logic board 310 deciding what type of bag 50 will be filled (e.g. medium or large). The type of bag 50 (medium or large) is automatically read from the bagholder 382 where a sensor mechanism will tell the logic board 310 which bag 50 based on linear position of the bag holder 382 to hold the bag 50. The bag size dictates the amount of popcorn to be dispersed and sets the time interval for all the following actions. For a medium bag the closure 140 or flapper 140 and flavoring mechanisms 220 will run for a short interval, for a large bag runs for a longer interval. Alternatively, dispensed amounts (i.e. turn off points) could be controlled by proximity sensors or weight to indicate when to stop.

Dial one 330 is then set. If the option is 'no flavor' then the logic board 310 will not activate the motor operating the flavor one mechanism once the flavoring sequence is started. If the option is set to medium 'regular amount' 344 the logic board 310 will activate the flavor one mechanism at medium power once the flavoring sequence is started. If the dial is set to maximum 'extra amount' 346 then the logic board 310 will activate the flavor one mechanism at maximum power once the flavoring sequence is started. The amount of power going to the flavor mechanism determines whether the flavoring motors run at medium or high speed and the difference in speeds corresponds to the amount of flavor being added to the kernels.

This is repeated for all dials. When every dial has a setting and is no longer in the ready state, the start button 350 becomes active. The user presses the start button 350 and the logic boards 310 start the program and the flavoring sequence begins. At first the flapper motor 160 will be turned on for an interval based on bag size. With a possible short delay so that the flow of kernels is in the flavoring channel 190 and there is a steady stream of kernels underneath the flavoring dispenser 220. The flavoring dispenser 220 are activated and deactivated based an interval determined on bag size and a speed that is determined by the input dials 322. The delay is added to prevent adding flavor into an empty bag bottom 50. The liquid pump dispenser 280 or butter flavor starts after a slightly longer delay, and begins operating once the first kernels are on the bottom of the bag 50 to prevent butter being squirted into an empty bag. The liquid pump dispenser 280 or butter flavoring motors start for an interval based on bag size and a speed that is determined by the input dials. Once the flavoring sequence ends the dispensing motor 160 or flapper motor 160 stops, after a short interval the flavor and salt motors 220 stop and after a further short delay the butter flavoring stops in such a sequence that all kernels passing by a flavor mechanism get flavored. When the operation is finished the dials 322 are reset to the ready state and a new sequence can be started. The user can now remove the bag 50 of flavored popcorn 14. The machine is reset and ready for a new sequence.

Then, as the operator rotates dials 322 to select each chosen amount of flavoring material (either none, regular, or extra) for the 4 different flavoring control dials (butter, fresh ground sea salt, flavoring A, flavoring B) per the patrons custom order, the electronics are being poised to engage the proper voltages for the motors 160, 222, 260, 280 to run at a certain speed (thus vibrating powder tube, grinding salt, squirting butter fluid) for the chosen flavoring amounts per customer order. The electronics set time to run motor 160 to reciprocate the flapper door 140 up-down (by offset cam on axle) to effectively "flow down" and create the general sheet of consumable substance 166 of the unflavored popcorn 14 through a curtain or general layer 228 of solid 34 edible substance 30 and spray or general sheet of liquid 296 of flavorings while also bringing superheated air 44 & popcorn 14 down into the bag 50. When all choices are made and the start button 350 is depressed, the electronics run all items to dispense everything evenly and super hot directly into the bag 50. In other words, the operator will select each desired amount (either none, regular, extra) across 4 different flavoring dials (e.g. 1—butter liquid, 2—fresh ground sea salt, 3—flavor powder "A", 4—flavor powder "B"). When all choices are made and the start button 350 is hit, the electronics run all items to dispense/apply everything evenly and with super hot popcorn directly into the bag.

The device 10 may further include a base guide 380 positioned below the output aperture 68. A base support 382 slidably engages the base guide 380 for positioning the base support 382 between a filling position 384 and a lifting positioned 386. The filling position 384 defines the base support 382 maintaining the container 50 engaging with the lower channel aperture 198 of the flavoring channel 190. The lifting position 386 defines the base support 382 maintaining the container 50 in a displaced orientation relative to the lower channel aperture 198 of the flavoring channel 190. The base support 382 includes a first container support surface 390 and a second container support surface 392 for defining a stepped upper surface 394. The first container support surface 390 is intended to support a larger container 52 and the second container support surface 392 is intended to support a smaller container 54. Preferably the base support 382 positions the opening of the container 50 around the lower channel aperture 198 of the flavoring channel 190 for ensuring the consumable substance 12 is positioned within the container 50.

A container sensor 410 may be coupled to the base guide 380 and the base support 382 and electrically coupled to the electrical control circuit 310 for defining primary support position 412 and a secondary support position 414. The primary support position 412 electrically defines the larger container 52. The secondary support position 414 electrically defines the smaller container 54. The electrical timing circuit 312 activates the flavor dispenser 220, the heating source 40 and the closure 140 and meters the amount of the edible substance 30 dispensed from the flavor dispenser 220. The electrical timing circuit 312 including a first timed activation 316 during the primary support position 412 for metering a first amount of the edible substance 420 dispensed from the flavor dispenser 220. The electrical timing circuit 312 including a second timed activation 318 during the secondary support position 414 for metering a second amount of the edible substance 422 dispensed from the flavor dispenser 220.

Alternatively to having an electrical timing circuit 312, the device 10 may include an optical sensor coupled to the body 60 that indicated when the container 50 is filled with the consumable substance 12. The optical sensor activates the flavor dispenser 220, the heating source 40 and the closure 140 until the container 50 is filled with the consumable substance 12. Upon the container 50 being filled with the consumable substance 12, the optical sensor deactivates the flavor dispenser 220, the heating source 40 and the closure 140.

Alternatively to having an electrical timing circuit 312 or the optical sensor, the device 10 may include a weight sensor coupled to the body 60 that weights the container 50 during filling with the consumable substance 12. The weight sensor activates the flavor dispenser 220, the heating source 40 and the closure 140 until the container 50 weights a set limit with the consumable substance 12. Upon the container 50 being filled with the consumable substance 12 reaches a set limit of weight, the weight sensor deactivates the flavor dispenser 220, the heating source 40 and the closure 140.

The subject invention further includes the method for flavoring a consumable substance 12 and or heating the consumable substance 12. The method comprises the steps of inputting the consumable substance 12 into the housing chamber 102 of the housing 100 for temporarily holding the consumable substance 12. The closure 140 is then pivoted relative to the housing 100 for dispensing the consumable substance 12 from the housing 100. The edible substance 30 is then dispensed from the flavor dispenser 220 below the closure 140 for engaging the consumable substance 12. The consumable substance 12 is then positioned into the container. The method may further include the step of heating the consumable substance 12 with the heating source 40 or heating element 40 for producing the heated airflow 44 and dispensing the heated airflow 44 into the housing 100 and increasing the temperature of the consumable substance 12.

The subject invention also incorporates a dispensing device 231 removably coupled to a support 61 or an internal frame 63. The support 61 may include an internal frame 63 within the body 60. The dispensing device 231 discharges an edible substance 30 for flavoring a consumable good 12. The dispensing device 231 includes a vibrating dispenser 230 for dispensing the edible substance 30 by vibration. The vibrating dispenser 230 includes a reservoir 232 extending between an upper reservoir end 234, a lower reservoir end 236 and defines a reservoir chamber 238 for storing the edible substance 30. An output aperture 240 is in the lower reservoir end 236. A primary descending duct 242 is coupled to the output aperture 240 for receiving the edible substance 30. A secondary descending duct 244 is coupled to the primary descending duct 242 for receiving the edible substance 30. A terminal end 246 is in the secondary descending duct 244. A plurality of apertures 248 is in the secondary descending duct 244 for discharging the edible substance 30 and engaging the consumable good 12.

An upper demountable link 250 couples the reservoir 232 to the body 60 for permitting engagement and disengagement of the reservoir 232 relative to the body 60. The upper demountable link 250 may include an upper elastic band 252, flexible link, flexible band or other semi-flexible couples. A lower demountable link 254 couples the secondary descending duct 244 to the body 60 for permitting engagement and disengagement of the reservoir 232 relative to the body 60. The device 10 may include one or more vibrating dispensers 230. Preferably, the secondary descending duct 244 are positioned immediately above the flavoring channel 190 and adjacent to the closure 140 for promoting a thorough coating of the edible substance 30 over substantially all of the consumable substance 12.

A drive 260 is coupled to the lower demountable link 254 for producing a vibration through the lower demountable link 254, the secondary descending duct 244, the primary descending duct 242 and the reservoir 232 for channeling the edible substance 30 from the reservoir 232 through the primary descending duct 242, the secondary descending duct 244 and discharging from the plurality of apertures 248.

The lower demountable link 254 may include a recessed channel 262 in the terminal end 246. A driving pin 264 extends from the drive 260 and engages the recessed channel 262 for transmitting the vibration from the dive 260, through the driving pin 264 and into the recessed channel 262. Preferably, the vibrating dispenser 230 is a sealed unit wherein the end user is unable to open the reservoir 232 to replenish the reservoir chamber 238 with any edible substance 30. The upper demountable link 250 and the lower demountable link 254 permit the vibrating dispenser 230 to be entirely removed from the device 10 and replaced with a new vibrating dispenser 230. The driving pin 264 may be retained within the recessed channel 262 by gravity, elastic bands, magnetic attraction or other fastening devices.

The device 10 as shown in FIGS. 1-68 is preferably a service-counter placed, barista type, gourmet "even flavoring applier" and "high final heater" for popcorn 14, which also has a purpose designed entertaining theme/shape (currently a rocket 70) to amuse, engage, and attract customers to request the device's use by the counter person so they get a bag of popcorn that is better by having even flavoring throughout the container 50 or bag 50 and also stays hotter for longer in bag 50.

The device 10 may be positioned in a theater concession area, a moviegoer approaches the counter to buy popcorn; next to the popper/storage unit he sees a shiny tall rocket 70 with dials and lights having a bag spot at rockets thruster bottom outlet.

To operate the device 10, an operator first pushes backward the stepped bag holder 382 (which accommodates a medium or large bag), slips a new bag on flavoring channel 190, then slides bag holder 382 forward into place to support bag 50. A proximity switch or container sensor 410 tells electronics which bag size to engage proper timed amounts in dispensing cycle), then server turns the 4 selection dials to flavor popcorn per custom order (amount choices=none, regular, extra), e.g. butter=extra, fresh ground sea salt=regular, cheddar flavor=none, bacon flavor=extra, then server hits go button, and the electronics dispense everything evenly and super heated into a bag. When done, server holds bag bottom, pushes bag holder backward out of way, removes (drops down) and gives bag of super-heated & 'custom evenly flavored' popcorn to customer.

When the bag holder 382 is pushed back then pulled forward to a certain position to support a bag 50 up on the flavoring channel 190, the machine immediately starts the superheating air to permeate through the popcorn filled within the housing 100. Concurrently, the electronic/proximity switch 410 interprets which position the holder returns to, thus signifying either a large bag or medium bag. In doing so, the machine then sets the proper timing & amounts in dispensing for that particular bag size. Then, as the operator rotates dials 322 to select each chosen amount of flavoring material (either none, regular, or extra) for the 4 different flavoring control dials (butter, fresh ground sea salt, flavoring A, flavoring B) per the patrons custom order, the electronics are being poised to engage the proper voltages for the motors to run at a certain speed (thus vibrating powder tube, grinding salt, squirting butter fluid) for the chosen flavoring amounts per customer order. The electronics set time to run motor to reciprocate the closure 140 door up-down (by offset cam on axle) to effectively "flow down" the unflavored popcorn through "curtains/sprays" of flavorings while also bringing superheated air & popcorn down into the bag. When all choices are made and the start button 350 is depressed, the electronics run all items to dispense everything evenly and super hot directly into the bag 50.

The operator pushes bag holder 382 fully backward then forward to a certain point to support bag 50 on a step 382, thus holding bag 50 up onto the flavoring channel 190. The proximity switch 410 senses final resting position of holder 382 indicating either "large" or "medium" size bag, and routes the inputs to that size's particular set of electronics for appropriate shorter or longer timings. Superheated air 44 is triggered on thus engaging heating elements and fans 40 to blow/permeate into the housing 100 that are already filled with popcorn 12 and nearly ready to be dispensed into serving bag 50 via the just engaged cycle.

The operator will select each desired amount (either none, regular, extra) across 4 different flavoring dials (e.g. 1—butter liquid, 2—fresh ground sea salt, 3—flavor powder "A", 4—flavor powder "B"). When all choices are made and the start button 350 is depressed, the electronics run all items to dispense/apply everything evenly and with super hot popcorn 12 directly into the bag 50. Specifically, the dispensing motor 160 & offset cam 168 turn to reciprocate the closure 140 so kernels flow out of housing 100 at a steady rate into the bag 50, while simultaneously the butter pump squirts liquid out of the liquid dispenser manifold 286 having an array of holes pointed directly onto kernels just entering a bag 50 and below flavoring channel 190 so no mess is made in equipment. A slight time delay circuit for butter squirting (about 2 seconds) may be utilized so as to not soak the bottom of bag 50 with butter. The motor grinding dispenser 222 or rock salt grinders 222 turn to flow ground salt down the flavoring channel 190 mixing with kernels 12 entering bag 50, while the two vibrating dispensers 230 vibrate for either one/the other/or both vibrating dispensers 230 at a frequency of either zero, slow, or fast to dispense either none, regular, or extra amounts of the solid 34 edible substance 30 directly on popcorn 14 flowing into bag 50. Dispensing is completed when the bag 50 is filled (accomplished either by timing, and/or a top fill level type sensor, and/or weight type sensor) thus dispensing stops and electronics automatically reset to a ready position 340. The bag 50 of superheated custom flavored popcorn 14 is removed by supporting bag 50 up with hand, pushing back the bag holder 382, dropping bag 50 down from the flavoring channel 190, and moving bag 50 out to give to customer. The device 10 is now in a ready state for the next order cycle. Popcorn 14 level in machine is checked and topped off per worker general routine simply by opening the loading hopper door 80 to see within the housing 100 and fill if needed.

The device 10 loads in a limited amount of popcorn 14 manually via its ergonomic easy to load-in loading hopper 80 or dump door. The loading hopper 80 places the popcorn 14 into a heat maintaining chamber or housing 100, dispenses bag-matching amounts of popcorn through chosen streams of liquid, powder, and granular salt flavorings directly, cleanly and highly heated down into serving bags 50, all in a very entertaining way, and in such an evenly dispersed manner that the end food product is more flavorful than customary methods of putting salt and/or liquid butter just onto the top of a filled bag.

The operator setting a dispense cycle includes rotor-dials 322 and button 350 comprising the GUI(13) sit idle ready and serve 2 main functions: 1) maintain a high ready temperature of both popcorn and liquid butter, 2) accept operator selectable inputs via dial selectors and a go button to command the timing and powering of motors attached to mechanical connections to move all the materials together and into end serving bag. Note also a flow of superheated higher pressure air is activated by the timers to permeate chambers and go directly into serving bag during the short dispensing cycle, which uniquely gives the customer more time to enjoy hot popcorn longer. Multiple Mechanical Items are driven by motors to dispense the materials in a manner that evenly flows/mixes all chosen things so that they all end up in a serving bag very hot and ready for optimal enjoyment.

The vibrating dispenser 230 are tubes that flow-downward a linear-wide stream of powdered flavoring (e.g. cheddar, bacon) onto popcorn 14. The tubes have an array of many small holes 248 on their bottom reciprocated by a motor/lever 260 assembly that mates to the tube via a peg 264 on motor assembly into a hole 254 in end of powder tube. A conic void 262 in the tip guides the tip to center on the peg 264, making full insertion easy. In the array of many small holes 248, some larger holes are placed near the tip to allow any larger particulates to exit, preventing powder from stacking up the tube. Powder storage is within reservoir 232 located above such tubes for easy loading & staging of powder, and the powder shaker tubes are fed by gravity from the reservoirs. The vibrating dispenser 230 can be a total replacement type having the powder dispersion tubes permanently attached so a fresh/sanitary replacement of everything in the system is done every reload. This eliminates cleaning/maintenance and importantly prevents contaminations prone to permanent based systems that require regular service/cleaning. To keep the powder tube tips from vibrating away/off of the motor assembly peg, several options are available: small embedded magnet in tip thus pulling/holding tube to the tip of steel peg, or an elastic band running from tip of powder tubes, "across, parallel, and past" the reciprocating peg and attached atop motor housing or near outer shell, or elastic band behind the reservoir's curved down tube keeping it from backing away but allowing vibrational float.

Fresh ground salt, pepper or other powder is dispensed by engaging the motor grinding dispenser 222 to flow into the flavoring channel 190. Liquid butter flavoring is applied by the liquid pump dispenser 280 which are comprised of 2 spray tubes with an array of holes and strategically located below serving bag top and the flavoring channel 190 to keep everything clean. The electronics activate a pump to send pressurized hot butter directly onto falling kernels within bag via tubes connected to the liquid pump dispenser 280. A steady hot temperature is maintained by sensor controlled heating elements 302, achieved either by using an inside reservoir glass type heater, or outside container radiant type.

The flavoring channel 190 serves two main purposes; 1) guides popcorn and all powder and salts into the bag 2) acts to "hold-open-in-place" the serving bag 50 upon slipping up into position then sliding the base support 382 or bag holder 382 underneath bag bottom. The flavoring channel 190 low bottom also serves as mounting sites for the liquid dispenser manifold 286. The popcorn and all selected flavoring contents go directly into the bag, and upon cycling completion, the bag is held, bag holder pushed to full back position, bag is dropped down, removed and given to patron. It is possible to adapt items to accommodate other serving container sizes & shapes.

This device 10 also provides solutions to apply fresh ground sea salts plus various different powder flavorings evenly throughout the bag, simultaneously, and quickly. For optimizing the hotness at serving, this device first maintains popcorn at a best "warm ready" temperature state, then uniquely superheats it (plus surrounding air spaces in bag) during the moments it flows into serving bag. The device 10 may provide a popcorn-flavoring machine that provides superior flavoring (by even coating) and a longer and hotter heat duration in the serving bag for the customer to more fully enjoy the serving.

FIGS. 69-88 illustrate a second embodiment 450 of the device 10. The second embodiment 450 shares many of the same structure as in the device 10 shown in FIGS. 1-68, however the second embodiment 450 includes an input aperture closure 452 which pivots upon a closure 454. The input aperture closure 452 may further include a lock for preventing access within the body 60.

The body 60 further includes a plurality of viewing apertures 460 which receive a viewing window 462. The viewing windows 462 allow an operator to view within the body 60 to determine if additional popcorn 14 is needed to be supplied into the housing 100 by way of pouring the popcorn 14 through the input aperture 66.

The body 60 further includes an input container aperture 470. An input container door 472 pivots relative to the input container aperture 470 by way of a container door pivot 474. The input container door 472 is pivoted into the open position for exposing the inside of the body 60.

The second embodiment 450 further includes a container dispenser 490 within the body 60 for storing a plurality of containers 480. The containers 480 may include semi-rigid buckets 482 made from a disposable paper cup, a reusable polymeric cup or metallic cup. Preferably, the containers for 80 include an upper rim. Furthermore, the second embodiment 450 may include a first container dispenser 492 and a second container dispenser 494 for dispensing a first size bucket 484 or a second size bucket 486 respectively. The incorporation of the first size bucket 484 and the second size bucket 486 provides an option to the consumer for buying either a first volume of popcorn 14 or a second volume of popcorn 14.

Both the first container dispenser 492 and the second container dispenser 494 may include a plurality of aligned rods 496 rotatably mounted within the body 60. The distal ends of the plurality of aligned rods 496 include threaded rod ends 498. The plurality of aligned rods 496 are engaged by a dispenser actuator 491. The dispenser actuator 491 may include one or more rod rotational motors 499 for rotating the plurality of aligned rods 496. The threaded rod ends 498 engage with the upper rim of the containers 480 for maintaining the containers 480 within the container dispenser 490. Upon the simultaneous rotation of the plurality of aligned rods 496 the threaded rod ends 498 rotatably engage with the upper rim of the containers 480 and displace the containers 480 in a descending displacement. Once the upper rim of the lower most container 480 has traversed the threaded rod ends 498, the lower most container 480 is permitted to drop by gravity into the lower body and 64.

The input container door 472 may be displaced from the input container aperture 470 for filling the container dispenser 490 with the containers 480. Thereafter the input container door 472 may be repositioned within the input container aperture 470. The input container door 472 may further include a lock for preventing access within the body 60.

The container 480 that is released from the container dispenser 490 is positioned within a dispensing chamber 500. The lower body end 64 includes an output container aperture 502 for accessing the dispensing chamber 500. A panel base 514 is secured within the body 60. A container support panel 510 is coupled to the panel base 514. The container support panel 510 supports the container 480 once it is released from the container dispenser 490. Upon the container support panel 510 supporting the container 480, the popcorn 14 may then be positioned within the container 480. Thereafter, the container 480 may be withdrawn from the dispensing chamber 500 through the output container aperture 502.

More specifically, the container support panel 510 may include a rotatable support panel 512. A panel spindle 520 engages through the panel base 514 and is coupled to the rotatable support panel 512. As such, the spindle 520 rotatably couples the rotatable support panel 512 relative to the panel base 514. A panel rotational motor 530 may be mounted to the panel base 514 by a panel motor mount 524. A motor spindle 526 is coupled to the panel rotational motor 530. A belt 522 encircles the panel spindle 520 and the motor spindle 526 for producing either a clockwise rotation 532 or a counterclockwise rotation 534 in the rotatable support panel 512 by activation of the panel rotational motor 530. More specifically, the container 480 may be deployed adjacent to the housing 100 and thereafter the container 480 is rotated for positioning the container 480 below the closure 140 for receiving the popcorn 14. The rotatable support panel 512 and the panel rotational motor 530 permits the container dispenser 490 to be in a non-aligning orientation relative to the closure 140.

The rotatable support panel 512 may further include container alignment rods 511. The container alignment rods 511 have a circular pattern and have an outward angled orientation. Preferably the circular pattern is slightly larger in diameter than the diameter of the container 480. In addition the outward angled orientation of the container alignment rods 511 is commensurate with the angle of the walls of the container 480. The container alignment rods 551 are positioned below the container dispenser 490 for receiving the container 480 within the container alignment rods 511. The container alignment rods 511 prevent displacement of the container 480 relative to the rotatable support panel 512 during the clockwise rotation 532 or the counterclockwise rotation 534 of the rotatable support panel 512.

Wherein the second embodiment 450 includes a first container dispenser 492 having a first size bucket 484 and a second container dispenser 494 having a second size bucket 486 the user would select either the first size 484 or the second size 486. The dispensing of the first size bucket 484 or large size bucket 484 may cause a counter clockwise rotation 532 of the rotatable support panel 512 for positioning the container 480 under the closure 140 for receiving the popcorn 14. Alternatively the dispensing of the second size bucket 486 or medium size bucket 486 would cause a clockwise rotation 434 of the rotatable support panel 512 for positioning the container 480 under the closure 140 for receiving the popcorn 14.

The flavoring channel 190 may be secured within the body 60 by a dispensing frame 516. Furthermore, the dispensing frame 516 may include a primary frame channel 517 and a secondary frame channel 518 for permitting the container 480 to be positioned below the flavoring channel 190. The dispensing frame 516 may further include an output channel 519 for permitting the user to withdraw the container 480 from the rotatable support panel 512 and through the output aperture 68.

Figure 88:
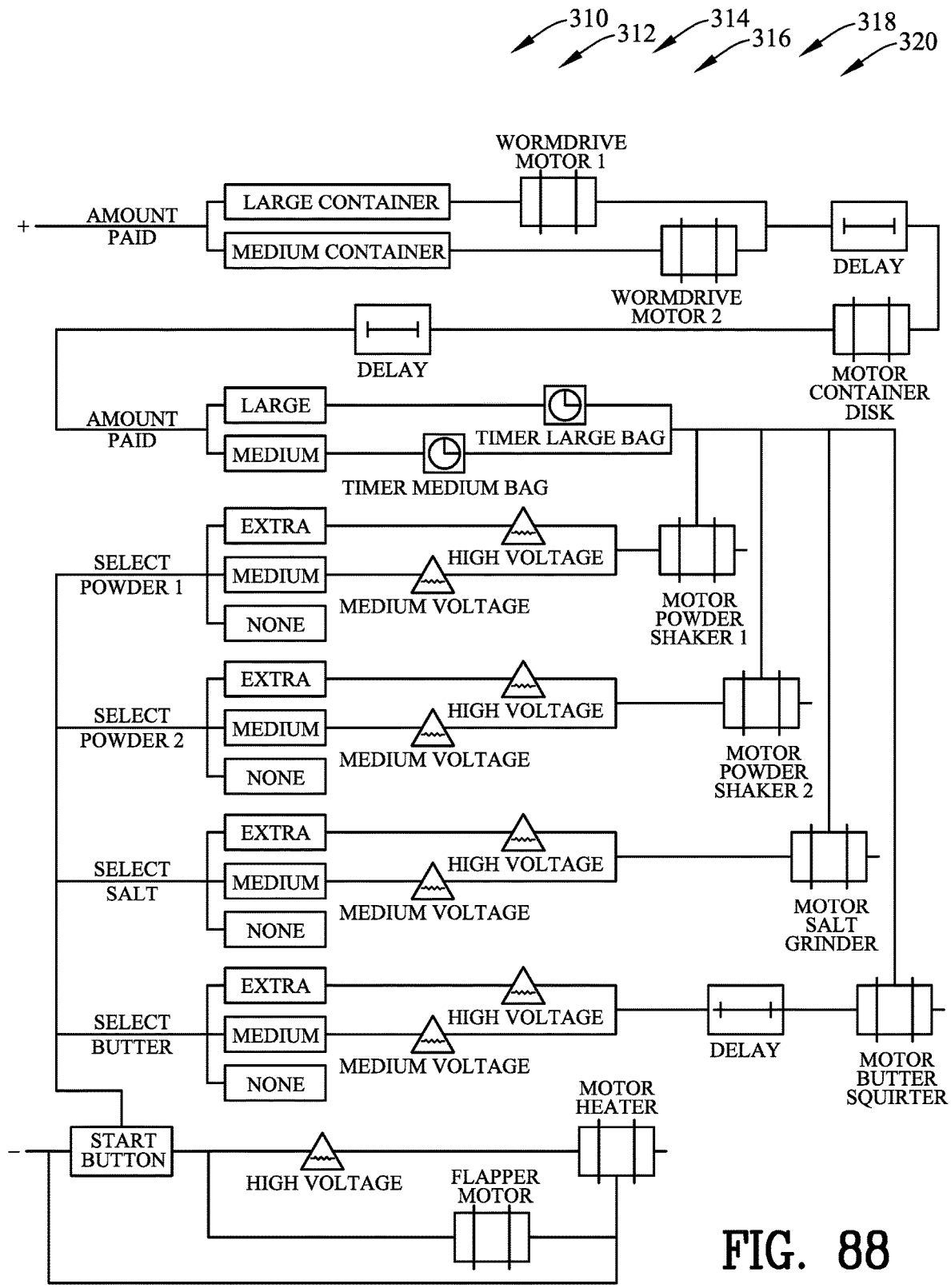
FIG. 88 is an electrical diagram utilized for the second embodiment of the device.

The electrical control circuit 310 as shown in FIG. 88, electrically couples the dispensing motor 160, the heating element 40, the flavor dispenser 220, namely the motor grinding dispenser 222, the drive 260 and the liquid pump 288, the rod rotatable motors 499 and the panel rotational motor 530 for activating and deactivating the dispensing of the popcorn 14 into the container 480. A payment receiving unit 540 may be electrically coupled to the electrical control circuit 310 for receiving payment from the user before activating the electrical control circuit 310 and thereafter dispensing the popcorn 14 into the container 480. The payment receiving unit 540 may include a cash receiving unit 542, a token receiving unit 544, a wave payment receiving unit 546 and or a credit card receiving unit 548. The payment receiving unit 540 may further include a first indicator light or button 560 for selecting the purchase of the first size bucket 484 and a second indicator light or button 562 for selecting the purchase of the second size bucket 486.

Preferably, the second embodiment 450 may be utilized by the consumer of the popcorn 14 wherein the payment and dispensing of the popcorn 14 need not require a custodian or employee for its operation. The custodian or employee of the device 10 would preferably be the only individual to have the permission to replenish the popcorn 14 that is inserted into the input aperture 66 and to replenish the containers 480 that are inserted into the input container aperture 470. The input container aperture 470 may also be utilized by the custodian or employee for replacing the edible substances 30 namely the liquid substances 32 and the solid substances 34. The body 60 may include a plurality of supporting legs 550 that may be weighted or secured to a supporting surface by fasteners or other coupling means for preventing the tipping of the device 450.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A device for flavoring and heating popcorn, the popcorn flavored by an edible substance, the popcorn heated by a heated airflow, the popcorn dispensed into a container, the device, comprising:
a body extending between an upper body end and a lower body end;
an input aperture proximal to said upper body end for receiving the popcorn;
a housing defining a housing chamber below said input aperture for temporarily holding the popcorn;
a heating element producing the heated airflow and dispensing the heated airflow into said housing for heating the popcorn;
a closure pivotably coupled to said housing for dispensing the popcorn from said housing;
a flavor dispenser dispensing the edible substance below said closure and engaging the popcorn; and
an output aperture proximal to said lower end for dispensing the popcorn into the container.

2. The device for flavoring and heating popcorn as set forth in claim 1, further including a loading hopper defining a loading chamber,
a hopper pivot pivotably coupling said loading hopper to said body for positioning said loading hopper between an exterior position and an interior position;
said exterior position positioning said loading hopper in an upright position for loading the popcorn into said loading chamber of said loading hopper; and
said interior position positioning said loading hopper in an inverted position for pouring the popcorn from said loading chamber and into said housing.

3. The device for flavoring and heating popcorn as set forth in claim 1, wherein said housing extending between an upper housing end and a lower housing end and defining an upper housing aperture and a lower housing aperture;
said housing defining a reduced cross-sectional area from said upper housing aperture and said lower housing aperture for defining a housing funnel shape; and
said closure pivotably coupled to said lower housing aperture.

4. The device for flavoring and heating popcorn as set forth in claim 3, wherein said lower housing end includes a protruding flange for positioning said lower housing aperture in a non-horizontal orientation; and
said protruding flange positioning said closure in a declining orientation during dispensing the popcorn from said housing and for preventing jamming of the popcorn between said housing and said closure.

5. The device for flavoring and heating popcorn as set forth in claim 1, further including an airflow duct coupling said heating element with said housing for transporting the heated airflow from the heating element to said housing chamber.

6. The device for flavoring and heating popcorn as set forth in claim 1, wherein said closure includes a closure plate including an upper closure surface, a lower closure surface, a pivoting edge, a distal edge, a primary side edge and a secondary side edge;
a closure pivot pivotably coupling said pivoting edge of said closure plate to said housing;
a dispensing motor coupled to said closure for reciprocating said closure between a generally closed position and a generally open position relative to lower housing aperture for dispensing the popcorn from said housing and into the container; and
said distal edge, said primary side edge and said secondary side edge defining a general sheet of popcorn dispensing from closure and ascending into the container for uniformly covering the popcorn.

7. The device for flavoring and heating popcorn as set forth in claim 6, further including a plurality of ribs extending from said upper closure surface of said closure plate adjacent to said distal edge, said primary side edge and said secondary side edge for preventing the fallout of the popcorn after termination of the reciprocating of said closure relative to said housing.

8. The device for flavoring and heating popcorn as set forth in claim 1, further including a flavoring channel extending between a upper channel end and a lower channel end and defining an upper channel aperture and a lower channel aperture;
said flavoring channel defining a reduced cross-sectional area from said upper channel aperture and said lower channel aperture for defining a channel funnel shape; and said flavoring channel engaging the container for transitioning the popcorn from said housing, through said lower channel aperture and into the container.

9. The device for flavoring and heating popcorn as set forth in claim 8, wherein said flavor dispenser includes a liquid pump dispenser, said liquid pump dispenser includes a liquid container for storing a liquid;
a liquid supply conduit receiving said liquid;
a liquid dispenser manifold coupled to said liquid supply conduit; and
said liquid dispenser manifold positioned adjacent to said lower channel end for defining a general sheet of liquid dispensed from said liquid dispenser manifold and ascending into the container for uniformly covering the popcorn.

10. The device for flavoring and heating popcorn as set forth in claim 1, wherein said flavor dispenser includes a motor grinding dispenser for dispensing the edible substance by grinding.

11. The device for flavoring and heating popcorn as set forth in claim 1, wherein said flavor dispenser includes a vibrating dispenser for dispensing the edible substance by vibration.

12. The device for flavoring and heating popcorn as set forth in claim 1, wherein said flavor dispenser includes a reservoir extending between an upper reservoir end, a lower reservoir end and defines a reservoir chamber for storing the edible substance;
an output aperture in said lower reservoir end;
a primary descending duct coupled to said output aperture for receiving the edible substance;
a secondary descending duct coupled to said primary descending duct for receiving the edible substance;
a terminal end in said secondary descending duct;
a plurality of apertures in said secondary descending duct for discharging the edible substance and engaging the popcorn;
an upper demountable link coupling said reservoir to the body for permitting engagement and disengagement of said reservoir relative to the body;
a lower demountable link coupling said secondary descending duct to the body for permitting engagement and disengagement of said reservoir relative to the body; and
a drive coupled to said lower demountable link producing a vibration through said lower demountable link, said secondary descending duct, said primary descending duct and said reservoir for channeling the edible substance from said reservoir through said primary descending duct, said secondary descending duct and discharging from said plurality of apertures.

13. The dispensing device removably coupled to a support as set forth in claim 12, wherein said upper demountable link includes an upper elastic band.

14. The dispensing device removably coupled to a support as set forth in claim 12, wherein said lower demountable link includes a recessed channel in said terminal end; and
a driving pin extending from said drive and engaging said recessed channel for transmitting said vibration from said dive, through said driving pin and into said recessed channel.

15. The device for flavoring and heating popcorn as set forth in claim 1, wherein said flavor dispenser includes a liquid pump dispenser for dispensing the edible substance by pressure.

16. The device for flavoring and heating popcorn as set forth in claim 15, wherein said flavor dispenser includes a liquid heater for maintaining an elevated temperature in said liquid.

17. The device for flavoring and heating popcorn as set forth in claim 1, further including an electrical control circuit electrically coupled to said flavor dispenser for activating and deactivating said flavor dispenser during activating and deactivating said closure respectively.

18. The device for flavoring and heating popcorn as set forth in claim 17, further including an electrical timing circuit electrically coupled to said electrical control circuit for defining a timed activation of said flavor dispenser and said closure for metering the amount of the edible substance dispensed from said flavor dispenser.

19. The device for flavoring and heating popcorn as set forth in claim 1, further including a base guide positioned below said output aperture;
a base support slidably engaging said base guide for positioning said base support between a filling position and a lifting positioned;
said filling position defining said base support maintaining the container engaging with said output aperture; and
said lifting position defining said base support maintaining the container in a displaced orientation relative to said output aperture.

20. The device for flavoring and heating popcorn as set forth in claim 19, further including an electrical control circuit electrically coupled to said flavor dispenser for activating and deactivating said flavor dispenser during activating and deactivating said closure respectively;
a container sensor coupled to said base guide and said base support and electrically coupled to said electrical control circuit for defining primary support position and a secondary support position;
said primary support position defining a first size of the container;
said secondary support position defining a second size of the container;
an electrical timing circuit electrically coupled to said electrical control circuit for activating said flavor dispenser and said closure and metering the amount of the edible substance dispensed from said flavor dispenser;
said electrical timing circuit including a first timed activation during said primary support position for metering a first amount of the edible substance dispensed from said flavor dispenser; and
said electrical timing circuit including a second timed activation during said secondary support position for metering a second amount of the edible substance dispensed from said flavor dispenser.

21. A dispensing device removably coupled to a support, the dispensing device discharging an edible substance for flavoring a consumable good, the dispensing device, comprising:
a reservoir extending between an upper reservoir end, a lower reservoir end and defines a reservoir chamber for storing the edible substance;
an output aperture in said lower reservoir end;
a primary descending duct coupled to said output aperture for receiving the edible substance;
a secondary descending duct coupled to said primary descending duct for receiving the edible substance;
a terminal end in said secondary descending duct;

a plurality of apertures in said secondary descending duct for discharging the edible substance and engaging the consumable good;

an upper demountable link coupling said reservoir to the support for permitting engagement and disengagement of said reservoir relative to the support;

a lower demountable link coupling said secondary descending duct to the support for permitting engagement and disengagement of said reservoir relative to the support; and a drive coupled to said lower demountable link producing a vibration through said lower demountable link, said secondary descending duct, said primary descending duct and said reservoir for channeling the edible substance from said reservoir through said primary descending duct, said secondary descending duct and discharging from said plurality of apertures.

22. The dispensing device removably coupled to a support as set forth in claim 21, wherein said upper demountable link includes an upper elastic band.

23. The dispensing device removably coupled to a support as set forth in claim 21, wherein said lower demountable link includes a recessed channel in said terminal end; and a driving pin extending from said drive and engaging said recessed channel for transmitting said vibration from said dive, through said driving pin and into said recessed channel.

24. A device for flavoring a consumable substance, the consumable substance flavored by an edible substance, the consumable substance dispensed into a container, the device, comprising:

a body extending between an upper body end and a lower body end;

an input aperture proximal to upper body end for receiving the consumable substance;

a housing defining a housing chamber below said input aperture for temporarily holding the consumable substance;

a closure pivotably coupled to said housing for dispensing the consumable substance from said housing;

a flavor dispenser dispensing the edible substance below said closure and engaging the consumable substance; and an output aperture proximal to said lower body end for dispensing the consumable substance into the container.

25. A device for heating a consumable substance, the consumable substance heated by a heated airflow, the consumable substance dispensed into a container, the device, comprising:

a body extending between an upper body end and a lower body end;

an input aperture proximal to said upper body end for receiving the consumable substance;

a housing defining a housing chamber below said input aperture for temporarily holding the consumable substance;

a heating element producing the heated airflow and dispensing the heated airflow into said housing for heating the consumable substance;

a closure pivotably coupled to said housing for dispensing the consumable substance from said housing; and an output aperture proximal to said lower end for dispensing the consumable substance into the container.

26. A device for flavoring and heating popcorn, the popcorn flavored by an edible substance, the popcorn heated by a heated airflow, the popcorn dispensed into a container, the device, comprising:

a body extending between an upper body end and a lower body end;

an input aperture proximal to said upper body end for receiving the popcorn;

a housing defining a housing chamber below said input aperture for temporarily holding the popcorn;

a heating element producing the heated airflow and dispensing the heated airflow into said housing for heating the popcorn;

a container dispenser within said body for storing a plurality of containers;

a dispenser actuator coupled to said container dispenser for displacing one of said plurality of containers from said container dispenser;

a closure pivotably coupled to said housing for dispensing the popcorn from said housing;

a flavor dispenser dispensing the edible substance below said closure and engaging the popcorn; and an output aperture proximal to said lower end for dispensing the popcorn into the container.

27. The device for flavoring and heating popcorn as set forth in claim 26, further including a rotatable support panel within said body; and a support panel actuator coupled to said rotatable support panel for displacing one of said plurality of containers below said output aperture.

28. The device for flavoring and heating popcorn as set forth in claim 26, further including an electrical control circuit electrically coupled to said closure, said heating element and said flavor dispenser for activating and deactivating the dispensing of the popcorn into the container, and a payment receiving unit electrically coupled to said electrical control circuit for activating said electrical control circuit.

29. A device for flavoring and heating a consumable substance, the consumable substance flavored by an edible substance, the consumable substance heated by a heated airflow, the consumable substance dispensed into a container, the device, comprising:

a body extending between an upper body end and a lower body end;

an input aperture proximal to said upper body end for receiving the consumable substance;

a housing defining a housing chamber below said input aperture for temporarily holding the consumable substance;

a heating element producing the heated airflow and dispensing the heated airflow into said housing for heating the consumable substance;

a flavor dispenser dispensing the edible substance for engaging the consumable substance;

a closure pivotably coupled to said housing for dispensing the consumable substance from said housing; and an output aperture proximal to said lower end for dispensing the consumable substance into the container.

30. A device for flavoring and heating a consumable substance, the consumable substance flavored by an edible substance, the consumable substance heated by a heated airflow, the consumable substance dispensed into a container, the device, comprising:

a body having an input aperture for receiving the consumable substance and an outer aperture for dispensing the consumable substance;

a housing defining a housing chamber for temporarily holding the consumable substance within said body;

a heating element producing the heated airflow and dispensing the heated airflow into said housing for heating the consumable substance;

a flavor dispenser dispensing the edible substance for engaging the consumable substance; and a closure coupled to said housing for dispensing the consumable substance from said housing and through said outer aperture.

31. A dispensing device removably coupled to a support, the dispensing device discharging an edible substance for flavoring a consumable good, the dispensing device, comprising:

a reservoir extending between an upper reservoir end, a lower reservoir end and defines a reservoir chamber for storing the edible substance;

an output aperture in said lower reservoir end;

a descending duct coupled to said output aperture for receiving the edible substance;

a terminal end in said descending duct;

a plurality of apertures in said descending duct for discharging the edible substance and engaging the consumable good;

an upper demountable link coupling said reservoir to the support for permitting engagement and disengagement of said reservoir relative to the support;

a lower demountable link coupling said descending duct to the support for permitting engagement and disengagement of said reservoir relative to the support; and a drive coupled to said lower demountable link producing a vibration through said lower demountable link, said descending duct and said reservoir for channeling the edible substance from said reservoir through said descending duct and discharging from said plurality of apertures.

* * * * *